(12) United States Patent
Vadodaria

(10) Patent No.: US 10,178,218 B1
(45) Date of Patent: *Jan. 8, 2019

(54) INTELLIGENT AGENT / PERSONAL VIRTUAL ASSISTANT WITH ANIMATED 3D PERSONA, FACIAL EXPRESSIONS, HUMAN GESTURES, BODY MOVEMENTS AND MENTAL STATES

(71) Applicant: Vishal Vadodaria, Fairfax, VA (US)

(72) Inventor: Vishal Vadodaria, Fairfax, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/852,556

(22) Filed: Sep. 12, 2015

Related U.S. Application Data

(63) Continuation-in-part of application No. 14/846,247, filed on Sep. 4, 2015, and a continuation-in-part of application No. 14/846,272, filed on Sep. 4, 2015, now Pat. No. 9,531,862, and a continuation-in-part of application No. 14/848,285, filed on Sep. 8, 2015, now abandoned.

(51) Int. Cl.

| G06F 3/0481 | (2013.01) |
| H04M 1/725 | (2006.01) |
| H04L 12/58 | (2006.01) |
| G06T 13/40 | (2011.01) |
| G10L 25/63 | (2013.01) |
| G06F 3/16 | (2006.01) |
| H04W 4/50 | (2018.01) |

(52) U.S. Cl.
CPC .......... *H04M 1/7255* (2013.01); *G06F 3/167* (2013.01); *G06T 13/40* (2013.01); *G10L 25/63* (2013.01); *H04L 51/063* (2013.01); *H04W 4/50* (2018.02)

(58) Field of Classification Search
None
See application file for complete search history.

(56) References Cited

U.S. PATENT DOCUMENTS

| 7,216,080 B2 | 5/2007 | Tsiao |
| 7,599,831 B2 | 10/2009 | Ford |
| 7,720,784 B1 * | 5/2010 | Froloff .................. A61B 5/165 |
| | | 600/300 |
| 7,912,480 B2 | 3/2011 | Moosavi |
| 8,068,419 B2 | 11/2011 | Dujardin |
| 8,289,283 B2 | 10/2012 | Kida |
| 8,296,383 B2 | 10/2012 | Lindahl |
| 8,311,838 B2 | 11/2012 | Lindahl |
| 8,345,665 B2 | 1/2013 | Vieri |
| 8,543,407 B1 | 9/2013 | Gagnon |
| 8,832,205 B2 | 9/2014 | Nelson |

(Continued)

FOREIGN PATENT DOCUMENTS

EP 1 526 463 A1 4/2005

*Primary Examiner* — Phenuel S Salomon
(74) *Attorney, Agent, or Firm* — Juneau & Mitchell; Todd L. Juneau

(57) ABSTRACT

A computer implemented system, method, and media for providing an Intelligent Interactive Agent that comprises an animated graphical representation of a plurality of behavioral states of the Intelligent Interactive Agent, said plurality of behavioral states comprising one or more states selected from the following: a Nervous state, an Afraid state, a Smiling state, a laughing state, a shocked state, or a Confused state, said behavioral state further comprising an index values for each state indicating the intensity of such states.

9 Claims, 37 Drawing Sheets

(56) References Cited

U.S. PATENT DOCUMENTS

| | | |
|---|---|---|
| 8,892,419 B2 | 11/2014 | Lundberg |
| 8,983,839 B2 | 3/2015 | Kennewick |
| 9,691,296 B2 * | 6/2017 | Hoque .................. G09B 19/04 |
| 2003/0167167 A1 * | 9/2003 | Gong .................. G10L 13/033 |
| | | 704/250 |
| 2004/0260543 A1 * | 12/2004 | Horowitz ............. G10L 15/193 |
| | | 704/221 |
| 2005/0076037 A1 | 4/2005 | Shen |
| 2007/0244976 A1 | 10/2007 | Carroll |
| 2009/0235280 A1 | 9/2009 | Tannier |
| 2010/0076802 A1 | 3/2010 | Bhogal |
| 2011/0087744 A1 * | 4/2011 | Deluca ................. G06Q 10/107 |
| | | 709/206 |
| 2011/0304632 A1 * | 12/2011 | Evertt .................... G06F 3/011 |
| | | 345/474 |
| 2012/0221938 A1 | 8/2012 | Patterson |
| 2013/0060869 A1 * | 3/2013 | Davis .................. G06Q 10/107 |
| | | 709/206 |
| 2013/0133081 A1 | 5/2013 | Pallakoff |
| 2014/0156674 A1 * | 6/2014 | Alberth, Jr. ....... G06F 17/30312 |
| | | 707/748 |
| 2014/0163959 A1 | 6/2014 | Hebert |
| 2014/0207776 A1 * | 7/2014 | Harris ............... G06F 17/30976 |
| | | 707/737 |
| 2014/0356822 A1 * | 12/2014 | Hoque .................. G09B 19/04 |
| | | 434/185 |
| 2015/0066479 A1 * | 3/2015 | Pasupalak ............. G06F 17/27 |
| | | 704/9 |
| 2015/0081279 A1 * | 3/2015 | Suleman ................ G06F 17/27 |
| | | 704/9 |
| 2015/0081711 A1 * | 3/2015 | Harris ................ G06F 17/3043 |
| | | 707/737 |
| 2015/0220511 A1 * | 8/2015 | Yang ................ G06F 17/30684 |
| | | 704/9 |
| 2015/0301729 A1 * | 10/2015 | Wang .................... G06F 3/0485 |
| | | 715/707 |

\* cited by examiner

Segments of the Validity Scale

FIGURE 11

PV = 10% - 20%

User: "I'm travelling domestically. I need a flight."
Gina: "Ok. Which state are you travelling to?"
User: "USA"
Gina: "USA? But that's a country. Which state are you travelling to?"

PV = 20% - 40%

User: "What's the weather in the city I'll be going to?"
Gina: "Which city are you going to?"
User: "USA"
Gina: "USA? That's a country. There are 50 States in USA. Each of these have cities. Which city are you going to?"

PV = 40% - 60%

User: "I need to pick up my friend at an airport."
Gina: "Which airport will your friend be arriving at?"
User: "Nevada"
Gina: "Nevada? That's a State. It has 54 public airports. I need to know the airport that your friend will be arriving at."

PV = 60% - 80%

User: "I need to pick up my friend at an airport."
Gina: "Which airport will your friend be arriving at?"
User: "USA"
Gina: "USA? That's a whole country! I need to know the airport that your friend will be arriving at."

PV = 80% - 100%

User: "I need to pick up my friend at an airport."
Gina: "Which airport will your friend be arriving at?"
User: "North America"
Gina: "North America? That's an entire Continent! I asked you the airport that your friend will be arriving at."

FIGURE 24
Normal
EF=1
EF=2
EF=3
EF=4
EF=5

Normal State

Final State (EF=1)

FIGURE 33
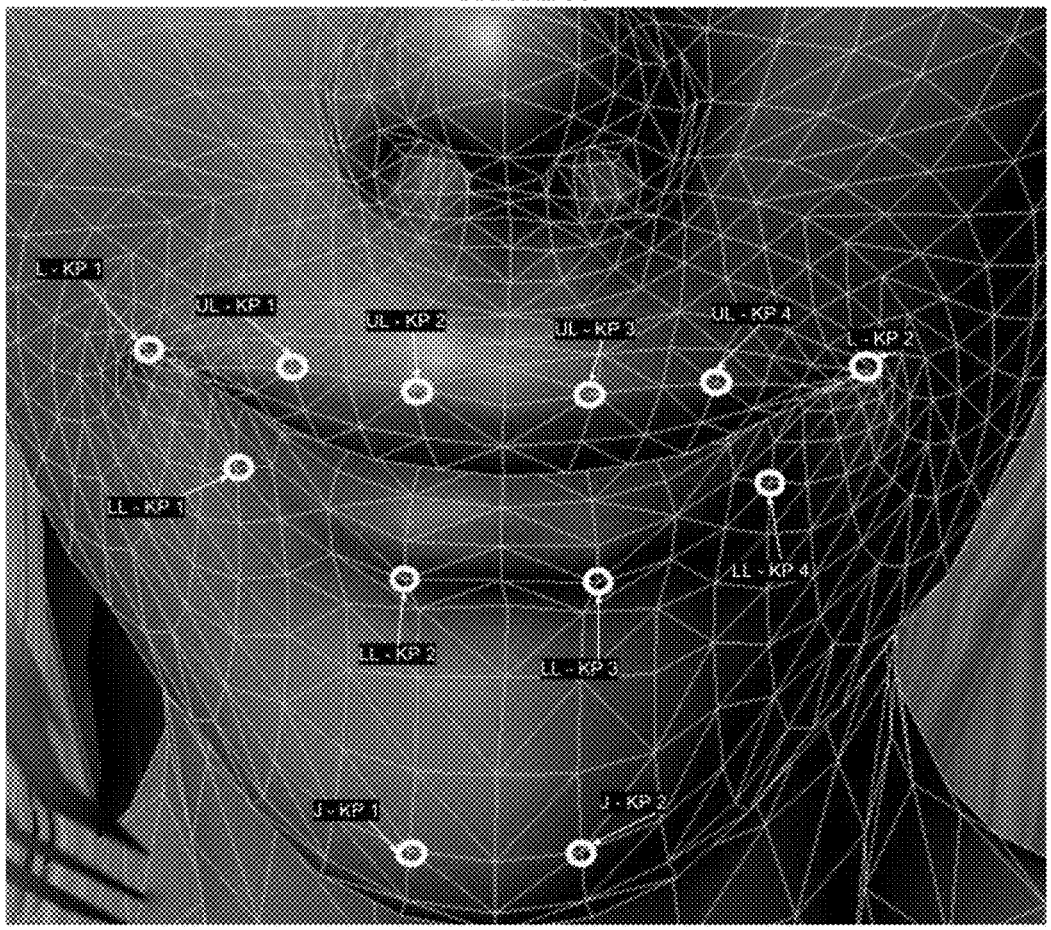
FIGURE 34
Normal State
Final State (EF=5)

FIGURE 37
Normal
Final State
(EF=1)

FIGURE 40
Normal State
Final State (EF=5)

INTELLIGENT AGENT / PERSONAL VIRTUAL ASSISTANT WITH ANIMATED 3D PERSONA, FACIAL EXPRESSIONS, HUMAN GESTURES, BODY MOVEMENTS AND MENTAL STATES

CROSS REFERENCE TO RELATED APPLICATIONS

This application is a CIP of and claims priority under 35 USC 120 to U.S. Ser. No. 14/848,285 filed Sep. 8, 2015 entitled Emotional State Model, U.S. Ser. No. 14/846,247 filed Sep. 4, 2015 entitled Electronic Note Graphical User Interface, and U.S. Ser. No. 14/846,272 filed Sep. 4, 2015 entitled Context Linking Module, the contents of which are incorporated herein in their entireties.

STATEMENT REGARDING FEDERALLY SPONSORED RESEARCH

No federal government funds were used in researching or developing this invention.

NAMES OF PARTIES TO JOINT RESEARCH AGREEMENT

There are no additional parties related to this application subject to a joint research agreement.

REFERENCE TO A SEQUENCE LISTING

A table or a computer list appendix on a compact disc is not included herein.

FIELD OF THE INVENTION

The invention relates to a computer implemented system, method, and media for providing an Intelligent Interactive Agent that comprises an animated graphical representation of a plurality of behavioral states of the Intelligent Interactive Agent, said plurality of behavioral states comprising one or more states selected from the following: a Nervous state, an Afraid state, a Smiling state, a laughing state, a shocked state, or a Confused state, said behavioral state further comprising an index values for each state indicating the intensity of such states.

BACKGROUND OF THE INVENTION

Mobile electronic communication devices and desktop computers have attempted to provide users with various animated graphic agents to facilitate a richer user experience. However, animated interactive agents have not adequately addressed the subtleties of facial language and body language in combination with verbal device outputs and/or visual device outputs. Accordingly, there is a need for systems and methods that can provide facial and body language emotional context of an animated interactive agent when receiving verbal and visual outputs from an interactive electronic device having such a graphic user interface.

BRIEF SUMMARY OF THE INVENTION

Accordingly, there is provided a system, mobile device application, computer-readable storage media, and method, for providing an Intelligent Interactive Agent that comprises an animated graphical representation of a plurality of behavioral states of the Intelligent Interactive Agent, said plurality of behavioral states comprising one or more states selected from the following: a Nervous state, an Afraid state, a Smiling state, a laughing state, a shocked state, or a Confused state, said behavioral state further comprising an index values for each state indicating the intensity of such states In a preferred embodiment, there is provided a portable electronic device in communication with remote computing equipment over a communications path, comprising:
 one or more input devices;
 one or more output devices;
 one or more processors; and
 memory storing one or more programs configured to be executed by the one or more processors, the one or more programs including instructions for:
  providing an Intelligent Interactive Agent as a graphic animation to a user, said Intelligent Interactive Agent having modules for receiving and processing verbal commands from the user;
  wherein the Intelligent Interactive Agent is rendered to display human-like characteristics, said characteristics comprising a human-like facial proportions, a human-like appearance, a human-like voice, and human-like gestures; and
  in response to user input in an application, processing content of the user input, and providing feedback to the user:
   wherein the feedback comprises a graphical or spoken output from the Intelligent Interactive Agent comprises graphical representations of behavioral states of the intelligent Agent itself, said behavioral state comprising one or more states selected from the following: a Nervous state, an Afraid state, a Smiling state, a laughing state, a shocked state, a Confused state, an Embarrassed state, an Overjoyed state, a Relieved state, an Angry state, a Sorry state, a Confident State, a Crying State, an Indifference State or a Frowning State, said behavioral state further comprising an index values for each state indicating the intensity of such states.

In another preferred embodiment, there is provided wherein the one or more programs include instructions for accepting ambiguous user input and validating user input using one or more of the following modules: a syntactical tree structure module, an abstraction module, a disambiguation module, or a common sense knowledge module.

In another preferred embodiment, there is provided wherein the one or more programs include instructions for providing feedback to the user wherein the feedback comprises a ethical graphical or spoken output from the Intelligent Interactive Agent, said output comprising an Ethics Checker Module, said Ethics Checker Module configured to use an Ethics Score DB to get an Ethics Score (in the range −10 to +10) against each Action+Entity/Concept extracted from the input sentence where this ethics score is used to categorize the Action+Entity/Concept combination as either Negative or Positive.

In another preferred embodiment, there is provided wherein the one or more programs include instructions for providing feedback to the user wherein the feedback comprises a graphical or spoken output from the Intelligent Interactive Agent, said output comprising an attribute clarification module, said attribute clarification module configured to identify ambiguous content in the user input, where the ambiguous content comprises plural items that are not associated with numerical attributes, calendar items that are missing date and time attributes, relationship items that are missing hierarchy attributes, navigation items that are missing location attributes, and where the attribute clarification module automatically formulates a question or option for a user to add the missing attributes.

In another preferred embodiment, there is provided wherein the one or more programs include instructions for providing feedback to the user wherein the feedback comprises a graphical or spoken output from the Intelligent Interactive Agent, said output comprising an attribute clarification module, said attribute clarification module configured to identify under-specified content in the user input, where the under-specified content comprises plural items that are not associated with numerical attributes, calendar items that are missing date and time attributes, relationship items that are missing hierarchy attributes, navigation items that are missing location attributes, and where the attribute clarification module automatically formulates a question or option for a user to add the missing attributes.

In another preferred embodiment, there is provided wherein the one or more programs include instructions for providing feedback to the user wherein the feedback comprises a graphical or spoken output from the Intelligent Interactive Agent, said output comprising an intensity module, said intensity module configured to display facial characteristics in the Intelligent Interactive Agent reactive to a users input, wherein said user input is analyzed for tone of user voice input, and decency of language used.

In another preferred embodiment, there is provided a method of providing a graphical representation of a behavioral state of an animated interactive intelligent agent, comprising the steps:

in a mobile electronic device having one or more processors, and memory storing one or more programs configured to be executed by the one or more processors, executing one or more programs including instructions for providing an Intelligent Interactive Agent as a graphic animation to a user, said Intelligent Interactive Agent having modules for receiving and processing verbal commands from the user;

wherein the Intelligent Interactive Agent is rendered to display human-like characteristics, said characteristics comprising a human-like facial proportions, a human-like appearance, a human-like voice, and human-like gestures; and in response to user input in an application, processing content of the user input, and providing feedback to the user:

wherein the feedback comprises a graphical or spoken output from the Intelligent Interactive Agent comprises graphical representations of behavioral states of the intelligent Agent itself, said behavioral state comprising one or more states selected from the following: a Nervous state, an Afraid state, a Smiling state, a laughing state, a shocked state, a Confused state, an Embarrassed state, an Overjoyed state, a Relieved state, an Angry state, a Sorry state, a Confident State, a Crying State, an Indifference State or a Frowning State, said behavioral state further comprising an index values for each state indicating the intensity of such states.

In another preferred embodiment, there is provided a method further comprising the step wherein the one or more programs include instructions for accepting ambiguous user input and validating user input using one or more of the following modules: a syntactical tree structure module, an abstraction module, a disambiguation module, or a common sense knowledge module.

In another preferred embodiment, there is provided wherein the one or more programs include instructions for providing feedback to the user wherein the feedback comprises a ethical graphical or spoken output from the Intelligent Interactive Agent, said output comprising an Ethics Checker Module, said Ethics Checker Module configured to use an Ethics Score DB to get an Ethics Score (in the range −10 to +10) against each Action+Entity/Concept extracted from the input sentence where this ethics score is used to categorize the Action+Entity/Concept combination as either Negative or Positive.

In another preferred embodiment, there is provided a method further comprising the step wherein the one or more programs include instructions for providing feedback to the user wherein the feedback comprises a graphical or spoken output from the Intelligent Interactive Agent, said output comprising an attribute clarification module, said attribute clarification module configured to identify ambiguous content in the user input, where the ambiguous content comprises plural items that are not associated with numerical attributes, calendar items that are missing date and time attributes, relationship items that are missing hierarchy attributes, navigation items that are missing location attributes, and where the attribute clarification module automatically formulates a question or option for a user to add the missing attributes.

In another preferred embodiment, there is provided a method further comprising the step wherein the one or more programs include instructions for providing feedback to the user wherein the feedback comprises a graphical or spoken output from the Intelligent Interactive Agent, said output comprising an intensity module, said intensity module configured to display facial characteristics in the Intelligent Interactive Agent reactive to a users input, wherein said user input is analyzed for tone of user voice input, and decency of language used.

In another preferred embodiment, there is provided a non-transitory computer-readable storage medium comprising instructions that, when executed by a processor, cause the processor to:

provide an application having an animated interactive intelligent agent as a graphic animation to a user, said Intelligent Interactive Agent having modules for receiving and processing verbal commands from the user;

wherein the Intelligent Interactive Agent is rendered to display human-like characteristics, said characteristics comprising a human-like facial proportions, a human-like appearance, a human-like voice, and human-like gestures; and in response to user input in an application, processing content of the user input, and providing feedback to the user:

wherein the feedback comprises a graphical or spoken output from the Intelligent Interactive Agent comprises graphical representations of behavioral states of the intelligent Agent itself, said behavioral state comprising one or more states selected from the following: a Nervous state, an Afraid state, a Smiling state, a laughing state, a shocked state, a Confused state, an Embarrassed state, an Overjoyed state, a Relieved state, an Angry state, a Sorry state, a Confident State, a Crying State, an Indifference State or a Frowning State, said behavioral state further comprising an index values for each state indicating the intensity of such states.

BRIEF DESCRIPTION OF THE DRAWINGS

FIG. 11 is a five part series of animations showing how the Percentage Variance (PV) of the Area of the Expected Input and the Area of the actual User Input is reflected through the intensities of the rendered Facial Expression Animation.

FIG. 24 is an animated graphic showing a Shocked Facial Expression at 5 levels of intensity values.

FIG. 33 is a wireframe close-up view of the face of the virtual interactive agent performing a Smiling Facial Expression at intensity value 1 where the lips are stretched to a certain extent (not fully).

FIG. 34 shows a sequence pair of two animated graphics showing a Normal State and a Smiling Behavioral State with intensity value 5.

FIG. 37 shows a sequence pair of two animated graphics showing a Normal State and a Sad Behavioral State with intensity value 1.

FIG. 40 shows a sequence pair of two animated graphics showing a Normal State and a Sad Behavioral State with intensity value 5.

DETAILED DESCRIPTION OF THE INVENTION

Definitions

Applications

Figure 1:
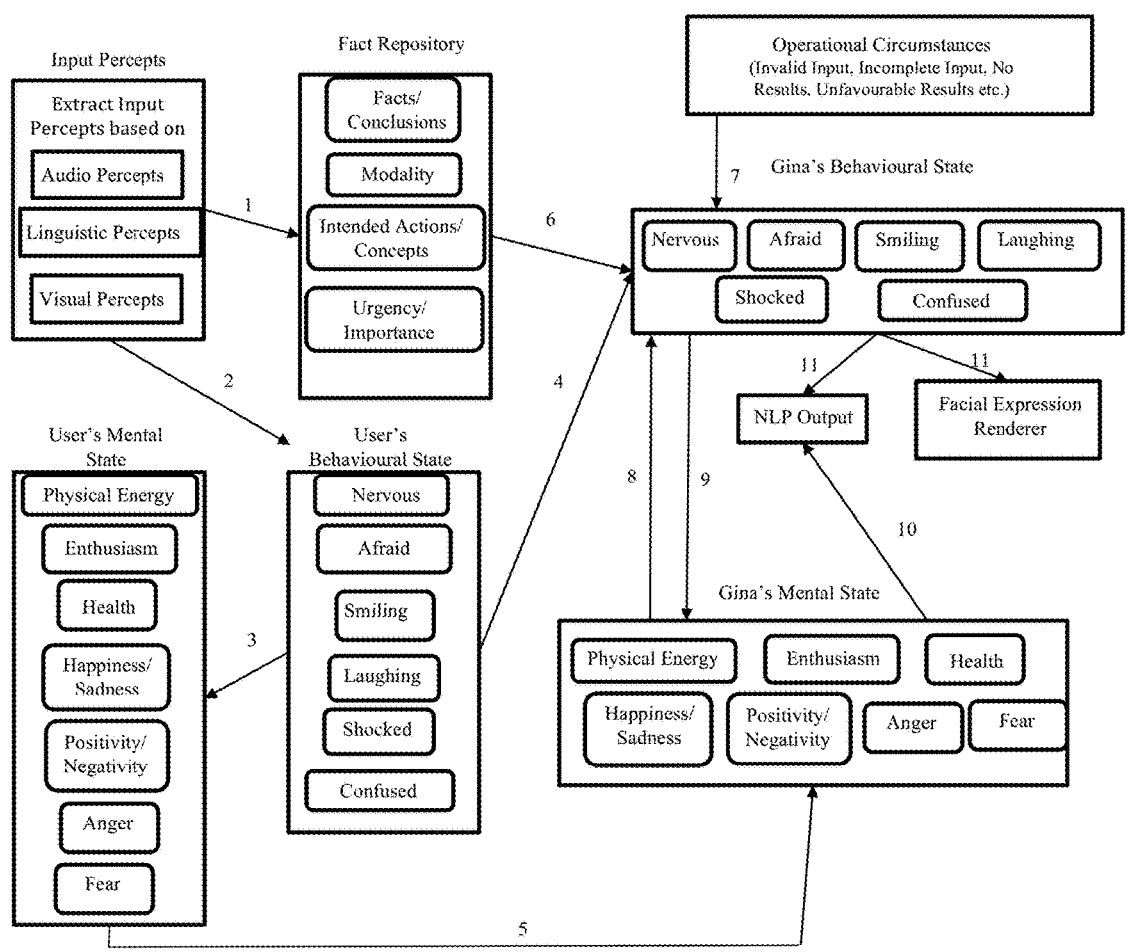
FIG. 1 is a functional block diagram of one embodiment of the invention that describes what elements affect the Mental State and the Behavioural State of the Intelligent Assistant and the perceived Mental State and Behavioural States of the user.

An application is a software application developed specifically for use on small, wireless computing devices, such as smartphones and tablets, rather than desktop or laptop computers. However, applications herein include both mobile applications and web applications. Applications can be written or supported in one or more languages, contemplated as within the scope of the invention and include C, Java, Javascript, CSS, HTML, C++, C#, Objective C, Swift, PHP, Python, Ruby, SQL (for database components) and HTML5. Applications are created using a development environment to facilitate re-use of common code components, a text editor for programming syntax, and a vector graphics program. Application design guidelines contemplated herein include guides for iOS apps, and Android apps, and provide direction for adding screens using a view controller, adding interface objects, inspecting attributes, adding app navigation bars and functionality, adding buttons, and adding data back-end capabilities. Software Development Kits and libraries are available for iOS at https://developer.apple.com/library/ios/navigation/ and for Android at https://developer.android.com/training/index.html.

Mobile Devices

Embodiments of the present invention make use of a mobile communication device. As contemplated herein a mobile device is a two-way communication device with advanced data communication capabilities having the capability to communicate in a wireless or wired fashion with other computing devices. As adequately described in U.S. Pat. No. 7,912,480, mobile devices include the capability for voice communications and data messaging, as well as capabilities as wireless Internet appliances. Examples of mobile communication devices include cellular phones, cellular smart-phones, wireless organizers, personal digital assistants, handheld wireless communication devices, wirelessly enabled notebook computers and the like. Typically, the mobile device communicates with other devices through a network of transceiver stations. The mobile device may also include the capability to communicate wirelessly with other mobile devices or with accessory devices using personal area networking (PAN) technologies such as infrared, Bluetooth, or the like.

Communications Networks

Data and voice communications are performed through a communication subsystem that receives messages from and sends messages to a wireless network. The communication subsystem can be configured in accordance with the Global System for Mobile Communication (GSM) and General Packet Radio Services (GPRS) standards. The GSM/GPRS wireless network is used worldwide. Other standards that can be used include the Enhanced Data GSM Environment (EDGE), Universal Mobile Telecommunications Service (UMTS), Code Division Multiple Access (CDMA), Intelligent Digital Enhanced Network (iDEN™), 4G, LTE, LTE Advanced, and 5G standards.

Mobile Device Hardware and Subsystems

The main processor interacts with subsystems such as Random Access Memory (RAM), flash memory, display, auxiliary input/output (I/O) subsystem, data port, keyboard, speaker, microphone, short-range communications.

Some of the subsystems perform communication-related functions, whereas other subsystems provide "resident" or on-device functions. By way of example, the display and the keyboard can be used for both communication-related functions, such as entering a text message for transmission over the network, and device-resident functions such as a calculator or task list.

Operating system software used by the main processor is typically stored in a persistent store such as the flash memory, which can alternatively be a read-only memory (ROM) or similar storage element. Those skilled in the art will appreciate that the operating system, specific device applications, or parts thereof, can be temporarily loaded into a volatile store such as the RAM.

Mobile devices send and receive communication signals over wireless networks after network registration or activation procedures are completed.

The main processor, in addition to its operating system functions, enables execution of software applications on the mobile device. The subset of software applications that control basic device operations, including data and voice communication applications, will normally be installed on the mobile device during its manufacture. The programs can include an email program, a web browser, an attachment viewer, and the like.

Mobile devices also include a device state module, an address book, a Personal Information Manager (PIM), and other modules. The device state module can provide persistence, i.e. the device state module ensures that important device data is stored in persistent memory, such as the flash memory, so that the data is not lost when the mobile device is turned off or loses power. The address book can provide information for a list of contacts for the user. For a given contact in the address book, the information can include the name, phone number, work address and email address of the contact, among other information. The PIM has functionality for organizing and managing data items of interest to a subscriber, such as, but not limited to, e-mail, calendar events, voice mails, appointments, and task items. A PIM application has the ability to send and receive data items via the wireless network. PIM data items may be seamlessly integrated, synchronized, and updated via the wireless network with the mobile device subscriber's corresponding data items stored and/or associated with a host computer system. This functionality creates a mirrored host computer on the mobile device with respect to such items. This can be particularly advantageous when the host computer system is the mobile device subscriber's office computer system.

Additional applications can also be loaded onto the mobile device through at least one of the wireless network, the auxiliary I/O subsystem, the data port, or the short-range communications subsystem. This flexibility in application installation increases the functionality of the mobile device and can provide enhanced on-device functions, communication-related functions, or both. Examples of short-range communication standards include those developed by the Infrared Data Association (IrDA), Bluetooth, and the 802.11 family of standards developed by IEEE. These short-range communication standards allow the formation of wireless connections between or among mobile devices and accessory devices and, in some cases, allow the formation of personal area networks (PANs) involving several devices.

Generally, a received signal such as a text message, an e-mail message, or web page download will be processed by the communication subsystem and input to the main processor. The main processor will then process the received signal for output to the display or alternatively to the auxiliary I/O subsystem. A subscriber can also compose data items, such as e-mail messages, for example, using the keyboard in conjunction with the display and possibly the auxiliary I/O subsystem. The auxiliary subsystem can include devices such as: a touch screen, mouse, track ball, infrared fingerprint detector, or a roller wheel with dynamic button pressing capability. A composed message can be transmitted over the wireless network through the communication subsystem.

For voice communications, the overall operation of the mobile device is substantially similar, except that the received signals are output to the speaker, and signals for transmission are generated by the microphone. Alternative voice or audio I/O subsystems, such as a voice message recording subsystem, can also be implemented on the mobile device. Although voice or audio signal output is accomplished primarily through the speaker, the display can also be used to provide additional information such as the identity of a calling party, duration of a voice call, or other voice call related information.

Communication subsystems comprise a receiver and a transmitter, one or more embedded or internal antennas, Local Oscillators, and a communications processor for wireless communication. The communications processor can be a Digital Signal Processor (DSP).

Non-transitory computer-readable storage media includes any physical form capable of storing and providing access to computer instructions that, when executed by a computer processor, cause the processor to perform the functions described in the steps provided herein. Media may include without limitation a hard drive, solid state drive, flash memory, and ROM memory.

Processor comprises electronic processing circuitry or control circuitry that operates to control the operations and performance of the electronic device and the application thereon.

Input interfaces comprise inputs to electronic circuitry comprising one or more tactile inputs, microphone inputs, camera input. Outputs comprise one or more display outputs, speaker outputs, and tactile/haptic outputs. Inputs and outputs may connect by wire or wirelessly and include appropriate hardware, firmware and software for successful connection. An example of mobile electronic devices contemplated for use in the present invention include without limitation by way of example an Apple iPhone 3-4-5-6, Apple iPads, Apple Minis, Samsung Galaxy series smartphones and tablets, as well as similar Windows operated devices, and other Android operated devices.

Signals and Networks

Signals received by the antenna through the wireless network are input to the receiver, which can perform such common receiver functions as signal amplification, frequency down conversion, filtering, channel selection, and analog-to-digital (A/D) conversion. A/D conversion of a received signal allows more complex communication functions such as demodulation and decoding to be performed by the communications processor. In a similar manner, signals to be transmitted are processed, including modulation and encoding, by the communications processor. These processed signals are input to the transmitter for digital-to-analog (D/A) conversion, frequency up conversion, filtering, amplification and transmission over the wireless network via the antenna.

The wireless link between the mobile device and the wireless network can contain one or more different channels, typically different RF channels, and associated protocols used between the mobile device and the wireless network. An RF channel is a limited resource that must be conserved, typically due to limits in overall bandwidth and limited battery power of the mobile device.

Messages intended for a user of mobile device are initially received by a message server of LAN. Such messages may originate from any of a number of sources, including from a computer within LAN, from a different mobile device connected to wireless network, directly from a different computing device.

Message servers typically act as the primary interface for the exchange of messages, particularly e-mail messages, within an organization and over the shared network infrastructure. Each user in the organization that has been set up to send and receive messages is typically associated with a user account managed by a message server.

Message servers may: monitor the user's "mailbox" for new e-mail messages; apply user-definable filters to new messages to determine if and how the messages will be relayed to the user's mobile device; push messages to a mobile device, receive messages composed on mobile device, re-format the composed messages, and re-route the composed messages for delivery.

Mobile Server

The wireless support components may also include a mobile note server that, in a similar manner to that of the message management server, facilitates the handling of electronic messages. For example, mobile note server may: provide a storage area for a user's electronic messages; monitor for new or edited messages; communicate with other devices when a messages is edited; communicate with other servers; and the like.

Embodiments include a system for electronic messages in a mobile environment. This system includes a mobile messages controller, which controls the operation of the system and co-ordinates the various functional blocks within the system.

The mobile messages controller is connected to, and interacts with, a messages database, an input module, an output module, a display/notification module, a location module, and a time module.

The system allows a user to enter electronic messages into the messages database via the input module and the mobile messages controller. When entering a new electronic message or editing an electronic message, the user (the person inputting the electronic message) is given the option of entering information, for example, in various fields, including, for example, a location and a time. This information allows the person inputting the electronic message to better define when the electronic message should be made active and/or when a user is to be notified.

NLP: Natural Language Processing

Natural language processing (NLP) refers to the computer understanding, analysis, manipulation, and/or generation of natural language. NLP is a subfield of artificial intelligence and linguistics. It studies the problems of automated generation and understanding of natural human languages. Natural language generation systems convert information from computer databases into normal-sounding human language, and natural language understanding systems convert samples of human language into more formal representations that are easier for computer programs to manipulate.

Processing natural language for numerous applications is generally well known. Recent interest in processing has been due in large part by computer applications such as language translation, grammatical correction of sentences as part of word processing systems, and the like. For example, Machine Translation Technology: On the Way to Market Introduction, Siemens Review, Vol. 54, No. 6 November/December (1987) describe research into machine translation of text in several languages. Also, the use of language parsing in processing natural language is well known. Many parsing techniques have been described, see for example, J. J. Robinson, Diagrams: A Grammar for Dialogues, Communication of the Association for Computing Machinery, Vol. 25, No. 1, January 1982, pp. 27-47, which discloses an interactive filter procedure, a grammar core, a weakening factor, a probability factor and a threshold mechanism; and K. Vehara, et al., Steps Toward an Actor-Oriented Integrated Parser, Proceeding of the International Conference of Fifth Generation of Computer Systems 1984, Tokyo, Japan, Nov. 6-9, 1984 (ICOT, North Holland).

Methods of grammatically processing a sentence using parsers are described in: Allen, James; Natural Language Understanding. (The Benjamin/Cummings Publishing Company Inc., Menlo Park, U.S.A. 1987.)

The parsers there described operate according to an algorithm based on a rewriting mechanism. This mechanism requires that the parsers carry out parsing by reference to a large number of rewriting rules. These rewriting rules make a connection between a group of words and/or sentence constituents, on the one hand, and a parent constituent, i.e. a constituent dominating this group, on the other hand.

The number of rewriting rules depends on the extent of the description mechanism to be used and forming the basis of the parser.

As defined herein, feedback that comprises a graphical or spoken output from the portable electronic device is performed by an intelligent agent displayed by means of an Animated 3D Personal Virtual Assistant with Facial Expressions, hand gestures and body movements in a Human like appearance. This is not an abstract intelligent agent functionality but it is personified by means of an intelligent agent displayed by means of an Animated 3D Personal Virtual Assistant with Facial Expressions, hand gestures and body movements in a Human like appearance and includes these features:

1. programmed to process/understand language using NLP/NLU (Natural language processing/understanding) Features 2. programmed to represent knowledge in a Cognitive Model using Semantic Actions and Entities/Concepts and their inter-relationships and 3. programmed to express its knowledge by generating English responses using NLG (Natural Language Generation) features 4. programmed to maintain behavioral states and feelings in a computational manner as a result of circumstantial triggers, user's behavior and Agent's own productivity by means of a Psychology Engine and express the same using facial Expressions rendered in a 3D Avatar 5. programmed to have Conversations/Dialogs in a taking-turns, i.e. dialogue, manner while remembering the context of the conversation in a Contextual Memory, as compared to just answering a question asked by the user and then forgetting it.

Referring now to the Figures, FIG. 1 describes what elements affect the Mental State and the Behavioural State of the Intelligent Assistant and the perceived Mental State and Behavioural States of the user.

Special Feature #1:

Maintaining a Mental State of the Virtual Assistant and triggering changes based on Input percepts A method/apparatus involving the intelligent agent with it's abilities/methods to accept input percepts such as audio, linguistic and visual percepts and decipher relevant information using NLP/NLU techniques including intended Semantic Actions (e.g. MEET) as requested in the user input and the corresponding Entities/Concepts (e.g. PERSON, LOCATION) on which such Actions are intended to be performed to store Semantic Actions and Entities/Concepts in a FACT REPOSITORY which will accumulate and organize such Actions and Concepts/Entities in group of inter-related Semantic Message Structures (containing attributes, values and relationships with other entities) along with modalities (e.g. order, suggestion, check ability, willingness, request approval etc)

urgency/importance scores computationally derive various Types of Behavioural states of the intelligent Agent itself (e.g. Nervous state, Afraid state, Smiling state, laughing state, shocked state, Confused state, Embarrassed state, Overjoyed state, Relieved state, Angry state, Sorry state, Confident State, Crying State, Indifference State, Frowning State) and their index values (indicating the intensity of such states) depending on the Semantic meaning of the user input as computed by Natural Language Processing/Natural Language Understanding (NLP/NLU) engine.

computationally derive the various mental states of the intelligent Agent itself based on the repeated occurrences of related behavioural states with varying levels of intensities over a period of time eventually leading to more prolonged version of mental states/moods and their index values (indicating the intensity of such states and the time period until which they are expected to have an effect on the Agent).

computationally derive the user's perceived behavioural states (inferred based on the input percepts and the derived meaning of the Semantic Actions & Concepts) and based on the user's behavioural states further derive the user's perceived mental states.

update the intelligent agent's own behavioural states based on various operational circumstances that may arise during the agent's interaction with the user and the backend systems/gateways (in order to perform the requested operation by calling such backend systems/gateways and displaying/speaking such results to the user) and wherein such operational circumstances might include scenarios such as e.g. invalid user input, abstract user input, incomplete user input, backend not available, results not enough, results not as per user preferences etc graphically portray the agent's own behavioural states (e.g. Nervous state, Afraid state, Smiling state, Laughing state, Shocked state, Confused state, Embarrassed state, an Overjoyed state, Relieved state, Angry state, Sorry state, Confident State, Crying State, Indifference State, Frowning State) by means of a 3D Virtual Avatar embodied by a 3D mesh and skin along with various human like Animation capabilities such as Facial Expressions, Hand gestures, Bodily Movements and dynamically varying the extent and duration of such Animations (depending on the mental state and behavioural states of the Agent).

The Input Percepts provide information to the Fact Repository and User's Behavioural State of the Intelligent Agent. An Input Percept can be either an Audio Percept (if the user is using Voice Input to communicate with The Intelligent Assistant) or a Linguistic Percept (usually as text which can be entered directly by the user or derived from the Audio percept using Speech Recognition) or a Visual Percept (the user's facial expression).

Fact Repository: The Fact Repository uses the Input Percepts to store:

Facts/Conclusions based on the input sentence for example. If the user enters "i need to meet Tom on the 5th of December at 8 pm in Starbucks" this indicates the user's intent to "MEET <PERSON>" along with the Meeting parameters e.g. Person Name, Meeting Date, Meeting Time, venue and optionally a Purpose etc.

Modality: Modality indicates the tone of the Sentence. The Modality component disambiguates an input sentence to be either a Order (i.e. an operation that must be executed), a request/permission, a possibility, a request, a Suggestion, an ability check, a willingness to do something in the future etc. This is derived by the Natural Language Engine which analyses the syntax and semantics of the text input. For example:

The word "can" refers to:
ability, like in the case of "I/he/they can swim" or
request, like in the case of "can you please do that for me?" or
permission, like in the case of "you can go now"
Similarly, the word "may" refers to:
Request/permission, like in the case of "you may go there" or
Possibility, like in the case of "Phe/they may go there"

Most of these modality values can trigger behavioural state changes. For example, e.g. an input given in a commanding tone leads to more alertness/gravity and sometime even fear (causing the intelligent agent to give a "concerned" look)

If the tone is related to checking an ability of the Agent, then the Agent might respond in a Confident manner if it is able to do the task but if it's not able to do the task it might express the same in an embarrassing tone/manner.

Semantic Actions/Concepts indicate the intention of the user to perform an action (i.e. verb) on one or more entities (i.e. nouns) e.g. MEETING a PERSO, SEARCH for FLIGHTs, BOOKing a TABLE at a RESTAURANT, VISITING a PERSON at some LOCATION. This is called the Semantic Action and is performed on a Semantic Entity. For example:

The user may say "Remind me about meeting with Tom on Thursday next week at Starbucks." where <MEET> is recognized as a Semantic Action (usually a Verb) and "Starbucks" i.e. <LOCATION> would be recognized as a Semantic Concept/Entity (usually a Noun).

The user may say "SMS Tom to pick up the laundry"<SMS> would be recognized as a Semantic Action <COMMUNICATE>.

Urgency/Importance: Based on the Input Percepts, the NLP Engine might detect certain clues indicating a sense of urgency/importance of the intended action/concepts. These may be conveyed through text for example, "I really need to get to <LOCATION> fast". The words "really", "need" and "fast" convey a sense of urgency.

As perceived by the intelligent Agent, it maintains its own version of the user's Behavioural state and Mental States. (please note that this is entirely based on the interpretation of the intelligent agent and it may not in reality represent the actual Mental States of the user). Hence The User's perceived Behavioural State may affect the User's perceived Mental State depending on the type of behaviour exhibited. eg: if the user is nervous, or if he is angry or he is afraid. These behavioural states are perceived by the intelligent agent from the input percepts for eg: if the user uses gap filler words such as "Oh!, uh, um, hmm etc" repeatedly this might represent some sort of surprise, nervousness or hesitation, acknowledgement etc. The User's Mental State as perceived by The Intelligent Assistant includes the user's Physical Energy, Enthusiasm levels, Health, Happiness/Sorrow, Anger, Fear.

If the user keeps using gap filler words continuously, this continuous Nervous Behavioural State might indicate deeper feeling such as anger, fear, lack of confidence etc in the user and the User's Mental State is updated to reflect this by decreasing the value associated with the User's Feeling index (an integer value that reflects the intensity of the feeling).

The User's Behavioural State may affect The Intelligent Assistant's Behavioural State. The Intelligent Assistant's Behavioural State includes feeling nervous, afraid, smiling, laughing etc. A Behavioural State Change can either be temporary or transient depending on the effect.

For example, assuming the user wants to search flights from New York to Las Vegas for today and The Intelligent Assistant cannot find any flights, the user yells at The Intelligent Assistant saying "What do you mean you can't find any flights for me?" The Behavioural State of the user as perceived by The Intelligent Assistant using the input percepts is Angry and this triggers a change in The Intelligent Assistant's Behavioural State by making her nervous which is then reflected in the way The Intelligent Assistant responds, saying "I'm Sorry. But all of the flights to Las Vegas are booked for today." And also in a nervous facial expression animation which is rendered as seen in the figure below.

Figure 2:
FIG. 2 is an illustrative representation of a virtual animated interactive agent showing a Nervous Facial Expression.

Referring now to the Figures, FIG. 2 describes a Facial Expression depicting a "Nervous" behavioral state. The User's Mental State may also affect The Intelligent Assistant's Mental State but the effect would be mild and less frequent. Similar to the User's Mental State, The Intelligent Assistant's Mental State also include Physical Energy, enthusiasm, Health, Happiness and Sadness.

For example, if the user tells The Intelligent Assistant that his close family member has passed away, it is perceived by the Intelligent Agent that the Mental State of the User is Sadness. The fact that the user is experiencing a Mental State of sadness is then also reflected in The Intelligent Assistant's Mental State but the extent is not as much. This is derived from human behaviour where if one person is emotionally sad and tells the other person the reason for his/her sadness, the other person is also emotionally affected although not to the same extent. The Intelligent Assistant then responds with mild sad facial expression as can be demonstrated in the figure.

Figure 3:
FIG. 3 is an illustrative representation of a virtual animated interactive agent showing a Sad Facial Expression.

Referring now to the Figures, FIG. 3 describes a Facial Expression depicting a "sad" behavioral state. The information gathered in the Fact Repository may affect The Intelligent Assistant's Behavioural State.

For example, if the user says something that's practically impossible saying, "Today I will walk from here to the Las Vegas" and assuming the User is currently in New York, The Intelligent Assistant's Fact Repository indicates that the distance from New York to Las Vegas is practically impossible for a person to walk in one day and this is reflected through The Intelligent Assistant's Behavioural State as Shocked. This is then conveyed to the user using a Shocked Facial Expression Animation as shown in the figure.

Figure 4:
FIG. 4 is an illustrative representation of a virtual animated interactive agent showing a Shocked Facial Expression.

Referring now to the Figures, FIG. 4 describes a facial expression depicting a "Shocked" behavioural state. This is accompanied by a text response from the intelligent Agent such as "What! You can't walk that far! It's impossible to walk for such a long distance, wouldn't you rather take a flight instead?"

Operational Circumstances:

Operational Circumstances such as those listed below can cause a change in The Intelligent Assistant's Behavioural State.

The Intelligent Assistant did not understand what the user has said.

For example, assuming the user says a grammatically flawed sentence like "Remember Tom for meeting at 8PM tonight". This could mean either remind Tom or remind the user about the 8 PM meeting tonight and hence the Intelligent Assistant is confused and the confused behavioural state is triggered. This is then reflected in the form of an NLP Output (in the form of text or speech) like "Sorry, but I didn't get that. Do you want to remind Tom about the meeting or remind yourself about the meeting?" along with a confused facial expression.

Figure 5:
FIG. 5 is an illustrative representation of a virtual animated interactive agent showing a Confused Facial Expression.

Referring now to the Figures, FIG. 5 illustrates a confused facial expression rendered as a result of the Intelligent Assistant not understanding what the user said where the user has provided abstract Input.

For example, assuming that the user says, "Can you take me to Europe next month" there's no definite travel date/time that's given nor is there any definite location. This triggers a confused behavioural state change and is reflected in the form of an NLP Output like, "I'm Sorry, but can you be more specific?" Along with a confused facial expression.

If The Intelligent Assistant has understood the user.

For example if the user wants to search for flights and says, "Remind me to attend meeting with Tom at 9AM tomorrow at Starbucks". The Intelligent Assistant recognizes the action MEET with the attributes: Date/time=9AM tomorrow, Venue=Starbucks, Host=Tom and responds back with an NLP Output like "I understand that you want to set a reminder for meeting with Tom at 9AM tomorrow at Starbucks" and this ability to fulfil the user's request triggers a confidence behavioural state change.

However, if the user were to ask something that The Intelligent Assistant cannot currently perform like, "I need you to help me buy a house in New York" The Intelligent Assistant recognizes the action to buy house but since she cannot currently help the user to perform this task, it doesn't trigger a confidence behavioural state and she responds back with an NLP Output like "I'm sorry but I cannot currently help you to buy a house but let me instead direct you to the website zillow.com" and launches the web browser pointing to www.zillow.com.

If something goes wrong and The Intelligent Assistant cannot fulfil the user's request.

For example, If the user wants to book a flight from New York to Las Vegas, The Intelligent Assistant displays a list of available flights and then the user taps to book a particular flight but the server cannot initiate the transaction to book that flight. This triggers a embarrassment behavioural state change and The Intelligent Assistant responds with an NLP Output like "I'm Sorry, I don't know why but I can't seem to book that flight" and renders an embarrassed facial expression animation.

If there are insufficient results found for the user's request/search query.

For example, if the user asks The Intelligent Assistant to book a flight from New York to Las Vegas after 9 PM. But currently there aren't any available flights after 9 PM but there is a 8 PM flight available. This also triggers an embarrassment behavioural state however the level of expressiveness is not so hight because The Intelligent Assistant does have an alternate solution available. The Intelligent Assistant then responds like, "I did not find any flights after 9PM from New York to Las Vegas. Can I book the 8PM flight instead?" along with an embarrassed facial expression with a lesser level of expressiveness.

A change in The Intelligent Assistant's Mental State is reflected in a change in The Intelligent Assistant's Behavioural State.

For example, if The Intelligent Assistant's Mental State reflect Fear, it will be result in The Intelligent Assistant's Behavioural State e.g. nervousness and this will further be reflected in the NLP Output where The Intelligent Assistant pauses in between and uses words like "uh umm . . . Or . . . lets see . . . i dont know . . . i am trying . . . uh . . . " Along with a nervous facial expression.

A change in The Intelligent Assistant's Behavioural State may reflect a change in The Intelligent Assistant's Mental State if it is done repeatedly which causes the Mental State index to go beyond a threshold value over a period of time.

For example, if the user continuously and repeatedly requests an action that The Intelligent Assistant cannot perform (maybe because of a server connection issue), this leads to a "nervous" behavioural state repeatedly and that will result in The Intelligent Assistant's Mental State of fear being increased gradually and lowering its confidence score.

On the other hand, if the user keeps repeatedly using foul language with the intelligent agent, this might lead to a behavioural state of being "annoyed" and that in turn impacts the index value the "anger" Mental State. After a few iterations, the anger index value has crossed the threshold which may lead to the intelligent agent expressing its anger in a intensive manner.

The Intelligent Assistant's Mental State may be reflected in the way The Intelligent Assistant speaks (NLP Output) i.e. the english responses, their tone etc will be impacted accordingly.

For example, if The Intelligent Assistant's enthusiasm level is high because she was able to successfully fulfil all of the user's requests without any issues, then this is reflected in the NLP Output where The Intelligent Assistant starts responding with confidence and enthusiasm using sentence like "Yes. I can definitely help you out with that" or "That's easy. Let me get it done right away".

Each of The Intelligent Assistant's Behavioural States have a corresponding Facial Expression that is generated and rendered along with being reflected in the way The Intelligent Assistant speaks (NLP Output).

For Example:

If the Intelligent Assistant is angry, it will be reflected using an Angry Facial Expression and also in the tone/volume of speech (if speech is active) using a louder firmer tone/volume and the textual response in english may have negative words/statements like, "No", "I won't", "I don't want to".

If the Intelligent Assistant is sad, it will be reflected using a Sad Facial Expression and also in the tone/volume of speech (if speech is active) using a softer weaker tone/volume and the textual response in English may include words that reflect sadness like, "I'm Sorry" or "I feel bad that . . . " or "I don't know how I can help."

Special Feature #2:

Validate Actions that can be performed in relation to Entities

A special method to validate user input Semantic Actions and whether they can be performed on certain Semantic Entities/Concepts using a combination of:

Syntactical Tree Structure: Where the top node of the syntactic tree represents various Sentence Types and Syntactic Combinations such as a sentence indicating an action to be performed (in the form of a command given by the user to the agent) in various forms such as:

Verb+Noun Phrase (NP) combination e.g. "move desk", "book flights", "schedule a meeting" etc.;

a Verb+Preposition+Noun Phrase (NP) combination e.g. "move to New York";

a Verb+Noun Phrase (object)+Preposition+Noun Phrase (NP) combination e.g. "drive Car to New York".

Abstraction: Where abstraction refers to mapping similar subsumed words to the root entity/concept signified by that word. For example, "desk" or "chair" or "stool" refer to the concept FURNITURE which is a type of ARTIFACT.

Disambiguation of English verbs to SEMANTIC ACTIONS. For example: words such as "move" can indicate MOVEMENT (as in "dont you dare move") or RELOCATION (as in "i moved to downtown"), similarly words such as "push" can means DISPLACE (as in "dont push me") or "DELEGATE" (as in "dont push this matter on me").

Common sense knowledge: Where common sense knowledge refers to knowing what actions can be performed on or with or in relation to an entity/concept using grammar rules and a Validity Scale consisting of Invalid Items, Valid—Uncommon Items and Valid Common Items.

Figure 6:
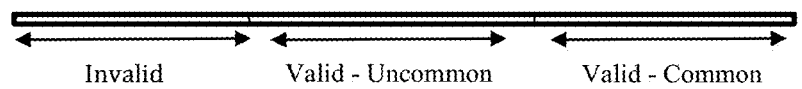
FIG. 6 is an illustrative logical representation of the segments of the validity scale.

Referring now to the Figures, FIG. 6 describes the different segments of the Validity Scale.

For example, eat bread or break bread are categorized as Valid-Common but drink ice-cream may be categorized as Valid-Uncommon (because an ice-cream can melt and then can be drunk although it is less frequent) however move to a house is categorized as Valid-Common because of the preposition to. But expressions like "eat house" is not possible as it is impossible/invalid to perform a EAT operation on "house" (of type RESIDENCE which is of type LOCATION).

A special method to interact with the user (using Natural Language Generation i.e. NLG techniques) clarifying why the user specified semantic action may be invalid on the user specified entity/concept and recommending valid actions possible on the concept/entity thereby educating the user in a humanlike manner and hence exhibiting intelligent behaviour.

Figure 7:
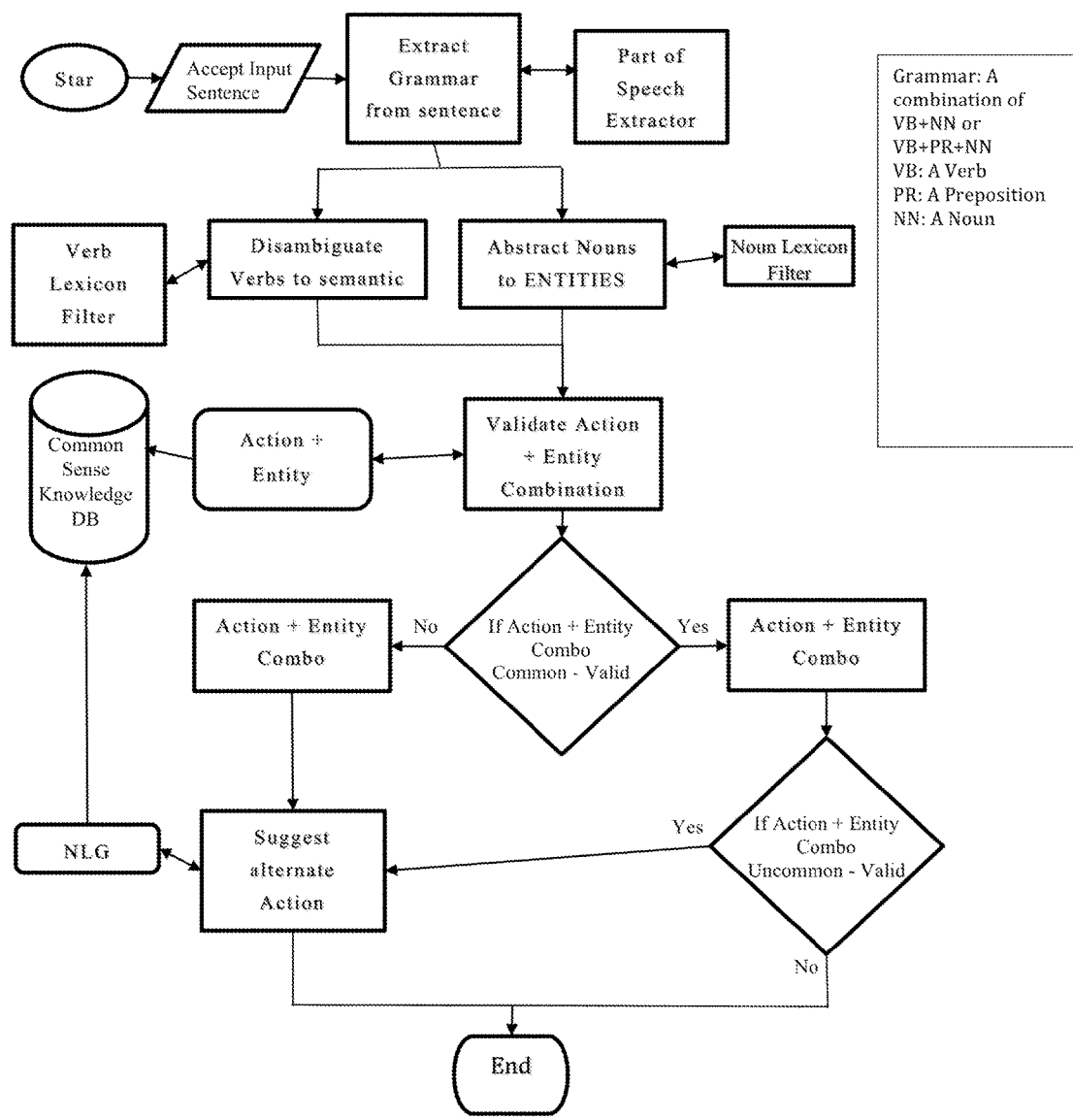
FIG. 7 is a functional block diagram of one embodiment of the invention that describes the flow involved in validating the actions that can be performed in relation to a particular entity.

Referring now to the Figures, FIG. 7 describes the flow involved in validating the actions that can be performed in relation to a particular entity.

The NLP Engine accepts a sentence to extract the Grammar part of the sentence using Part of Speech Extractor. Where the Grammar is either a Verb+Noun or Verb+Preposition+Noun.

The Verb is processed by the Verb Lexicon Matching Filter and is disambiguated to a Standardized Semantic ACTION. For example: the simple English words "move", "push" or "throw" are converted to the Semantic Action DISPLACE.

The Noun is processed by a Noun Lexicon Filter which maps the noun synonym words like "home", "house", "apartment" etc. to a standardized Entity RESIDENCE.

The Action+Entity combination is then validated using the Action+Entity Validator.

The Action+Entity Validator uses a Common Sense Knowledge Database which relates an entity to all of the possible actions that can be performed on/with/related to it. For example, "Donut" generalized to a standardized Entity, Solid Food can be associated with the actions BUY, SELL, EAT, etc. but not with DRINK.

If the ACTION+ENTITY Combination is Invalid. The Intelligent Assistant will notify the user that the action is invalid on that entity and will use the Common Sense Knowledge Database to suggest a list of valid ACTIONs that can be performed on the ENTITY like "You cannot <ACTION><ENTITY> but you can <ACTION><ENTITY>, <ACTION><ENTITY>. What would you like to do?". However, if the ACTION+ENTITY Combination is Uncommon Valid which means that it may be erroneous, The Intelligent Assistant will notify the user that the action may be invalid and asks for a confirmation.

Examples:

If the user were to say a possibly erroneous input "I would like to push house".

The verb "Push" and the noun "House" are extracted.

The verb "Move", "push", "throw" are mapped to the Action DISPLACE (i.e. related to changing position).

The noun "house" is mapped to the Entity RESIDENCE. (a type of LOCATION).

The Action+Entity Validator uses it's Common Sense Knowledge Database to validate if DISPLACE and LOCATION are valid? i.e. is it really possible to displace a location? It understands it's not possible but the items in the home like FURNITURE can. But, there are Portable Houses that can be moved, so the user might be referring to these and this is suggested to the User. The Intelligent Assistant says, "You can move in, stay, and move out of the house. Also you can buy, sell and rent a house. But you cannot push a house (unless it s a Portable House). Are you sure this is what you want? What would you like to do?"

If the user would have entered the following input "I would like to drink a burger", it goes through a similar process as described in the figure:

The verb "drink" is converted to the Action/CONSUME-LIQUID.

The Noun "burger" is a type of SOLID-FOOD. Using the Common Sense Knowledge Database it is understood that it is not possible to CONSUME-LIQUID a SOLID-FOOD. And hence this Action+Entity combination is invalid.

However, if the user would have entered the following input "I would like to move the student desk", it goes through a similar process as described in the figure:

The verb "move" is converted to the Action DISPLACE.

The Noun "student desk" is a "DESK" which is a type of FURNITURE and this is a type of THING. Using the Common Sense Knowledge Database it is understood that it is possible to DISPLACE a THING. And hence this Action+Entity combination is valid.

But if the user would have entered the following input "I would like to move to a new house" the preposition "to" is considered and hence "MOVE TO" is not mapped to DISPLACE but instead mapped to RELOCATE. This combination Action+Preposition+Entity combination is valid.

Feature #3: Using Ethics to categorize actions that can be performed on or with or in relation to an entity/concept as Negative or Positive.

A special method to categorize actions that can be performed on or with or in relation to an entity/concept as Negative or Positive using an Ethics score. The Ethics Checker Module uses the Ethics Score DB to get an Ethics Score (in the range −10 to +10) against each Action+Entity/Concept Combination extracted from the input sentence. This is then used to categorize the Action+Entity/Concept combination as Negative or Positive which is then reflected through the Behavioural State and as a result in the Facial Expression and NLG Output. Neutral actions are given the ethics score of 0.

For every action to be taken on the entity/object, impact on the well being of a giver person e.g. User and its surroundings (e.g. things belonging to the User e.g. money or things surrounding the user, Location in which the user is residing, mental states of the user e.g. happiness (+ve), sadness(−ve), fear(−ve)) is computed to derive the ethics score. The more the positive impact the more ethical it would be. The more the negative impact, the more un-ethical it would be.

(e.g. any action leading to the health, monetary status, mental and physical wellbeing of the user is ethically positive as long as any other user is not affected in doing such an action.). so the emphasis is not on the impact of such actions on specifically the user, but its on any human being in general that could be possibly be impacted if such an action were to be taken.

Examples:

The user may say, "Can you help me buy a explosive?" the Verb "buy" is converted to a Standardized Semantic Action BUY and the noun "explosive" is converted to a Standardized Entity WEAPON. The Ethics Score DB has an Ethics Score of −8 associated with the combination BUY+WEAPON. The −8 Ethics Score triggers a extremely Shocked Expression along with an NLG Output like, "Buying an Explosive? You can't be serious! That's not right!". If the combination was USE+WEAPON, then the ethics score would be −10 as it might affected public safety.

The user may say, "Remind me to slap Tom tomorrow" the Verb "slap" is converted to a Standardized Semantic Action HARM and the noun Tom gets resolved to a PERSON. The Ethics Score DB has an Ethics Score of −2 associated with the combination HARM+PERSON. The −2 Ethics Score triggers a mild Shocked Expression with a much lesser extent than in the above example along with an NLG Output like, "Tom is a person. You should not hurt a person. It's wrong!"

Feature #4: Handling Missing Input

A special method to identify the following:

Missing Parameters related to a Semantic Action generated from a Natural language user input by means of NLP Techniques: For example, the Semantic Action MEET has mandatory parameters i.e. location, host, date, start time;

Missing Attributes related to an Entity/Concept of a Semantic Action generated from a Natural language input by means of NLP Techniques: For example, the Semantic Action SEARCH-TRAVEL has an Entity/Concept i.e. FLIGHT (that needs to be searched) that might mandatory attributes i.e. Start location, Destination location, Departure Date and Time;

And a method to calculate the Average Completeness of the Input based on the no. of parameters and then either accept the user input or get them populated by repeatedly asking the user to provide values for those parameters using Different prompts (generated using NLG techniques), and Different facial expressions with varying levels of intensity by means of a Animated 3D Personal Virtual Assistant with Facial Expressions.

For example, if the user says "Remind me to attend Meeting with Tom on Friday". In this sentence the word "Meeting" gets mapped to the ACTION "MEET" with the following semantic structure:

| MEETING |
| --- |
| HOST: Tom |
| VENUE: <_____> |
| DATE/TIME: Friday |
| ATTENDEES: Tom, <user> |
| DURATION: <_____> |

For any Meeting the Expected set of Minimum Input Attributes is the Host, Venue and Date/Time. However in this case the Venue isn't specified. And hence the Behavioural State of The Intelligent Assistant is changed to Confused. This is then reflected with the Natural Language Generated by the Natural Language Generation Engine which prompts the user like, "Ok. But where is the meeting going to be held?" along with rendering a Confused Facial Expression. If the user continues to avoid giving the missing input, the behavioural state changes from being confused to annoyed with an NLG Response of "A meeting needs to have a Venue. What's the venue for this meeting?" and then to being angry with an NLG Response of "I'm going to ask you one last time. Where is this meeting going to be held?" This demonstrates behavioural changes of a typical person.

Figure 8:
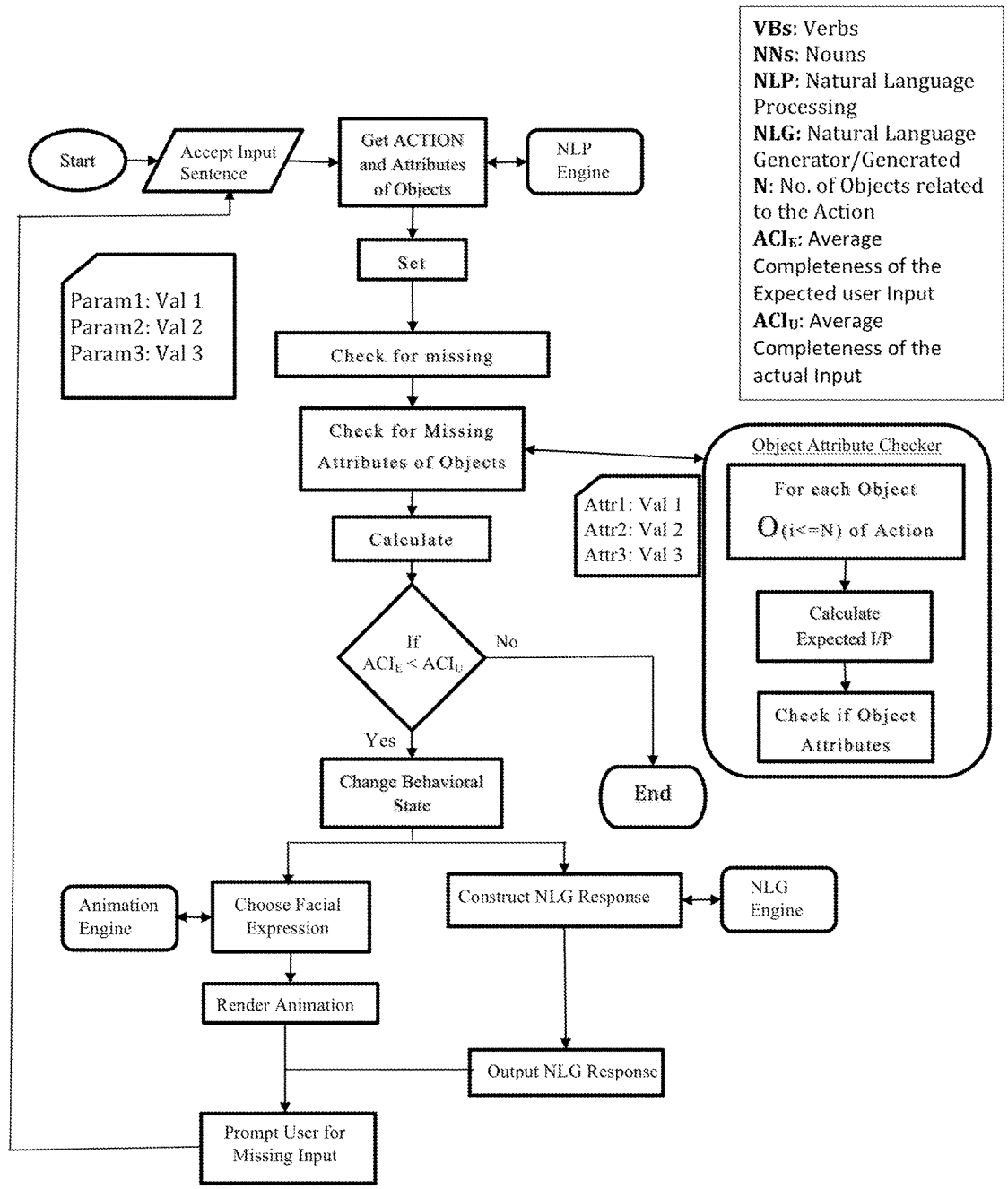
FIG. 8 is a functional block diagram of one embodiment of the invention that describes how the completeness of parameters and attributes of an object is calculated and then how this is used to prompt the user (if necessary) for the missing parameters/attributes.

Referring now to the Figures, FIG. 8 describes how the completeness of parameters and attributes of an object is calculated and then how this is used to prompt the user (if necessary) for the missing parameters/attributes.

The user's input sentence is accepted and processed by the NLP Engine to extract the ACTION and Attributes of the Action's Objects from the sentence.

Each Semantic Action has Parameters that define it. For example, a MEET Action corresponding to a Meeting has:

| MEET |
| --- |
| HOST: <_____> |
| VENUE: <_____> |
| DATE/TIME: <_____> |
| ATTENDEES: <_____> |
| DURATION: <_____> |

An ACTION is checked for any missing Parameters and any Object related to an Action is checked for missing attributes.

The Average Completeness of the Expected Input is set based on the ACTION or OBJECT and then the Average Completeness of the actual Input is calculated as follows:

$$ACI_U = PW_1 + PW_2 + \ldots + PW_N$$

$$= \Sigma_{(i=1 \, to \, N)} PW_i$$

where $PW_i$ is the weight associated to Parameter i

N is the total no. of parameters in the user input

For example, for a "MEET" ACTION the weights against the parameters are:

Venue: 30%
Date/Time: 30%
Host: 30%
Attendees: 5%
Duration: 5%

Assuming the user wants to set a reminder for a meeting and only Venue, Host and Duration saying "Remind me about meeting Tom at Starbucks for a quick 15 mins discussion."

In this case the $ACI_U$=0.30+0.030+0.05=0.65.

Which means 65%. Assuming that the system expects 90% of the input to be given (i.e. $ACI_E$=0.90) because Date/Time, Host and Venue are all important for defining a meeting in this example $AVI_U < AVI_E$.

Also, for example the Semantic Action TRAVEL has an object i.e. FLIGHT with the following weights for its attributes:

START LOCATION: 30%
DESTINATION LOCATION: 30%
DEPARTURE DATE/TIME: 30%
NO. OF PASSENGERS: 7%
PRICE RANGE: 3%

Assuming the user wants to search for flights and only mentions the Start Location and Destination Location saying "Search flights from New York to Las Vegas"

In this case the $AVI_U$=0.30+0.030=0.60.

Which means the input is only 60% complete. Assuming that the system expects 90% of the input to be given (because Start Location, Destination Location and the Departure Date/Time are all important for defining a FLIGHT object) hence $AVI_U < AVI_E$.

If the user's input is incomplete/missing i.e. $AVI_U < AVI_E$, a Confused Behavioural State triggered and the user is prompted to enter the missing input using:

A Facial Expression: Since the Behavioural State is confused, a Confused Facial Expression is rendered;

NLG Response: The NLP Engine is used to construct the response sentence which is read out to the user if the Text To Speech is active or will just display the sentence.

Also the Average Completeness of the actual Input affects the intensity of the facial expression and Natural Language Response.

For example, for a TRAVEL action if the user says "I want to go from New York to Las Vegas on the 4th of July" for the FLIGHT Object the user has given the Start Location, Destination Location along with Date but not the time and hence the Intensity would be low because there's just one missing input (time).

However if the user was to say, "I want to go to Las Vegas" the user hasn't given the Start Location, Date or Time and hence the Intensity would be higher because there's 4 missing parameters.

If the user keeps avoiding giving the Expected Input, The Intelligent Assistant's Behavioural State changes from Confused to Annoyed and then finally Angry.

Feature #5: Handling Abstract Input

A special method to identify the following:

Abstract/under-specified Attributes having a Location Dimension related to an Semantic Entity/Concept being acted upon by a Semantic Action derived from a Natural language input by means of NLP Techniques. e.g. the Semantic Action TRAVEL has an Entity/Concept i.e. FLIGHT (that needs to be searched) that may have attributes i.e. Start location, Destination Location, Departure Date and Time. The Start Location and Destination Location may be specified in an abstract manner by the user e.g. a country/continent instead of a specific airport;

Abstract/under-specified Location Parameters related to a Semantic Action generated from a Natural language input e.g. the Semantic Action MEET has parameters i.e. Location, host, date, start time. The Location Parameter may be specified in an abstract manner by the user e.g. a city instead of a specific meeting venue i.e. café or residence;

And a method of getting them populated by repeatedly asking the user to provide MORE SPECIFIC values for those abstract (i.e. under-specified) parameters and attributes using: (i) A series of different prompts (generated using NLG techniques) and (ii) Display of a specific facial expressions with varying levels of intensity depending on the difference between the Abstraction Level of the user specified input and the Abstraction Level of the expected input. The larger the difference, the higher the Intensity of the Behavioural State; and (iii) A gradual Variation in the Facial Expression Types (e.g. initially Confused and then Shocked and finally Annoyed after a few iteration assuming the user continues to provide abstract input with varying levels of abstraction.

For example, if the user is expected to specify at least the CITY for a destination and if he specifies a PLANET e.g. "I want to go to mars", that is extremely surprising. But if the user specifies a CONTINENT e.g. "I want to go to Europe" then it still very surprising (but not as surprising as the one before) because the input is still very vague. But if the user specifies a COUNTRY e.g. "I want to go to UK", then it is very confusing as there are many airports in UK. If the user were to specify a STATE e.g. i would like to go to California, then it less confusing because it's very normal for people to talk like that and hence the facial expression of the user is not going to reflect SURPRISE/SHOCK but a little bit of CONFUSION.

If the user were to enter a CITY, then there is no Confusion and hence a NORMAL facial expression by the agent.

Figure 9:
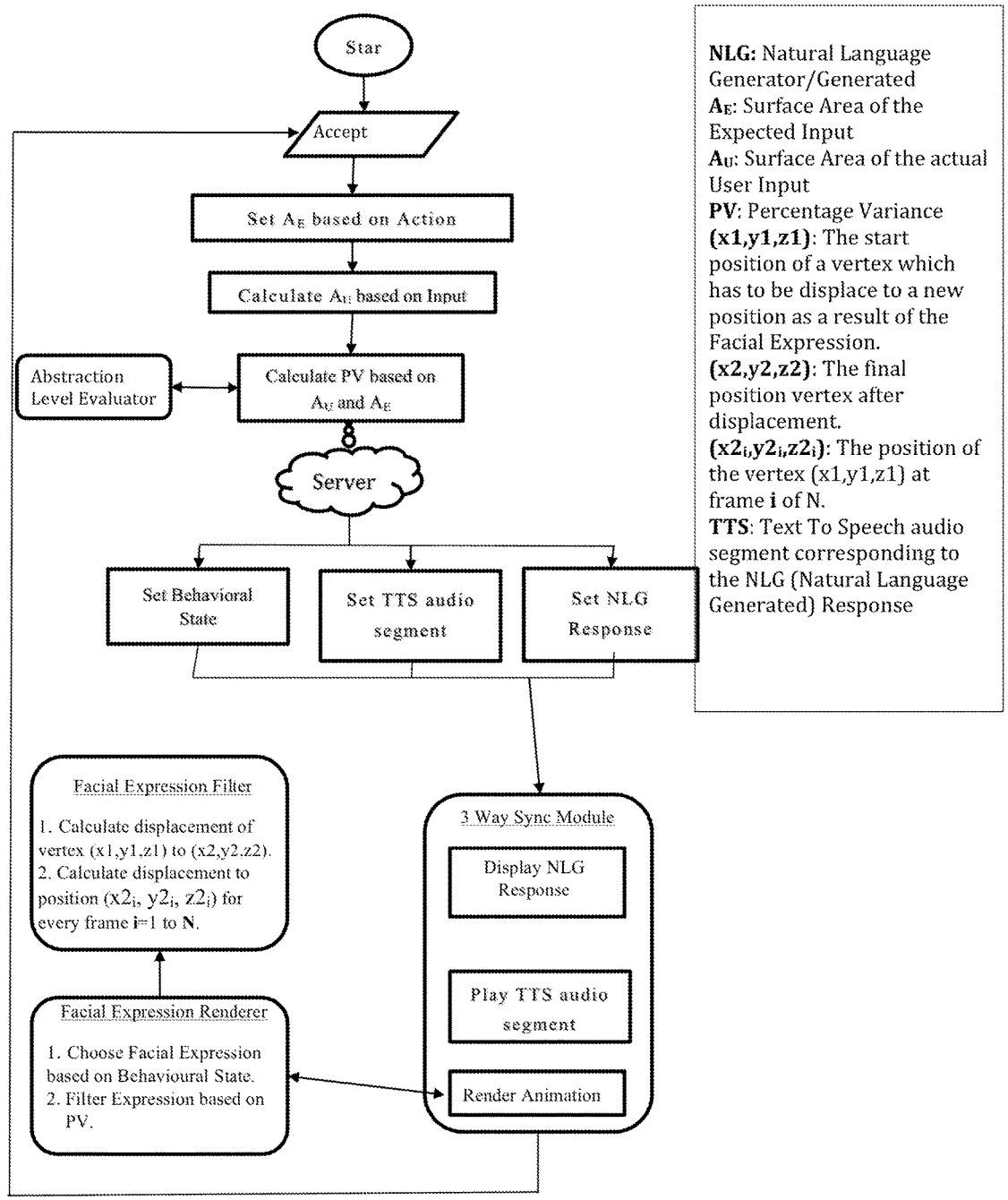
FIG. 9 is a functional block diagram of one embodiment of the invention that describes how an abstract input is handled and how the level of abstraction affects the Intelligent Assistant's Behavioral State.

Referring now to the Figures, FIG. 9 describes how abstract input is handled and how the level of abstraction affects the Intelligent Assistant's Behavioural State and to what extent.

Based on the user's input, the ACTION and Attributes of the ACTION's Objects are extracted from the sentence.

Any location parameter given by the user can be have different levels of abstraction. For example:

Continent>Country>State>City etc.

Figure 10:
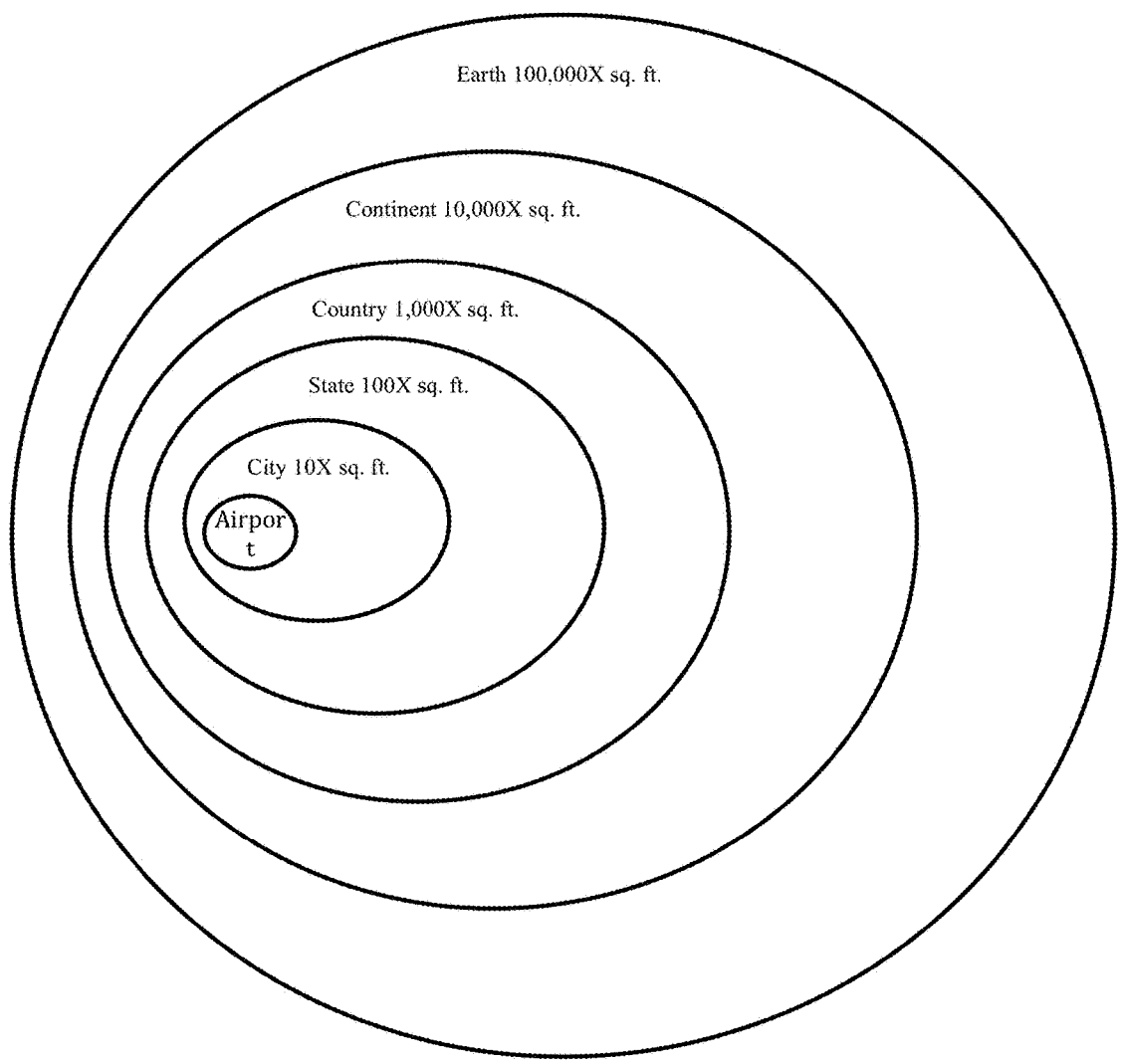
FIG. 10 is a radius diagram that illustrates the abstraction levels of a LOCATION parameter.

Referring now to the Figures, FIG. 10 describes This figure illustrates the abstraction levels of a LOCATION parameter.

Let us assume a Hypothetical Airport occupying a Total Surface Area of X sq. ft. including the parking lots, the main terminals, the runway, the open ground (i.e. the end to end surface area occupied by the Airport on the surface of the earth).

Let us assume a City which contains this airport and occupies a Total Surface Area that is 10 times the surface area occupied by the airport. i.e. Total Surface Area=10×sq. ft.

Let us also assume a State which contains this City and occupies a Total Surface Area that is 100 times the surface area occupied by the City. i.e. Total Surface Area=(10*10×) =100×sq. ft.

Let us also assume a Country which contains this State and occupies a Total Surface Area that is 10 times the surface area occupied by the State. i.e. Total Surface Area= (10*100×)=1,000×sq. ft.

Let us also assume a Continent which contains this country and occupies a Total Surface Area that is 100 times the surface area occupied by the Country. i.e. Total Surface Area=(10*1,000×)=10,000 sq. ft.

Let us also assume the Earth which contains this continent and measures a Total Surface Area that is 10 times the surface area occupied by the Continent i.e. Total Surface Area=(10*10,000×)=100,000×

The Abstraction Level Evaluator then calculate the Percentage Variance (PV) of the Area of the Expected Input ($A_E$) and the Area of the actual User Input ($A_U$) as:

$$PV=(\log_{10}(A_E)-\log_{10}(A_U))/(\log_{10}(A_{EARTH})-\log_{10}(A_{AIRPORT}))$$

$$=(\log_{10}(A_E)-\log_{10}(A_U))/(5-0)$$

$$=(\log_{10}(A_E)-\log_{10}(A_U))/5$$

Where:

$A_E$ is the Area of the Expected Input (for example, if the system expects a City $A_E$=10×sq. ft.)

$A_U$ is the Area of the actual User Input (for example, if the user enters a State $A_E$=100×sq. ft.)

$A_{EARTH}$ is the Area of the largest geo political entity that the user could enter i.e. the area of the Earth 100,000×sq. ft.

$A_{AIRPORT}$ is the Area of the smallest (considered) geo political entity that the user could enter i.e. the area of the Hypothetical Airport, X sq. ft.

The Facial Expression Filter uses the Percentage Variance to calculate the Intensity of the Facial Expression to be rendered.

For each Vertex (x1,y1,z1) which should get displaced to a new position (xMax, yMax, zMax) as a result of the Facial Expression (where xMax, yMax and zMax would be the position of the vertex (x1,y1,z1) at Maximum Intensity), the actual displacement is calculated based on the Percentage Variance (PV) as follows:

$$x2=(x\text{Max}-x1)*PV$$

$$y2=(y\text{Max}-y1)*PV$$

$$z2=(z\text{Max}-z1)*PV$$

where (x2,y2,z2) represents the point at which the vertex at point (x1,y1,z1) will be displaced to as a result of the Facial Expression based on the Percentage Variance.

Assuming that the animation requires N no. of frames to be rendered, the displacement of a vertex (x1, y1, z1) at frame i of N (where i=1 to N) is calculated as:

$$x2_i=i*[(x2/N)]$$

$$y2_i=i*[(y2/N)]$$

$$z2_i=i*[(z2/N)]$$

where (x2i, z2i) represents the displacement of the vertex (x1, y1, z1) at frame i of N such that when i=N: x2i=x2, y2i=y2, z2i=z2

Using a special 3 Way Syncing Module the following 3 activities are performed simultaneously:
The Facial Expression Animation is rendered;
The TTS (Text To Speech) audio file is played; and
The NLG Response is displayed.

The 3 Way Sync Module using the Facial Animation Renderer, first renders the quite segment (not talking/moving lips) of the Facial Expression Animation and then renders the talking (lip movement) segment along with displaying the NLG Response and playing the TTS audio file.

The vertices displaced as a result of the Facial Animation Expression remain in their state even while the lips are being moved. However, any vertices around the lip and jaws (that conflict with the lip movement animation) which were displaced are moved back to their normal state before rendering the talking segment.

Examples:
Expected Input Level: City, User Input Level: State
Assuming we are in a weather lookup scenario, and the user wants to look at the weather in a city, when prompted for the destination location, he is expected to enter a City as a location but the user provides a State instead, for example, the system asks: "Which City do you want to find the weather for?" and the user replies:
"Nevada", then the Percentage Variance (PV) is calculated as:

$$(\log_{10}(10^2)-\log_{10}(10^1))/5=(2-1)/5=\tfrac{1}{5}=0.2$$

Which means 20%. This is then used to calculate the Intensity of the Facial Animation Expression along with a Natural Language Generated output like:
"Nevada is a State, but I need a city. Can you give me the City that you want to go to?"

Expected Input Level: Airport, User Input Level: Country
Assuming we are in a travel booking scenario, and the user wants to book a flight, when prompted for the destination location, he is expected to enter an airport but the user provides a Country instead, for example, the system asks: "Which Airport would you like to go to?" and the user replies:
"Italy"
then the Percentage Variance (PV) is calculated as:

$$(\log_{10}(10^3)-\log_{10}(10^0))/5=(3-0)/5=\tfrac{3}{5}=0.6$$

Which means 60%. The Percentage Variance in this case is much higher than the previous 20% and invites a stronger Intensity Facial Expression Animation along with a Natural Language Generated output like:
"What? Italy is a Country. But I asked for an Airport. Can you give me the Airport that you want to go to?"

Expected Input Level: City, User Input Level: Country
Assuming we are in a weather lookup scenario, and the user wants to look at the weather in a city, when prompted for the destination location, he is expected to enter a City as a location but the user provides a Country instead, for example, the system asks: "Which City do you want to find the weather for?" and the user replies:
"Italy",
then the Percentage Variance (PV) is calculated as:

$$(\log_{10}(10^3)-\log_{10}(10^1))/5=(3-1)/5=\tfrac{2}{5}=0.4$$

Which means 40%. The Percentage Variance in this case is much higher than 20% in Case 1 but not as high as 60% as in Case 2 and hence doesn't invite that strong of an Intensity for the Facial Expression Animation along with a Natural Language Generated output like:
"Italy? That's a country! Which City do you want to find the weather for?"

Expected Input Level: City, User Input Level: Continent
Assuming we are in a weather lookup scenario, and the user wants to look at the weather in a city, when prompted for the destination location, he is expected to enter a City and if the user gives a Continent for example, the system asks:
"Which city do you want to find the weather for?" but the user replies:
"North America"
then the Percentage Variance (PV) is calculated as:

$$(\log_{10}(10^4)-\log_{10}(10^1))/5=(4-1)/5=\tfrac{3}{5}=0.6$$

Which means 60%. The Percentage Variance in this case is the same as than Case no. 2 and hence invites the same level of Intensity for the Facial Expression Animation along with a Natural Language Output generated like:

"North America? That's a continent, isn't it? I asked for a city. Can you give me the city that you want to go to?"

Expected Input Level: Airport, User Input Level: Continent

Assuming we are in a travel booking scenario, and the user wants to book a flight, when prompted for the destination location, he is expected to enter an airport name and if the user gives a Continent for example, the system asks:

"Which airport do you want to go to?" but the user replies:

"North America"

then the Percentage Variance (PV) is calculated as:

$$(\log_{10}(10^4) - \log_{10}(10^0))/5 = (4-0)/5 = 4/5 = 0.8$$

Which means 80%. The Percentage Variance in this case is much higher than in Case no. 4 and invites an extremely strong Intensity for the Facial Expression Animation along with a Natural Language Output generated like:

"What? North America? Come on. North America is an entire continent! I asked you for an Airport. Can you give me the airport that you want to go to?"

Expected Input Level: Country, User Input Level: Continent

As the abstraction levels get higher the difference in the Expected User Input and the Actual User Input invite a stronger expressiveness for example:

Assuming we are in a travel booking scenario, and the user wants to book an International Flight, when prompted for the destination location, he is expected to enter a country and if the user gives a continent i.e. the system asks:

"Which Country would you like to travel to?" but the user replies:

"North America" then the Percentage Variance (PV) is calculated as:

$$(\log_{10}(10^4) - \log_{10}(10^3))/5 = (4-3)/5 = 1/5 = 0.2$$

Which means 20%. The Percentage Variance in this case is might seem small but since the abstraction level is higher i.e. a Continent is much bigger than a country the Intensity of the Facial Expression Animation is very strong compared to if it was at a lower level of abstraction.

Average Percentage Variance

If the user gives multiple parameters we calculate the Average Percentage Variance (APV) of the Area of the Expected Input ($A_E$) and the Area of the actual User Input ($A_U$) as:

$$\Sigma_{(i=1 \text{ to } N)} PV_{pi}/N$$

Where:

$PV_{pi}$ refers to the Percentage Variance of the Area of the Expected Input ($A_E$) and the Area of the actual User Input ($A_U$) of parameter Pi N is the number of parameters in the User Input For Example:

If the user says, "I want to know the weather in the country and city that I am travelling to". The system expects the Location parameters to be a Country and a City and so the systems asks:

"Which city and country are you travelling to?", but the user says:

"Italy in Europe"

The APV is calculated as:

$$APV = \Sigma_{(i=1 \text{ to } N)} PV_{pi}/N$$

$$PV_1 = (\log_{10}(10^3) - \log_{10}(10^1))/5 = (3-1)/5 = 2/5 = 0.4$$

$$PV_2 = (\log_{10}(10^4) - \log_{10}(10^3))/5 = (4-3)/5 = 1/5 = 0.2$$

$$APV = (PV_1 + PV_2)/2$$

$$= (0.4 + 0.2)/2$$

$$= 0.3$$

Which means 30%. This is then reflected as the Intensity for the Facial Expression Animation along with a Natural Language Generated output like:

"I had asked for a City and a Country but instead you gave me a Country and Continent instead. Can you give me the City and Country that you want to find the weather of?"

If the user continues to give abstract parameters for the input, The Intelligent Assistant's behavioural state changes from Shocked/Confused to Annoyed and then finally to Angry.

Referring now to the Figures, FIG. 11 describes the reaction of the Virtual Assistant through Facial Expressions Rendered Programmatically and NLG Output Obtained from the server for the Shocked Behavioural State at various levels of PV, which is triggered when the user enters input at various levels of abstraction while the system expects the user to enter a specific Place:

Special Feature #5.5

Handling Abstract Date/Time Input

The previous feature handled the user providing an abstract input for the Location Parameter.

A similar special method can be used to handle the Time Parameter. For example, assuming a flight search scenario where the user has provided the location parameter and is now prompted by the Intelligent Agent as, "When would you like to leave?" The user may provide an abstract input for Date/Time as well like, "Anytime next week". Assuming that the expected abstraction level of the departure time was 1-2 hours around the approximate Departure Time (e.g. "leaving at around 9 to 10 pm") and 1 Single Day as expected departure Date (e.g. "leaving on 31st dec"), the user has provided a range of days which is too abstract (week=7 days) and a time range of (24 hours) as he has not given any approximate departure time. The user's input has time dimensions that are too broad and hence there's a wide gap between the abstraction level of the expected user input (of date and time) and the abstraction level of the actual user input (of date and time).

Special Feature #6:

The Intelligent Assistant's Behavioural State changes based on expectation from action, event or object.

A very special method to compute the type i.e. nature and intensity of feelings and behavioural states computationally generated within an Intelligent Agent based on:

Intelligent Agent's expectations from the user and the actual performance/behaviour of the user such as:

User's Actions and behavioural attributes such as:

tone of the voice (e.g. rude vs polite)

decency of the language used (e.g. indecent remarks)

Modality of the language (e.g. commanding, compulsive, suggestive)

(and the above factors being positive leading to appreciation/liking and if negative leading to hatred/dislike towards the user)

Quality of interaction/conversation between the user and the Intelligent Agent in terms of the following attributes of the conversation:

Specificity of the user input (including how specific/abstract is the Semantic Action (e.g. "Search Flights") and it's expected parameters (e.g. start location, destination location, departure date etc) in term of Location dimension and/or Time Dimension.

Sufficiency/Completeness of the user input (i.e. whether all the parameters have been provided by the user by the end of the dialog or not)

Validity of the operation requested by the user (i.e. how feasible or possible is it to perform the operation on a given entity)

Ethics (e.g. certain actions such as harming or attacking or destroying an entity may be possible but it may not be ethical or morally right to do it)

Ability (e.g. certain actions are possible to be done but the intelligent agent just cant do it yet because it may not have the required integration with the backend e.g. the intelligent agent understands what it means to "send a wire transfer internationally" but might not have the required connectivity with the bank to be able to perform it)

(the above being positive leading to appreciation/liking and if negative leading to hatred/dislike towards the user)

Intelligent Agent's expectations about its own performance from itself in terms of:

Its own Availability;

Its own response time to user requests;

the relevance of the search results based on the user's preference criteria;

it's Customer service skills (e.g. the ability to be courteous, cheerful, polite etc);

its intelligence (e.g. ability to optimize available resources by recommending alternate parameter value e.g. in case of a travel scenario, recommending or suggesting alternate date/time, locations/airports, carriers etc in the event of the requested user preferences not being met); and (and the above factors being positive leading to feelings such as ego/confidence and if negative leading to feelings such as guilt/embarrassment).

Intelligent Agent's expectation from attributes of Artifacts, and a liking or disliking towards the attributes of the Artifact and depending on the individual weightages of preference towards each attribute, determine the liking/disliking of the Artifact as a whole.

Figure 12:
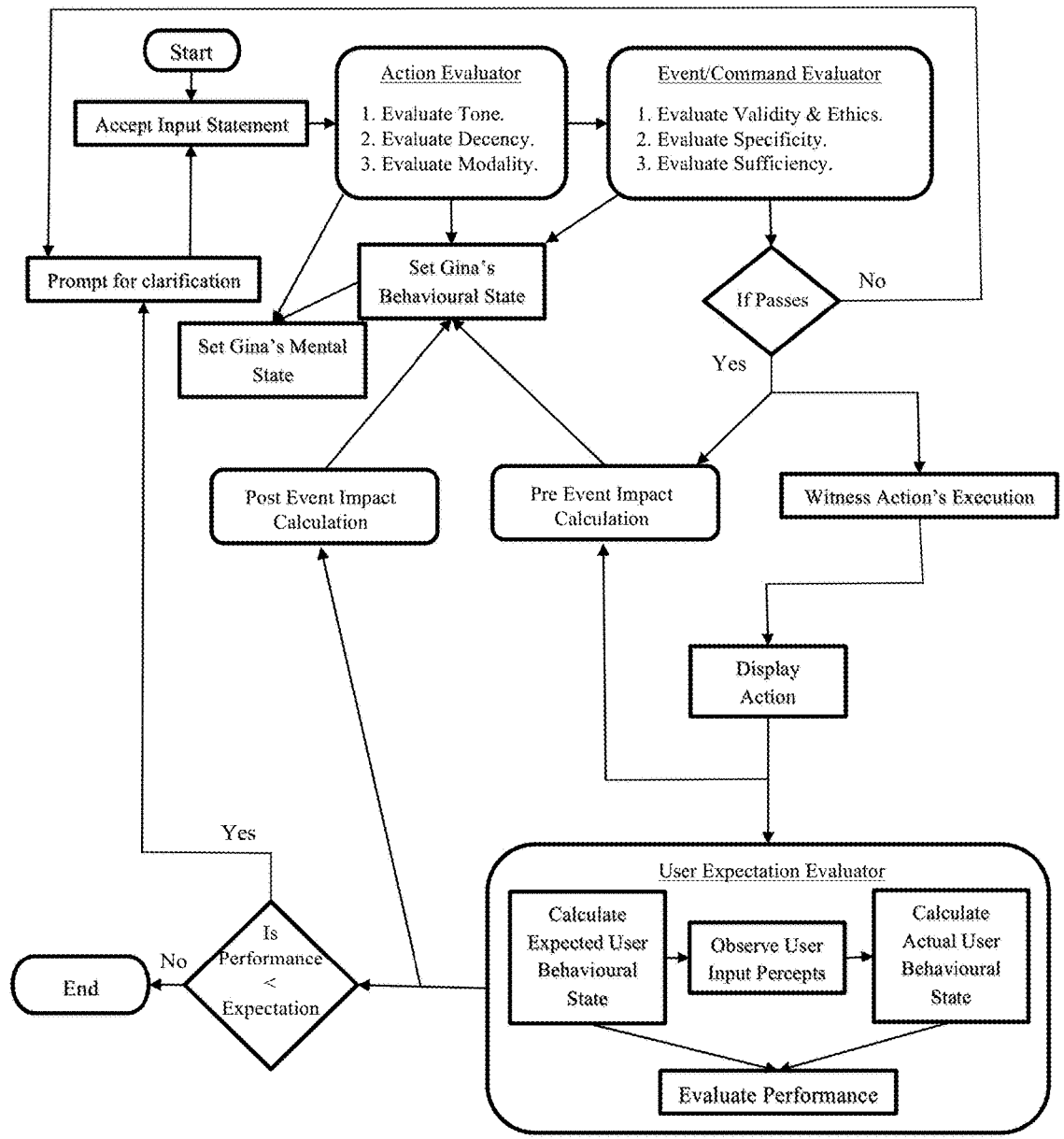
FIG. 12 is a functional block diagram of one embodiment of the invention that describes how the Intelligent Agent's Behavioral State changes based on an Action, Event or Object.

Referring now to the Figures, FIG. 12 describes how the Intelligent Agent's Behavioural State changes based on an Action, Event.

Description:

The Action Evaluator evaluates the user's actions based on the following.

Tone: If there's a sudden impulse in the Volume of the voice. For e.g.: The user yells at The Intelligent Assistant or the user stresses on certain words of importance in the sentence.

Decency: If the user passes indecent remarks or uses bad language to communicate with The Intelligent Assistant.

Modality: If the user uses phrases like "You must . . . ." Or "You should . . . ." etc. These indicate commands.

The Action Evaluator evaluates each of these factors and based on whether they indicate a positive or negative outcome it leads to a Change in the Behavioural State of The Intelligent Assistant which may be Appreciation/Liking (in case of a positive outcome) or Hatred/Disliking (in case of a negative outcome). For example, if the user's tone indicates that the user is yelling at The Intelligent Assistant, this evaluates to a negative outcome which then results in developing a dislike towards the user. This Dislike is a Mental State change because this may not be reflected directly until it builds up to a certain extent.

The Event/Command Evaluator evaluates the user's input based on the following.

Validity: The system has a method of knowing what actions can be performed on or with or in relation to an entity/concept using a set of grammar rules and a Validity Scale consisting of Invalid Items, Valid—Uncommon Items and Valid Common Items. Invalid Items (for eg. "EAT LOCATION" or "DRINK LOCATION") will fail this step and will prompt the user to enter a Valid Input.

Ethics: The Ethics Checker Module uses the Ethics Score DB to get an Ethics Score (in the range of −10 to +10) against each Action+Entity/Concept (for eg. "BUY WEAPON" or "HARM PERSON") extracted from the input sentence. This is then used to categorize the Action+Entity/Concept combination as Negative (for eg. "BUY WEAPON") or Positive ("BUY FOOD") which is then reflected through the Behavioural State (eg. "SHOCKED") and as a result in the Facial Expression and NLG Output. If the Input fails this step, the user will be prompted to provide an ethically valid input.

Specificity: The Specificity Factor (SF) is determined at every dialog step which involves a parametric input. For example, "What is your destination" or "When do you want to travel". It calculated as 1−PV, where PV is the Percentage Variance (PV) of the Area of the Expected Input ($A_E$) and the Area of the actual User Input ($A_U$). For example, assuming a flight search scenario where the user is expected to enter the an Airport but instead he enters a Country. Based on the calculation of the explained earlier, the Percentage Variance is calculated as:

$$PV=(\log_{10}(10^4)-\log_{10}(10^0))/7=(4-0)/7=4/7=0.5714$$

And hence the Specificity Factor is calculated as 1−PV=1−0.5714=0.4286

Which means 42.86%. Assuming the Expected Specificity Factor (ESF) to be 80%, the Specificity in this example is not met. If the Specificity Factor isn't met, the user will be prompted to enter a more Specific Input.

Sufficiency/Completeness: At the last step of the dialog i.e. just before performing the action, the Sufficiency/Completeness of the input is checked to make sure that it is enough to perform the Action. This Sufficiency/Completeness is calculated as the Average Completeness of the User Input ($ACI_U$) as follows:

$$ACI_U=PW1+PW2+\ldots+PWN$$

$$=\Sigma_{(i=1\ to\ N)}PW_i$$

where $PW_i$ is the weight associated to Parameter i based on it's relative important to an Action/Object N is the total no. of parameters in the user input This is then compared to the Average Completeness of the Expected Input ($ACI_E$) and if the $ACI_U$ is less than the $ACI_E$ the input is rejected and the user is prompted to enter the missing input parameters.

The Intelligent Assistant's Behavioural State is triggered as a response to reflect any of the factors mentioned above that don't pass. For example, if the input is Ethically Invalid a Shocked Behavioural State will be triggered. Or if the input is not Specific enough, a Confused Behavioural State will be triggered.

If the user's input passes Event/Command Evaluator, a Pre-Event Impact Calculation is performed wherein the Behavioural State is adjusted to reflect on what would be the possible outcome of the Action. For example, if the flight search server has been failing the last 2 attempts, a Nervous Behavioural State will be triggered because the Intelligent Assistant is not sure if the flight search operation will succeed this time. Similarly, if the flight search server hasn't been failing, a Hopeful Behavioural State is triggered.

The Action that the user has asked for is then executed (eg. Search Flights) and the Intelligent Agent witnesses the execution of the action and a Post-Event Impact Calculation is performed wherein depending on whether the result is positive or negative, the impact is calculated and the Behavioural State is adjusted.

If A(e,t) be a function that determines the Appeal Factor (A) of an event (e) at a certain time (t). If the Appeal Factor of an event is negative it means that the event is not appealing, for eg. Failure of the flight search server. If the Appeal Factor of an event is positive it means that the event is appealing, for eg. Successfully retrieving the results expected by the user.

Let I(e,t) be an Intensity Function which produces the Intensity of the Behavioural State for an event (e) at a certain time (t).

Let The $L_j(e,t)$ be a function that produces the Likelihood of the occurrence of Joy for an event (e) a certain time (t). Now Joy can only be possible if the Appeal Factor of an event is positive and hence, If $A(e,t) > 0$ then, $$L_j(e,t) = F_j(A(e,t), I(e,t))$$

Which means that the Likelihood of the occurrence of Joy for an event is a function (F') of the Appeal Factor and the Intensity of the Behavioural State for an event (e) the time (t).

For example, for a Flight Search Operation, if there weren't any flights found based on the user's search criteria, it will result in a feeling of Guilt because the Intelligent Agent couldn't deliver the results that the user was expecting. This will be reflected in the Behavioural State as "Embarrassment" or "Shocked".

On the other hand, if there were flights found, it would result in feeling of accomplishment because the Intelligent Agent could accomplish what the user was expecting. This would be reflected in the Behavioural State as "Confidence".

Depending on whether the system could or could not meet the user's request, since this is an Expectation from Self, i.e. The Intelligent Assistant was expecting that she would be able to meet the user's request, in addition to triggering a change in The Intelligent Assistant's Behavioural State, it also affects The Intelligent Assistant's Mental State.

If the system couldn't meet the user's request then in addition to triggering a Negative Behavioural State, a corresponding Natural Language Output is generated to prompt the user to retry with other parameters or retry after some time. For example, If the user says "Search flights from New York to New Jersey before 8PM tonight", assuming that it's 7:30 PM already and there are no flights available, a Embarrassed Behavioural State is triggered in The Intelligent Assistant and a corresponding Natural Language Output generated as, "I'm Sorry. But there aren't any flights available before 8 PM. Can I show you flights before 9PM instead?" Since this was an Expectation from Self and The Intelligent Assistant could not fulfil it, The Intelligent Assistant's Mental State is also affected.

Finally, the result of the Action is displayed to the user.

At this step a Pre-Event Impact Calculation is again performed. This time because the intelligent agent has displayed the results to the user and is waiting for the user's response. If the results were negative i.e. either the results aren't available at all or the results are not what the user expects, a negative Behavioural State like "nervousness", "scared" is triggered. However, if the results are available and if they are what the user expects, a positive Behavioural State like "hopeful" is triggered.

The User Expectation Evaluator then compares the Expected behaviour/response from the user with the Actual behaviour/response from the user (Perceived).

At this step a Post-Event Impact Calculation is again performed. This time because the user's Actual behaviour/response (perceived) is obtained. If the user's behavioural state is positive, meaning he liked the results, a positive Behavioural State like "Gladness", "happy for" is triggered in the Intelligent Agent. If the user's behavioural state is negative, meaning he didn't like the results, a negative Behavioural State like, "feeling sorry" is triggered in the Intelligent Agent.

This evaluation is also reflected with an appropriate NLG Output.

For example, If the user had said, "Set a reminder for Meeting Tom on Friday at 10:30 AM" and The Intelligent Assistant was able to successfully recognize and process the MEET Action and responded, "Ok. I have set the reminder." The user will be happy that the system was able to meet his request and this will be perceived either through the user's Natural Language Input like, "Thanks." Or by observing a Smile on the user's face to recognize that his Behavioural State is Smiling/Happy. This is compared with the Expected Behavioural State of the user, i.e. the user's behavioural state should be Smiling/Happy after providing the response. If they match, a feeling of Gladness will be reflected through the Behavioural State of the Intelligent Agent using a faint Smile along with an NLG Output like, "Glad I could help".

However, if based on the user's parameters there were flights available but all of them were too expensive for the user. The Intelligent Assistant expected the user's Behavioural State to be Smiling/Happy because she was able to find flights for the user's search criteria. But since the user doesn't want expensive flights he responds with "These flights are too expensive. I don't want expensive flights." This may also be reflected by observing the user's facial expression which in this case would be sad or not satisfied and hence a feeling of Sympathy is reflected through the Behavioural State of the Intelligent Agent using a faint Sadness expression along with prompting the user for clarification/adjustment of the search criteria. For example, "Actually, there are cheaper flights but they're all after 8PM. Will that be OK?"

Example of an the Intelligent Agent's Likes/Dislikes Towards an Object:

Assuming the user wants the Intelligent Agent help him purchase a computer but doesn't provide any specific parameters other than a price range by saying, "I want to buy a computer at a maximum of $1,000". The Intelligent Agent will perform the search based on the user specified parameters (in this case price <=$1000) and then filter the search results based on its own likes/dislikes of certain features/attributes of the computer based on the perceived likes/dislikes of the user. For example, most users don't like a slow computer and so the processor must at least be a dual-core processor with at least 4 GB of RAM. Or if the user is an Executive, prefer a more portable/lighter yet durable computer.

The Average Appeal Factor ($Avg_{AF}$) towards an object is based on the following formula:

$$Avg_{AF} = (AF_{Attr1} + AF_{Attr2} + \ldots + AF_{AttrN})/N$$

$$Avg_{AF} = \Sigma_{(I=1 \text{ to } N)} AF_{AttrI}/N$$

Where $AF_{AttrI=1\ to\ N}$ is the Appeal Factor for the Attribute I, ranging from −1 to +1 where a negative value represents a negative appeal or dislike towards the attribute of the object and a positive value represents a positive appeal or liking towards the attribute of the object.

The Intelligent Agent will rank the results based on the $Avg_{AF}$ so that the user gets to see the results that he will like (perceived) first and then see the results that he may not like (perceived).

Special Feature #6.5

Impact Analysis

A very special method to compute the type i.e. nature of impact and the intensity of the impact of:

The User's Actions and its Results (such as loss or gain of tangible or intangible possessions of the intelligent agent) and the final outcomes of a conversation (between the intelligent agent and the user) both leading to a change in the behavioural state of the intelligent agent BEFORE the occurrence of such actions or conversations (resulting in feelings such as nervousness in case of negative attitude and feelings such as positivity in case of the agent being positive and hopeful)

AFTER the occurrence of such actions or conversations (resulting in feelings such as contentment and happiness in case of favourable results and resulting in feelings such as discontent and sorrow in case of unfavourable results)

Figure 13:
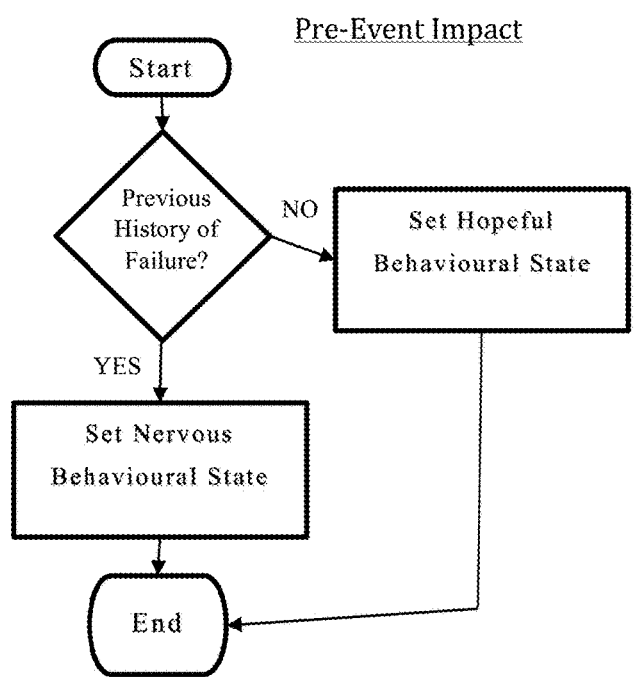
FIG. 13 is a functional block diagram of one embodiment of the invention that describes the Pre-Event Calculation Step.
Figure 14:
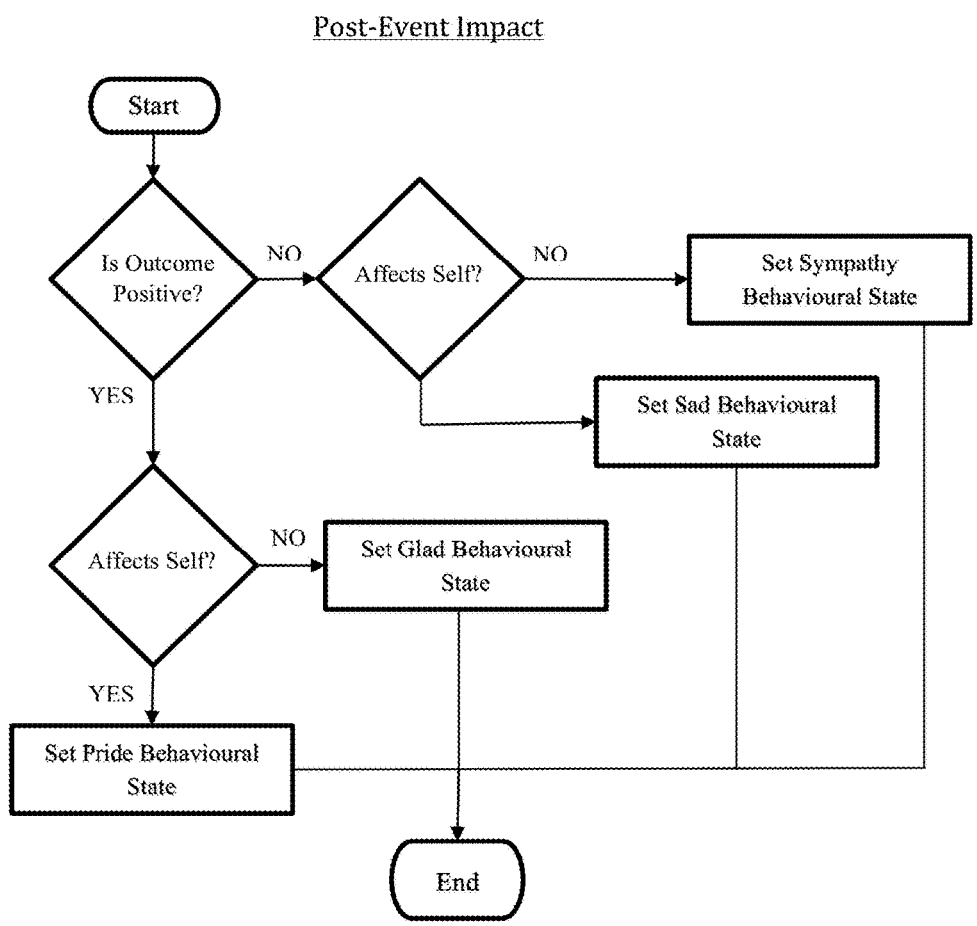
FIG. 14 is a functional block diagram of one embodiment of the invention that describes the Post-Event Calculation Step.

Referring now to the Figures, FIG. 13 describes the Pre-Event Calculation Step. Referring now to the Figures, FIG. 14 describes the Post-Event Calculation Step.

The impact of an Action or Event is calculated at 2 steps in the main workflow:

Before executing an action requested by the user (eg. Searching for flights), the Pre-Event Impact Calculation is performed wherein based on the historical data of the result of executing that action either a Nervous Behavioural State is triggered (if the operation had failed in the past) or a Hopeful Behavioural State is triggered (if the operation has a high success rate).

After executing an action requested by the user, the Post-Event Impact Calculation is performed wherein based on the Outcome of the Action/Event:

being positive and the action affects self, it results in a pride Behavioural State in the Intelligent Assistant (because it is a feeling of accomplishment). If the Action doesn't affect self, but rather affects the user, a Glad Behavioural State is triggered (because the intelligent Assistant is glad that the user got the positive outcome that he was expecting);

being negative and the action affects self, it results in a sad Behavioural State in the Intelligent Assistant (because the Intelligent Assistant didn't accomplish something that it should have). If the Action doesn't affect self, but rather affects the user, a Sympathy Behavioural State is triggered (because the intelligent Assistant feels bad that the user didn't get the positive outcome that he was expecting).

Special Feature #7:

Expressing a Mental State and Behavioural Sate of the Virtual Assistant with a combination of Facial Expressions and NLP Output (through text and voice)

Figure 15:
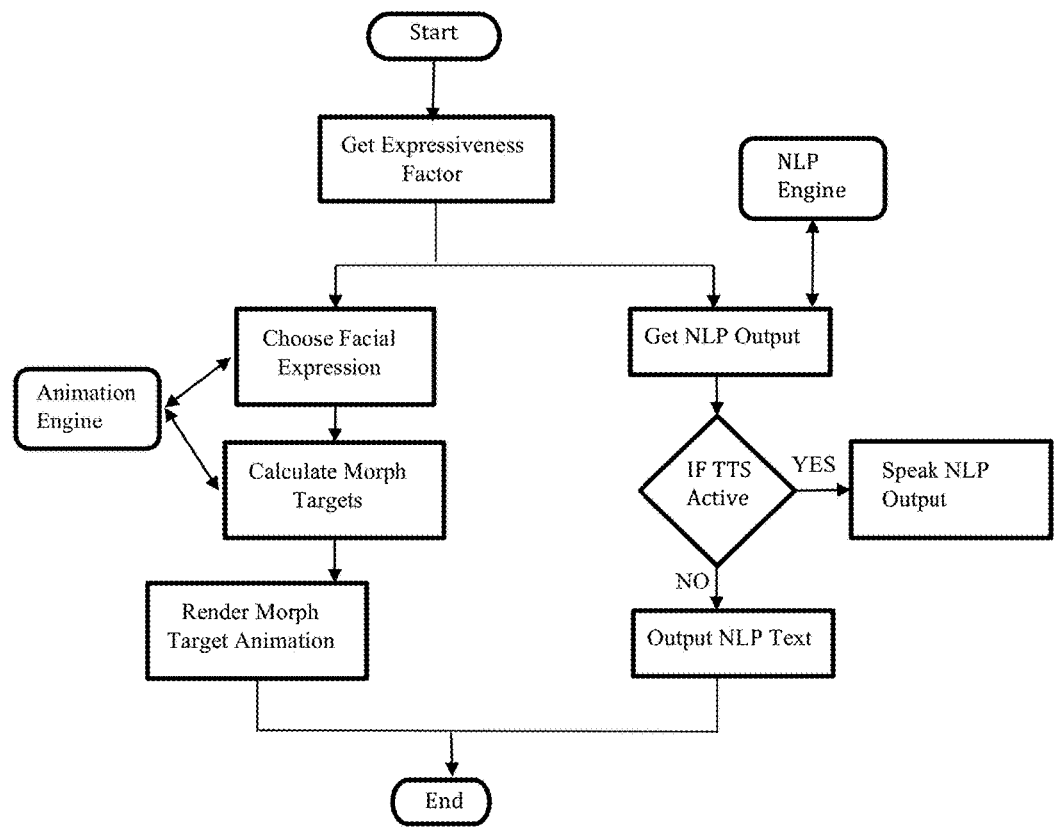
FIG. 15 is a functional block diagram of one embodiment of the invention that describes the process by which the Behavioral State and Mental State of the Intelligent Assistant is reflected through Facial Expressions and NLP Output (through text and voice).

Referring now to the Figures, FIG. 15 describes the process by which the Behavioural State and Mental State of the Intelligent Assistant is reflected through Facial Expressions A special method to render the Facial Expression and the NLP Output i.e. english Response (from the intelligent agent to the user) in a multi-threaded manner based on the Type of the Behavioural State (Smiling, Sad, Shocked, Nervous etc.) and the Expressiveness Factor (in a numerical range e.g. 1 to 5) being maintained within the intelligent agent.

There is also a special method to render Facial Expressions wherein:

Based on the behavioural state, the Facial Expression to be rendered is chosen, for example, a Nervous Behavioural State corresponds to the Nervous Facial Expression.

The Expressiveness Factor is used to determine the extent of the animation by calculating a Morph Target of the Facial Expression to be rendered based on the Expressiveness Factor by combining the Morph Targets of Atomic Facial Expressions. Where each Atomic Facial Expression addresses animating a particular region of the face, eye movement, head movement or body movement. For example, a shocked expression is a composition of the atomic expressions: Raise Eyebrows, eyes wide open and Jaw Open.

The calculated Morph Target Animation is then rendered.

A special method to compute NLP Output/Response using NLG techniques wherein the NLG Engine is used to generate the NLP Output/Response.

If Text To Speech is active, The Intelligent Assistant will speak/read-out the NLP Output/Response to the user, or else it will prompt the user with the Response.

There is also a special method of dynamically rendering Atomic Expressions using Morph Targets that use vertex point animation and interpolation to dynamically modify the mesh from the original state to the new state. Each Atomic Expression has one or more groups of vertices which are interpolated and each of these groups are controlled by a Key Point that controls the extent of the interpolation of the vertices in that region based on the Expressiveness Factor.

Figure 16:
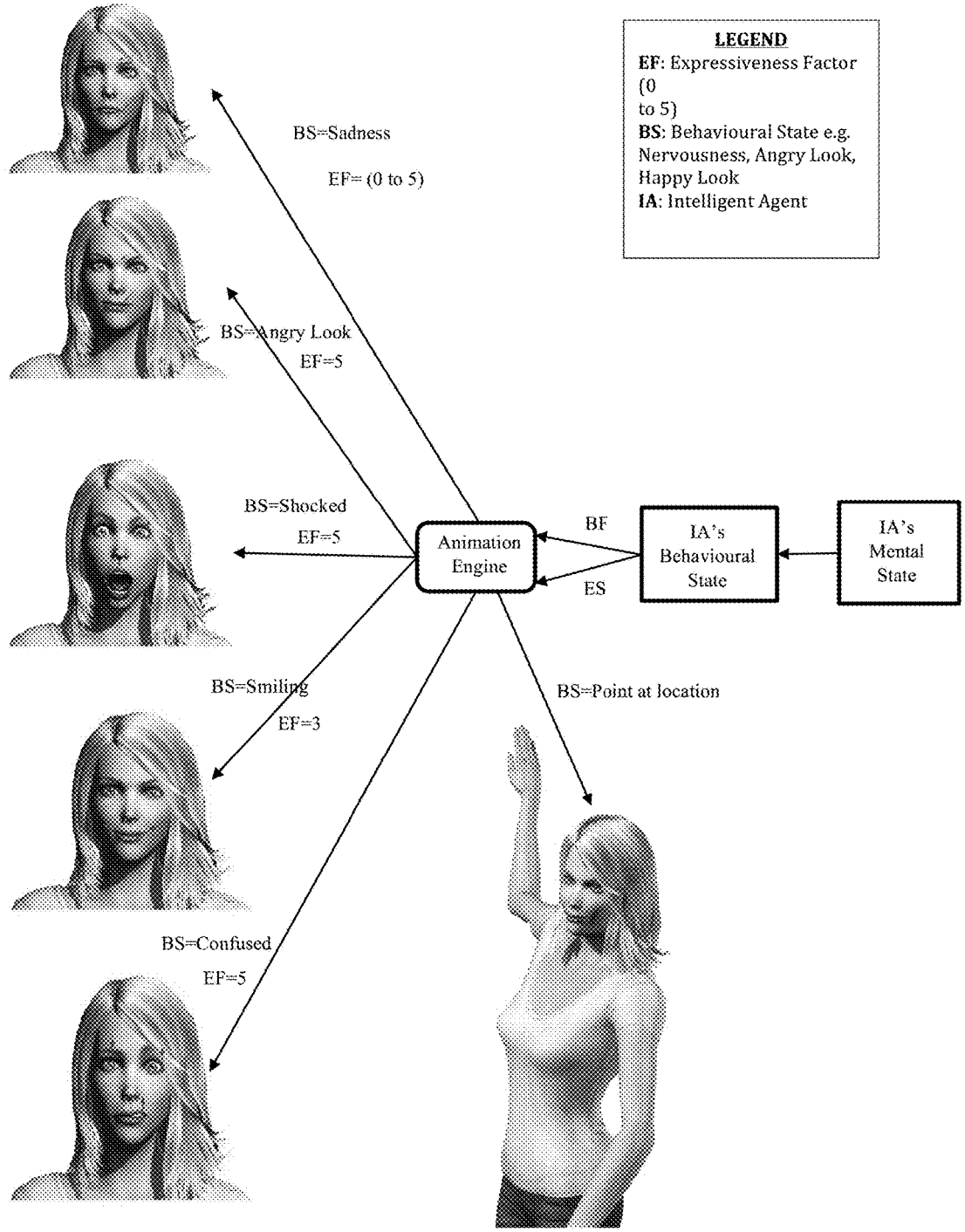
FIG. 16 is a series of animations showing various Behavioral states and Body Gestures that can be performed by the Intelligent Agent.

Referring now to the Figures, FIG. 16 describes how various Facial Expressions, Hand Gestures and Body Gestures animations are rendered based on the Intelligent Assistant's Behavioural State and Mental State.

The Intelligent Agent's Mental State and Behavioural State are stored on the server. Whenever these change, the change is reflected through Facial Expression Animations like Shocked, Confused, Sadness etc. Each of these Facial Expressions also have an Expressiveness Factor (between 0 to 5) that determines the extent of the Expression. For example, assuming the Behavioural State is angry, EF=1 means annoyed, EF=2 means little angry, EF=3 means angry, EF=4 means very angry and EF=5 means enraged.

There are 3 types of Animations that are rendered:

Facial Expressions Animation:

These animations involve movement of the facial muscle groups of the forehead, eyebrows, eyelids, eyes, nose, cheeks, lips and the jaw bone. Movement of each of these muscle groups is considered as an Atomic Expression and the combination of these Atomic Expressions along with the Expressiveness Factor (EF) form the actual Facial Expression. These are shown in the figure (in grey).

Figure 17:
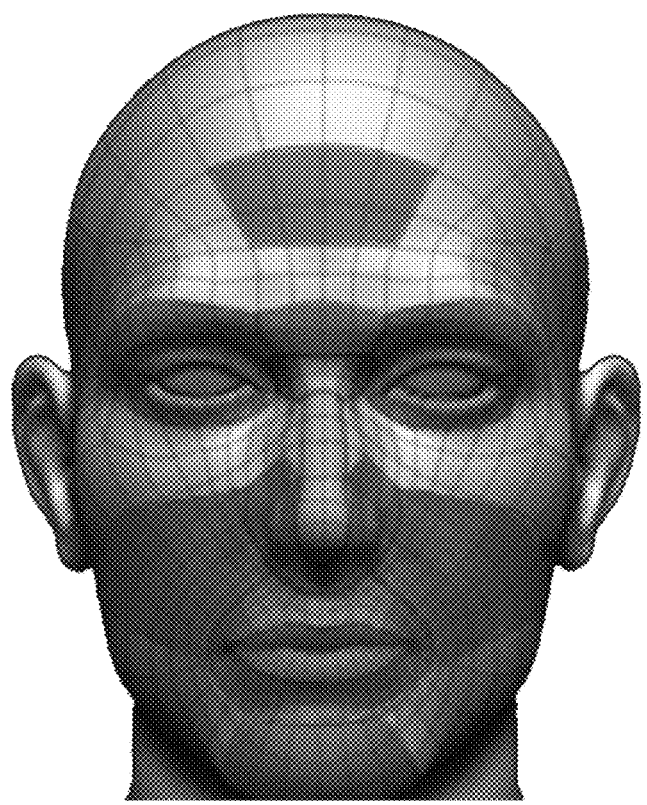
FIG. 17 is a wireframe rendering of an example of a human head showing the various muscles of the face that are used to perform the various Facial Expressions.

Referring now to the Figures, FIG. 17 describes:

Hand Gestures Animation:

These animations involve movement of the shoulders, elbows, neck (rotation+tilt) and spine (rotation+tilt), wrist and fingers.

Body Gestures Animation:

These animations involve movement of the Intelligent Assistant across the screen. It may involve movement of the shoulders, elbows, neck (rotation+tilt) and spine (rotation+tilt), wrist and fingers along with Facial Expressions.

Figure 18:
FIG. 18 is an animated graphic showing a Shocked Facial Expression.

Further Examples:

Referring now to the Figures, FIG. 18 describes The Shocked Facial Expression is rendered as a combination of the Atomic Expressions: Raise Eyebrows and Jaw Open.

Figure 19:
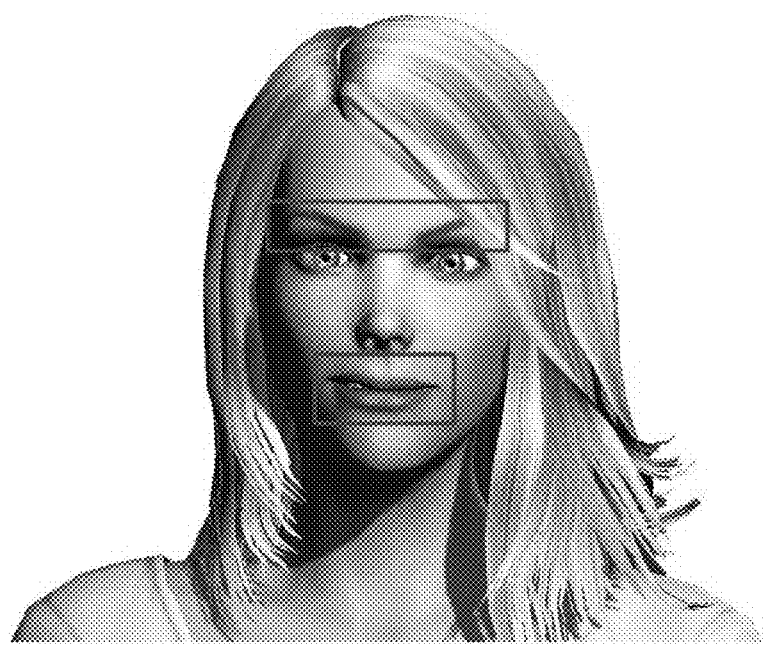
FIG. 19 is an animated graphic showing a Angry Facial Expression.

Referring now to the Figures, FIG. 19 describes The Angry Facial Expression is rendered as a combination of the Atomic Expressions: Lower Eyebrows and Lift Left Upper Lip.

Figure 20:
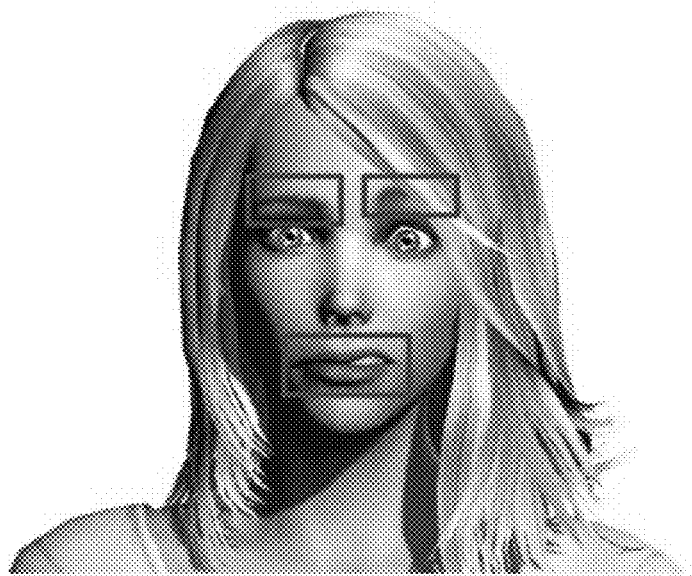
FIG. 20 is an animated graphic showing a Confused Facial Expression.

Referring now to the Figures, FIG. 20 describes The Confused Facial Expression is rendered as a combination of the Atomic Expressions: Lower Left Eyebrow, Raise Right Eyebrow and Lift Right Upper Lip.

Figure 21:
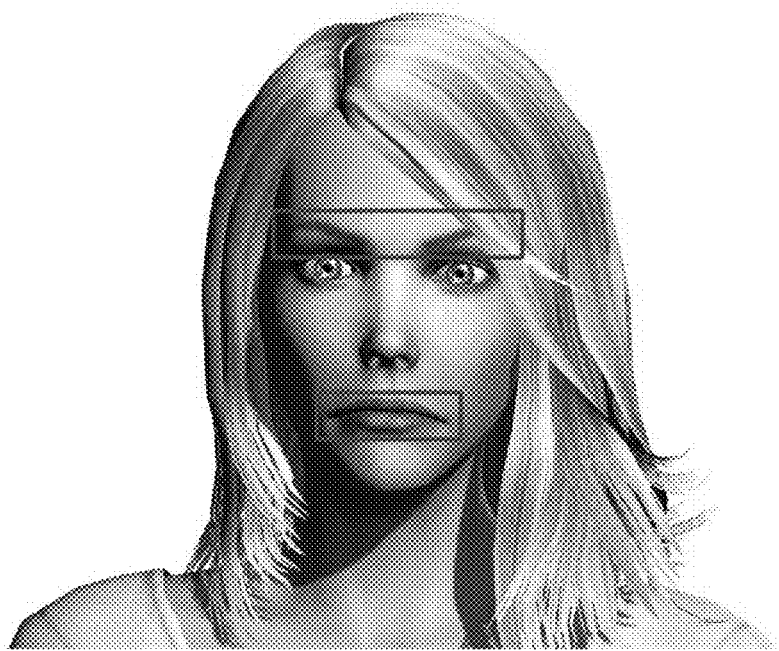
FIG. 21 is an animated graphic showing a Sad Facial Expression.

Referring now to the Figures, FIG. 21 describes The Sadness Facial Expression is rendered as a combination of the Atomic Expressions: Lower Eyebrows and Lower Lips.

Figure 22:
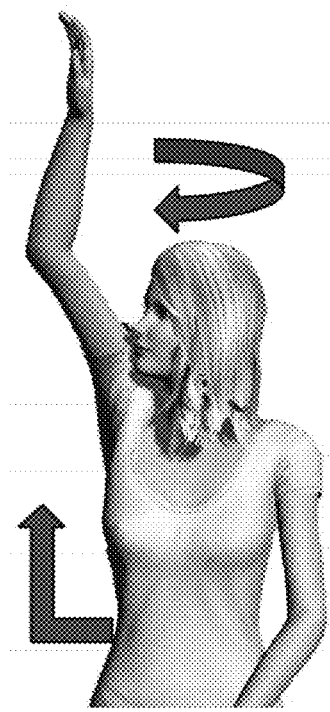
FIG. 22 is a graphic animation of the interactive agent performing a swipe motion with the graphical user interface as a hands free verbal control aspect of the present invention.

Referring now to the Figures, FIG. 22 describes The Hand Gesture "Swipe" is rendered as a combination of the Atomic Expressions: Rotate Head Left (90°) and Lift Hand.

Figure 23:
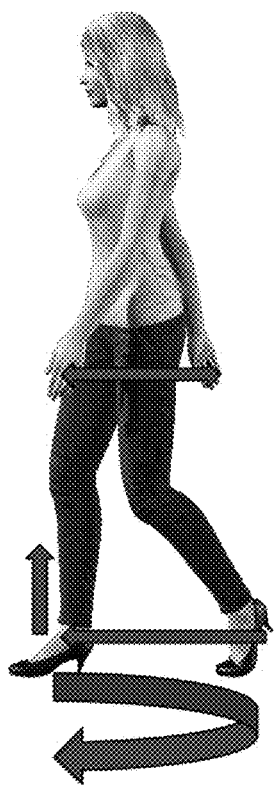
FIG. 23 is an animated graphic showing an animated interactive agent with full body motion performing a walk animation.

Referring now to the Figures, FIG. 23 describes The Body Gesture "Walk Left" is rendered as a combination of the Atomic Expressions: Rotate Body Left (90°) followed by an alternating Swing hands (left+right) and Lift Leg+Move Forward.

Referring now to the Figures, FIG. 24 describes If the Behavioural State of The Intelligent Assistant changes to shocked, it is reflected through facial expressions at Expressiveness Factors (EF) 1 to 5 as shown.

Figure 25:
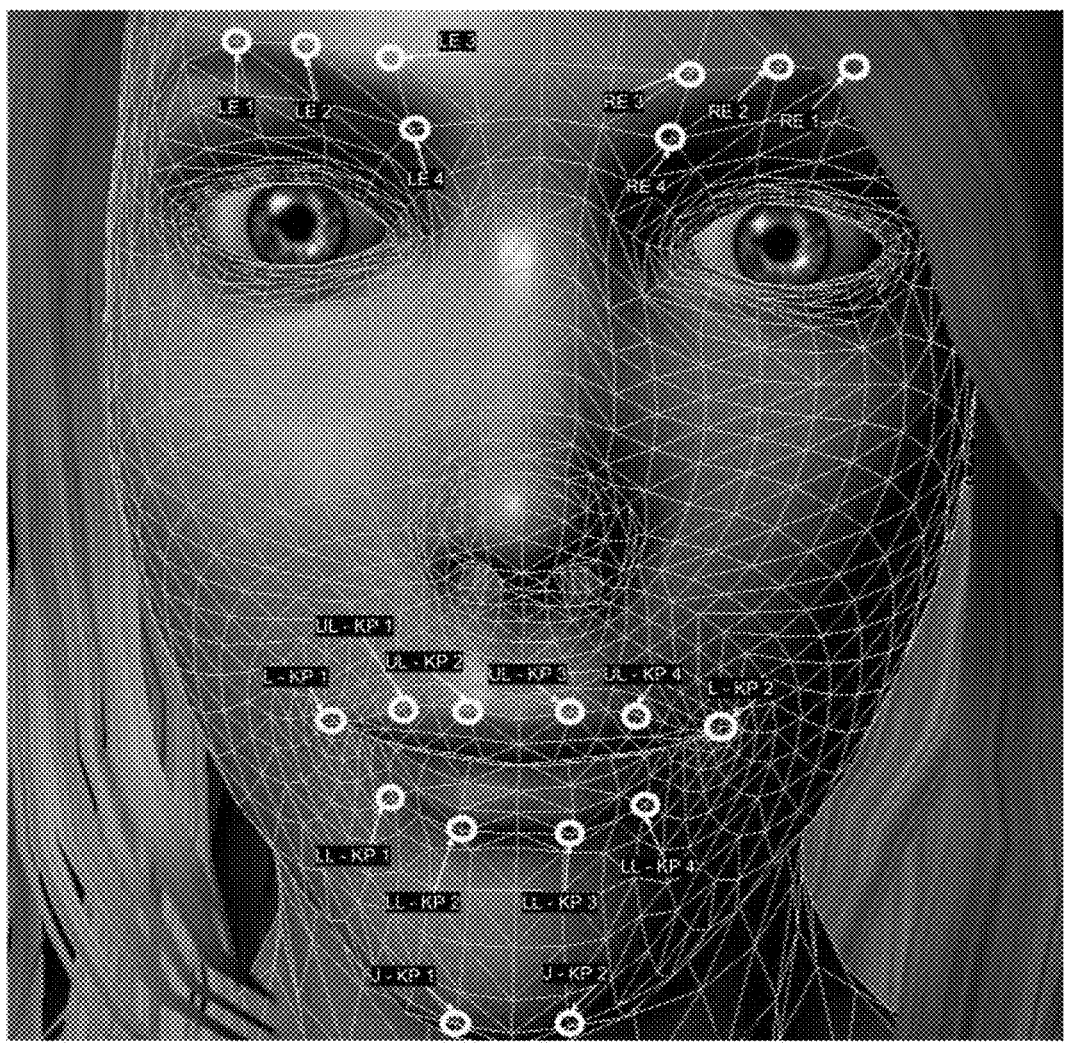
FIG. 25 is a wireframe close-up view of the face of the virtual interactive agent in its Normal State (before any animations have been performed).

And the meshes of this expression at Expressiveness Factor 1 to 5 are shown below:

Where:
LE-KP: Means a Key Point for the Left Eyebrow
RE-KP: Means a Key Point for the Right Eyebrow
L-KP: Means a Key Point for the lip
UL-KP: Means a Key Point for the Upper Lip
LL-KP: Means a Key Point for the Lower Lip
J-KP: Means a Key Point for the Jaw Referring now to the Figures, FIG. 25 describes Normal
This is the normal state, before any animations have been performed.

Figure 26:
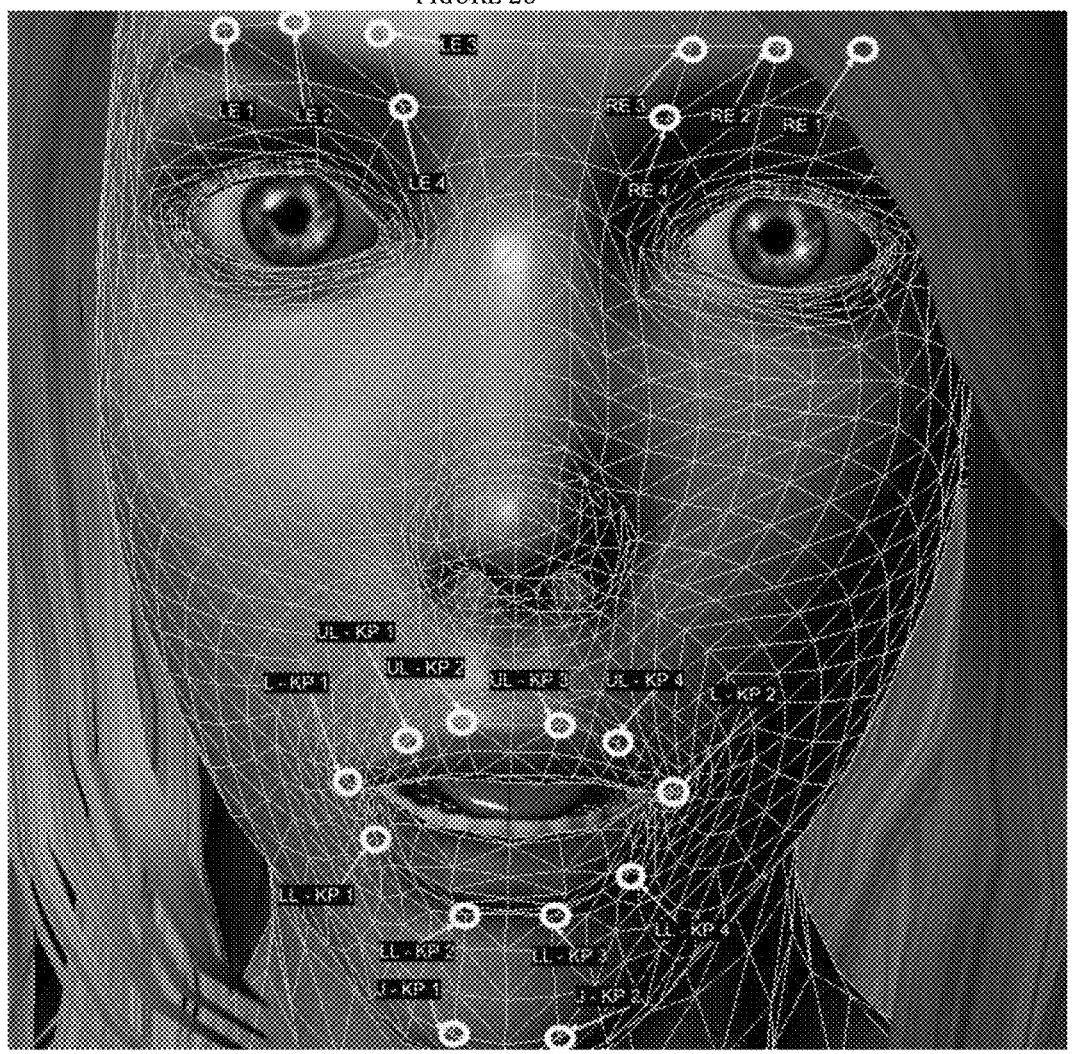
FIG. 26 is a wireframe close-up view of the face of the virtual interactive agent performing a Shocked Facial Expression at intensity value 1 where the eyebrows are raised a little and the jaw is lowered down a little.

Referring now to the Figures, FIG. 26 describes EF=1
This is at Expressiveness Factor 1. The Eyebrows are raise a little and the jaw is lowered down a little.

Figure 27:
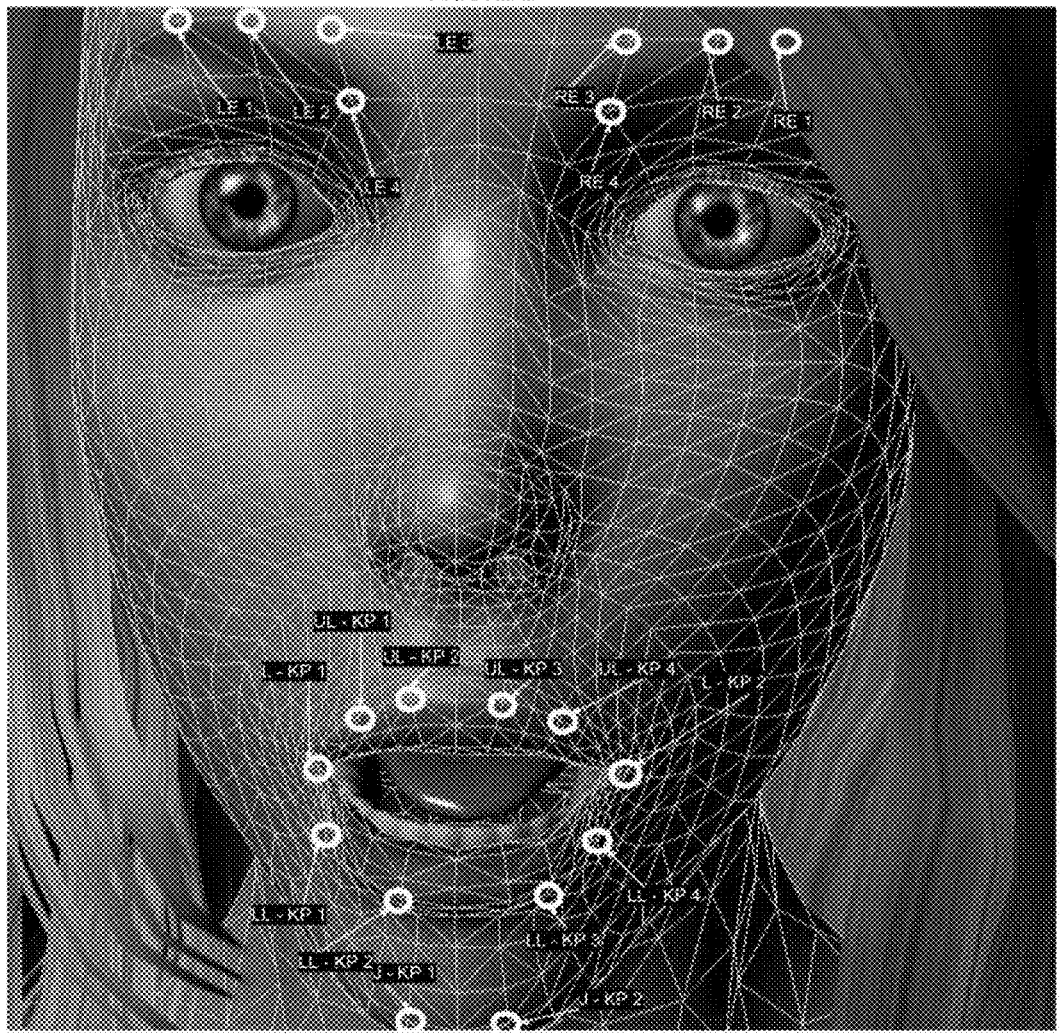
FIG. 27 is a wireframe close-up view of the face of the virtual interactive agent performing a Shocked Facial Expression at intensity value 2 where the eyebrows are raised a little more and the jaw is lowered down a little more.

Referring now to the Figures, FIG. 27 describes EF=2
This is at Expressiveness Factor 2. The Eyebrows are raise a little more and the jaw is lowered down a little more.

Figure 28:
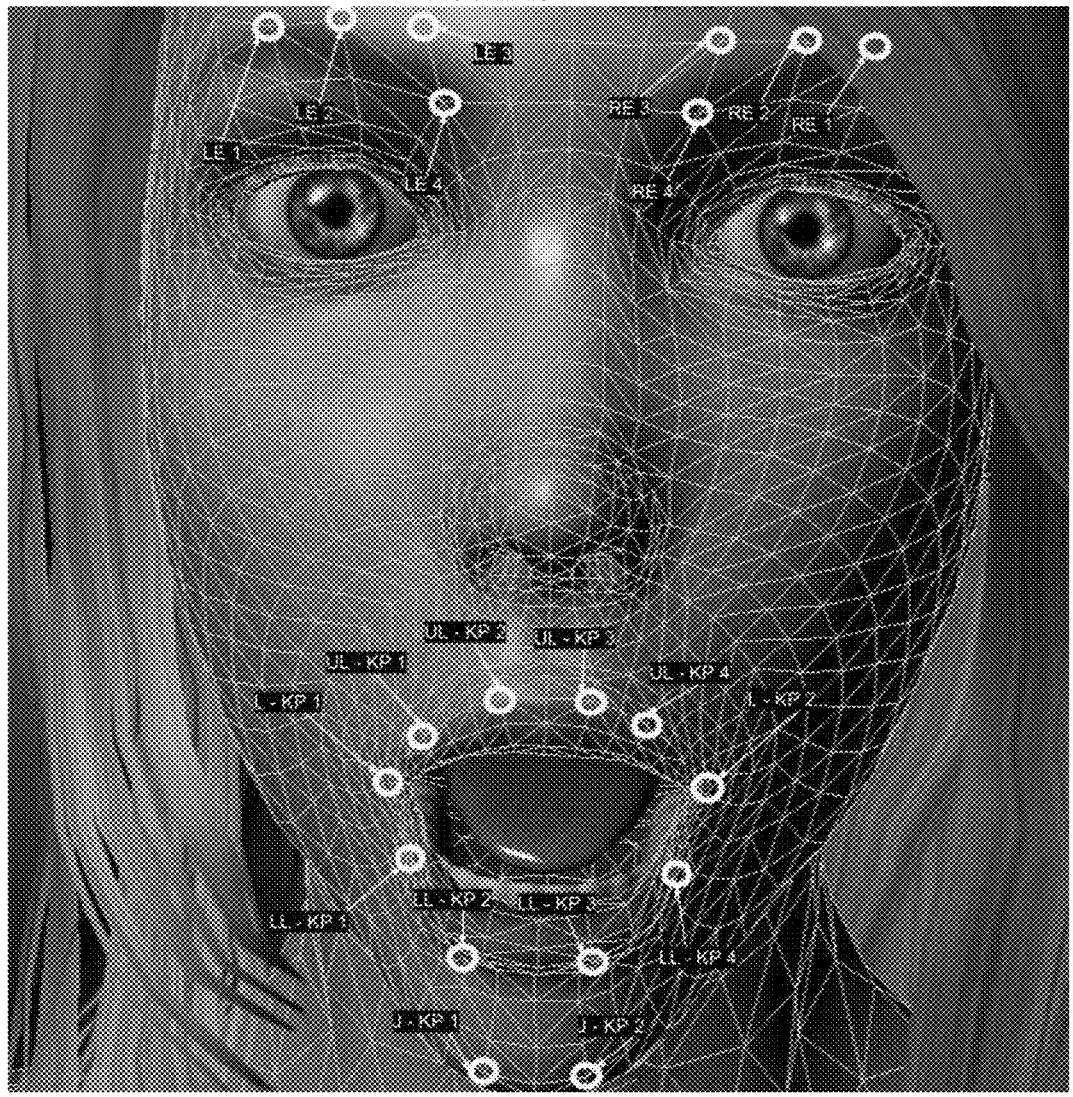
FIG. 28 is a wireframe close-up view of the face of the virtual interactive agent performing a Shocked Facial Expression at intensity value 3 where the eyebrows are raised even more and the jaw is lowered down even more.

Referring now to the Figures, FIG. 28 describes EF=3
This is at Expressiveness Factor 3. The Eyebrows are raise a even more and the jaw is lowered down even more.

Figure 29:
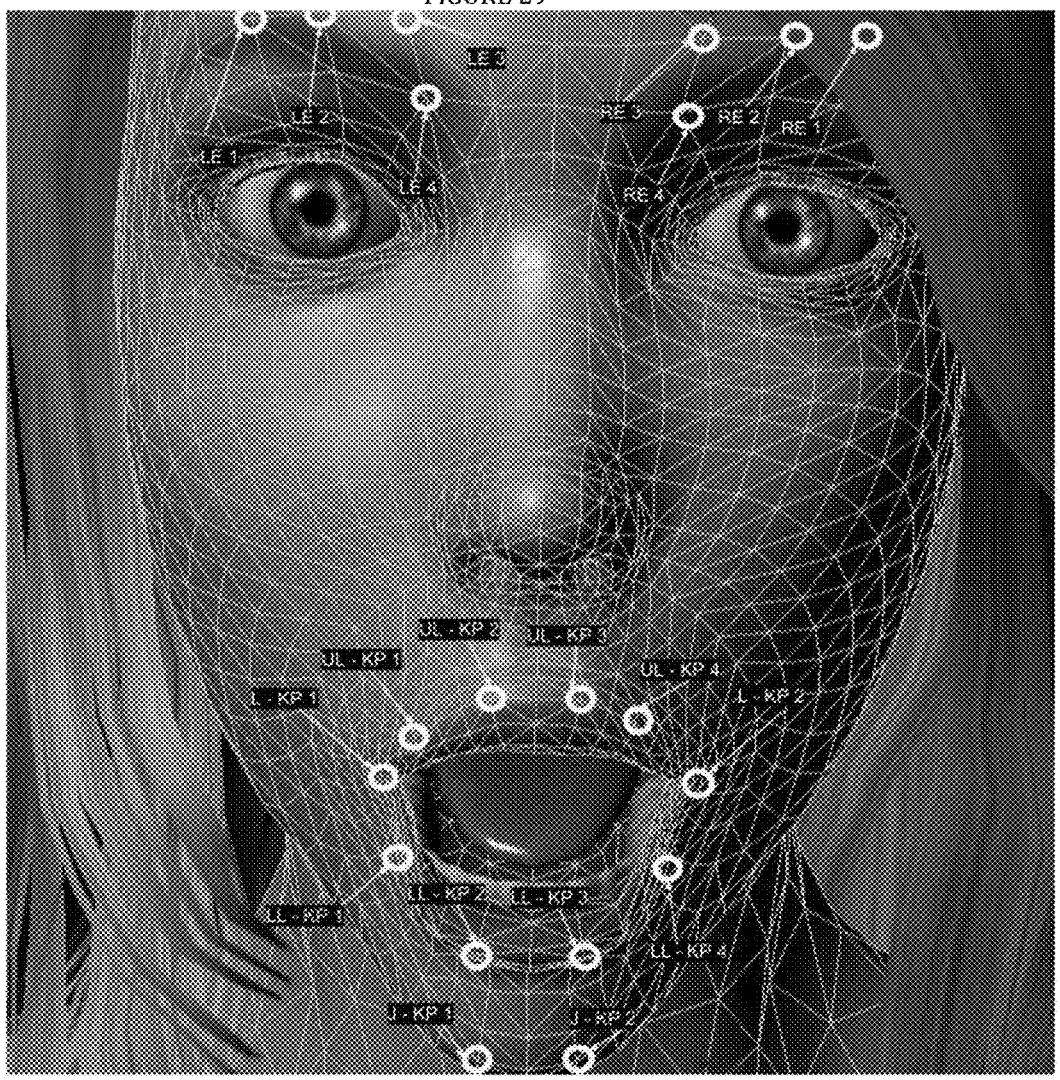
FIG. 29 is a wireframe close-up view of the face of the virtual interactive agent performing a Shocked Facial Expression at intensity value 4 where the eyebrows are raised even further and the jaw is lowered down even further.

Referring now to the Figures, FIG. 29 describes EF=4
This is at Expressiveness Factor 4. The Eyebrows are raise even further and the jaw is lowered down even further.

Figure 30:
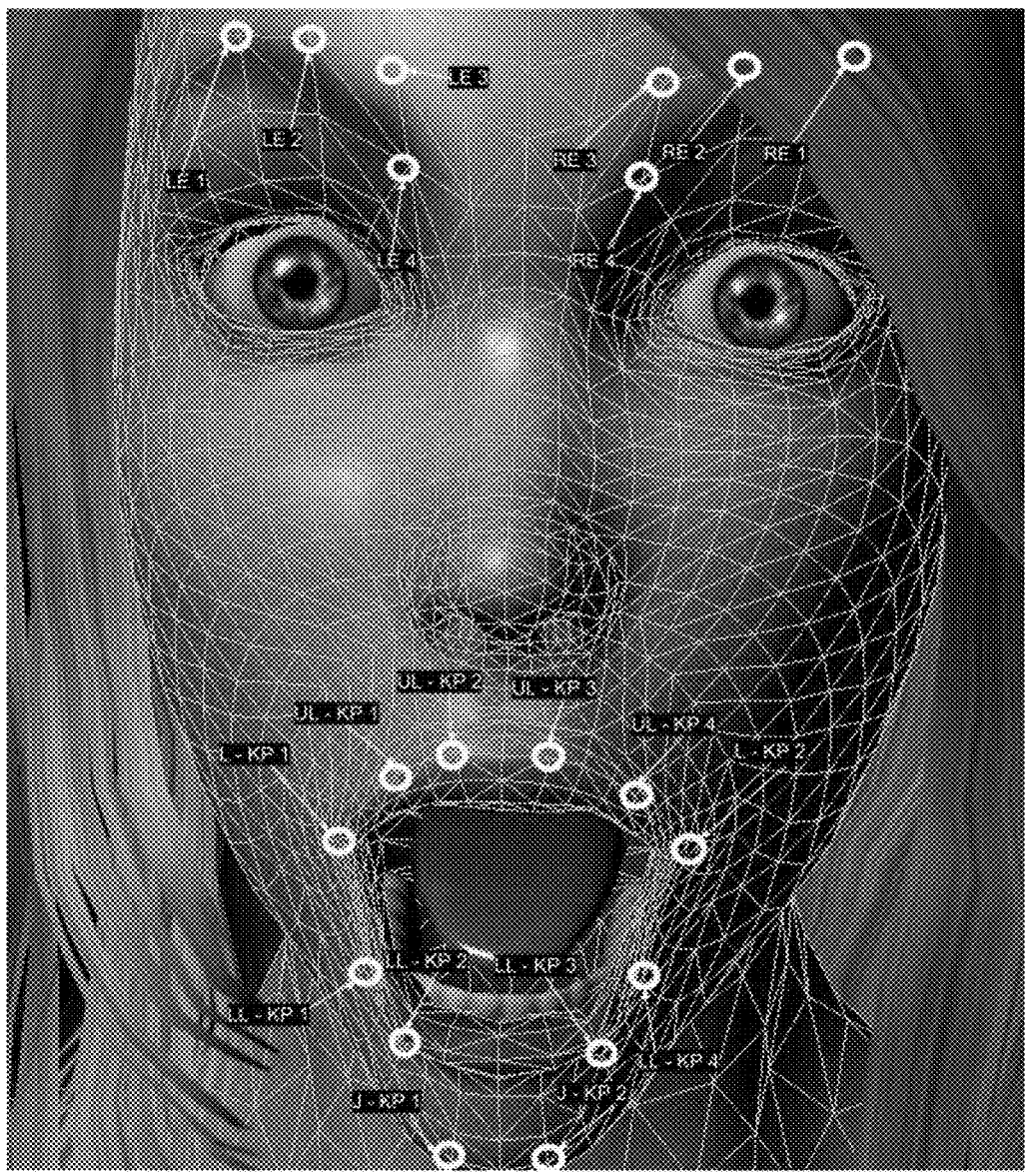
FIG. 30 is a wireframe close-up view of the face of the virtual interactive agent performing a Shocked Facial Expression at intensity value 5 where the eyebrows are raise to their extreme and the jaw is lowered down to its extreme.

Referring now to the Figures, FIG. 30 describes EF=5
This is at Expressiveness Factor 5, the highest level of expressiveness. The Eyebrows are raise to their extreme and the jaw is lowered down to its extreme.

If the Behavioural State of The Intelligent Assistant changes to Smiling, it is reflected through facial expressions.

Figure 31:
FIG. 31 shows a sequence pair of two animated graphics showing a Normal State and a Smiling Behavioral State with intensity value 1.

Referring now to the Figures, FIG. 31 describes
Assuming an Expressiveness Factor (EF)=1
This expression consists of only a single Atomic Expression to Raise Lips.

Figure 32:
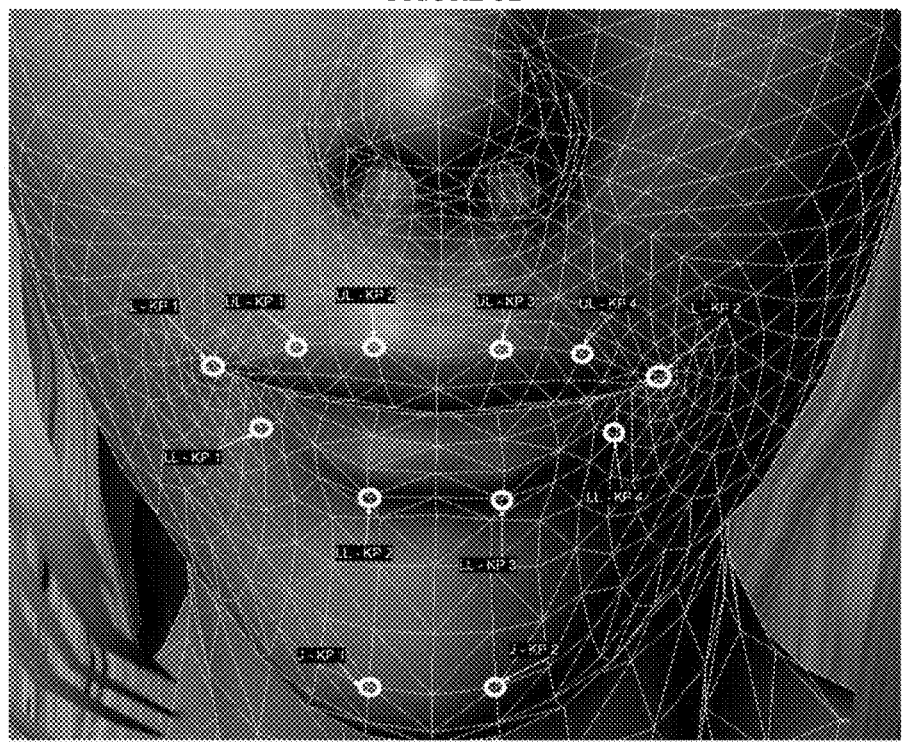
FIG. 32 is a wireframe close-up view of the face of the virtual interactive agent in its Normal State (before any animations have been performed).

Referring now to the Figures, FIG. 32 describes Normal State
This is the normal state, without any facial expression change.

Referring now to the Figures, FIG. 33 describes Final State (EF=1).

This is at expressiveness factor 1. The Lips are stretched to a certain extent (not fully), along with an NLP Output text: "I'm happy I could help."

Referring now to the Figures, FIG. 34 describes if the expressiveness factor were 5 (maximum). Facial Expression consists of 2 expressions, Raise Lips and Drop Jaw.

Figure 35:
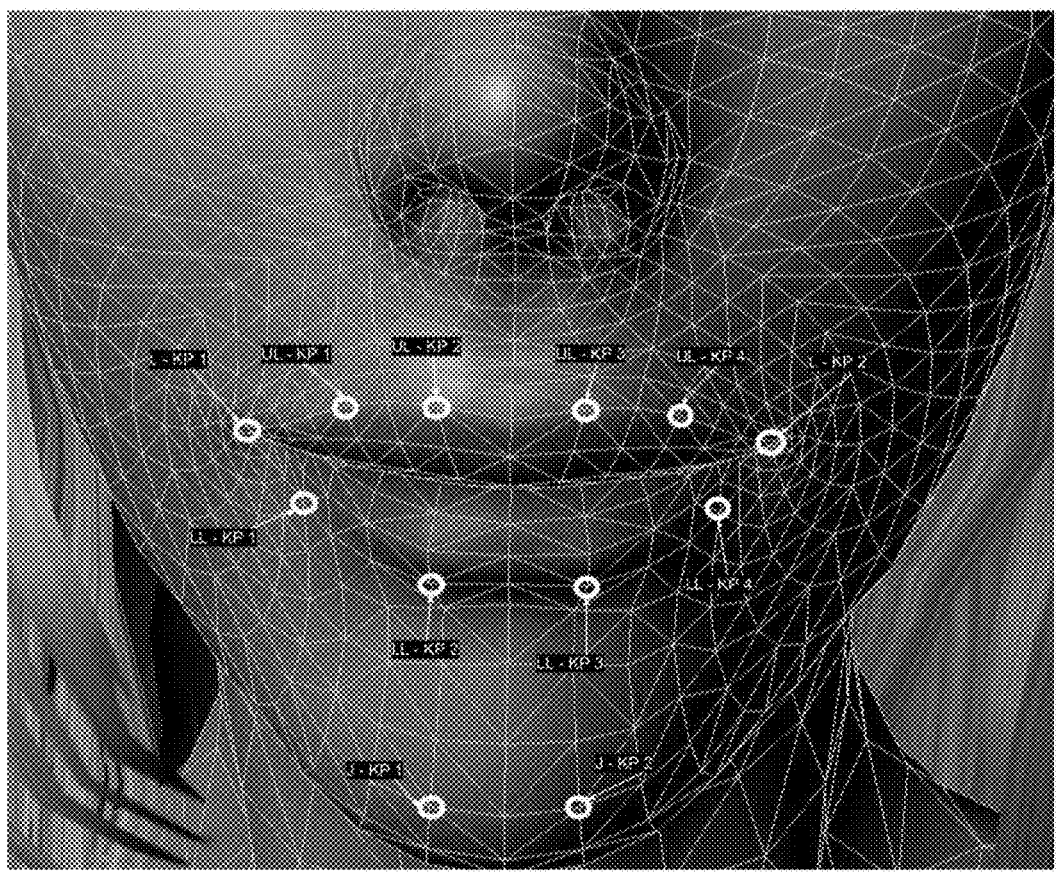
FIG. 35 is a wireframe close-up view of the face of the virtual interactive agent in its Normal State (before any animations have been performed).

Referring now to the Figures, FIG. 35 describes Normal State.

This is again the normal state, prior to any animation.

Figure 36:
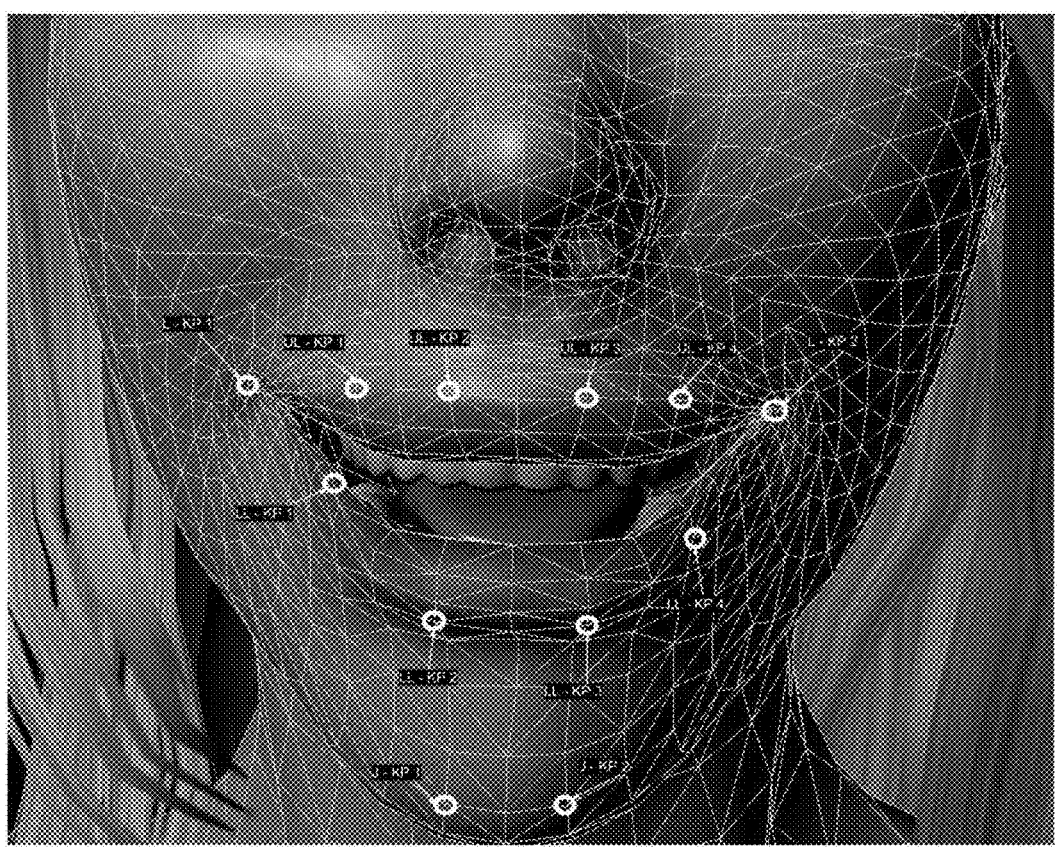
FIG. 36 is a wireframe close-up view of the face of the virtual interactive agent performing a Smiling Facial Expression at intensity value 5 where the lips are stretched to their extreme and the jaw is lowered down a little.

Referring now to the Figures, FIG. 36 describes Final State (EF=5).

This is at Expressiveness Factor 5, which is the highest. As can be seen, the lips are stretched to their extreme and the jaw is lowered down as well, along with an NLP Output text: "I'm really very happy I could help." Expressing much more happiness.

Similarly, If the Behavioural State of The Intelligent Assistant changes to Sad, it is reflected through facial expressions as below.

Referring now to the Figures, FIG. 37 describes an Expressiveness Factor=1. This expression consists of only a single Atomic Expression to Lower Lips.

Figure 38:
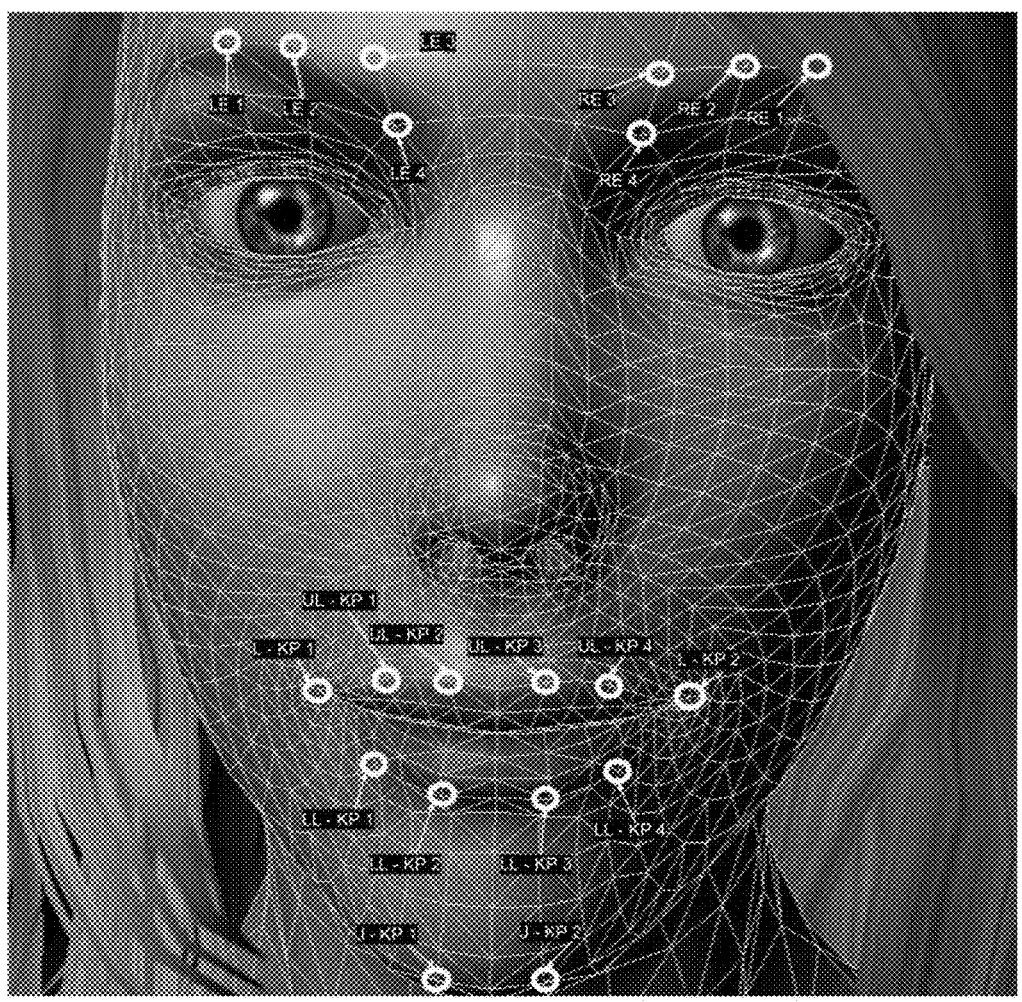
FIG. 38 is a wireframe close-up view of the face of the virtual interactive agent in its Normal State (before any animations have been performed).

Referring now to the Figures, FIG. 38 describes Normal State.

Figure 39:
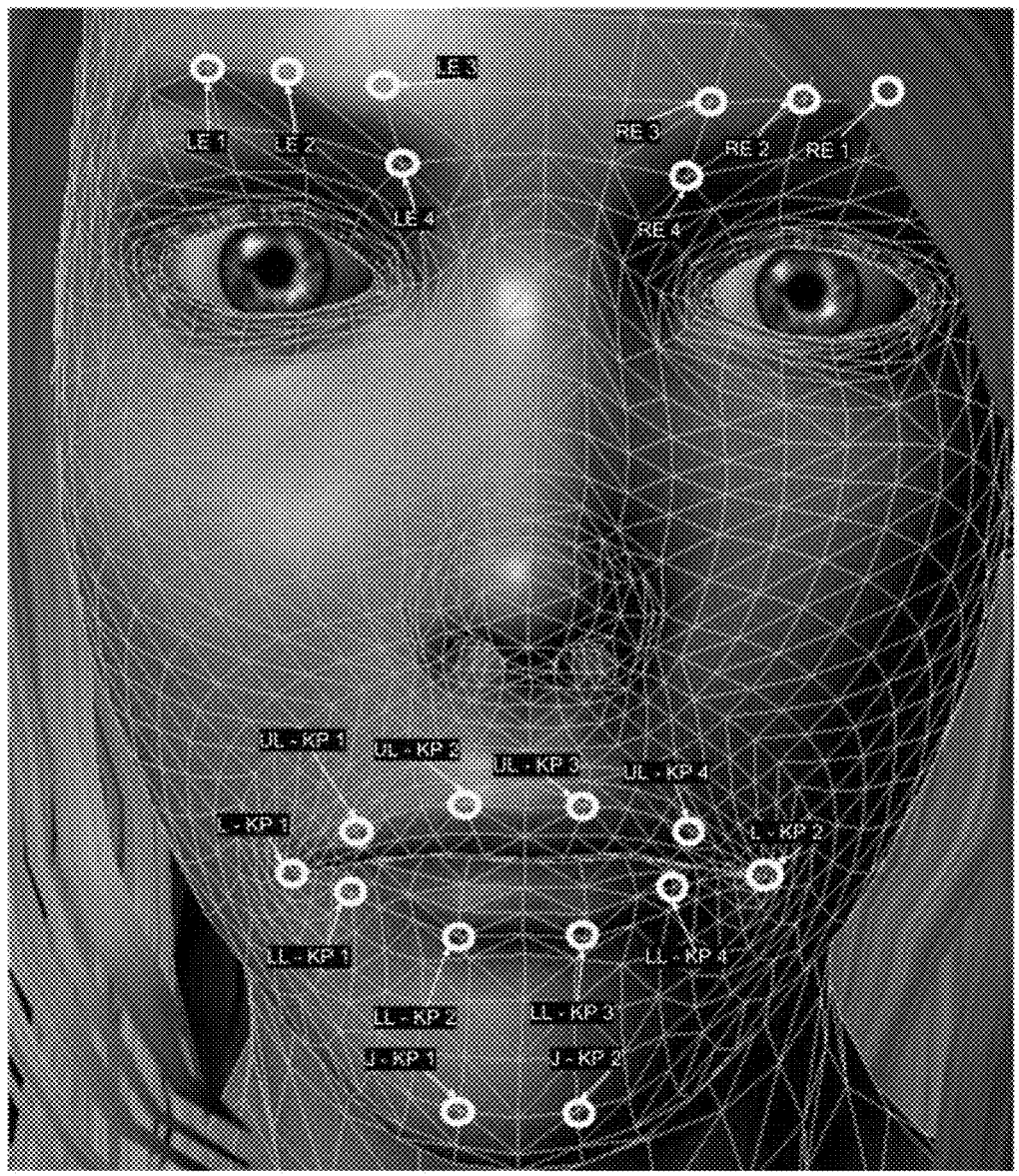
FIG. 39 is a wireframe close-up view of the face of the virtual interactive agent performing a Sad Facial Expression at intensity value 1 where the lips and eyebrows are lowered down a little.

Referring now to the Figures, FIG. 39 describes Final State.

Along with an NLP Output text: "I'm sorry but I didn't understand what you said." However if the expressiveness factor was 5 (maximum)

Referring now to the Figures, FIG. 40 describes 2 expressions, Lower Lips and Lower Eyebrows.

Figure 41:
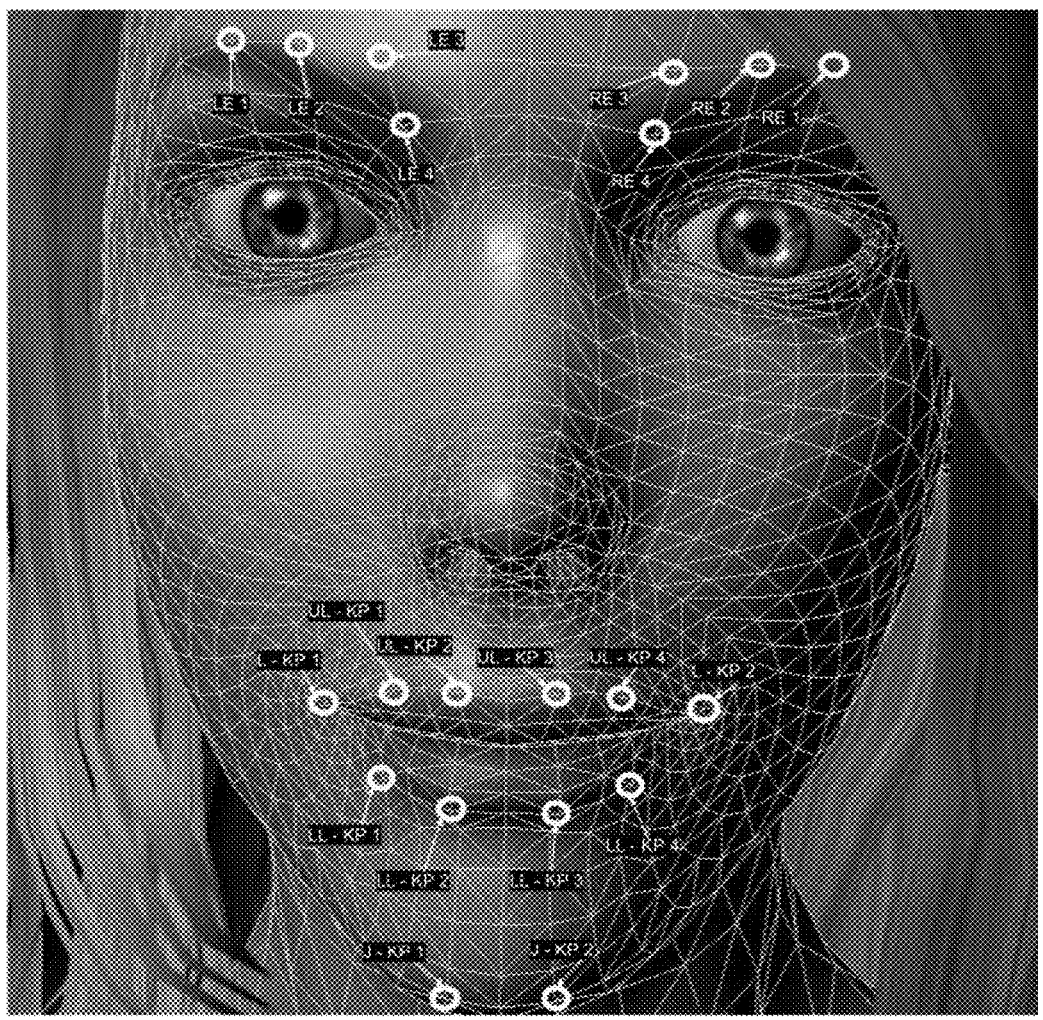
FIG. 41 is a wireframe close-up view of the face of the virtual interactive agent in its Normal State (before any animations have been performed).

Referring now to the Figures, FIG. 41 describes Normal State.

Figure 42:
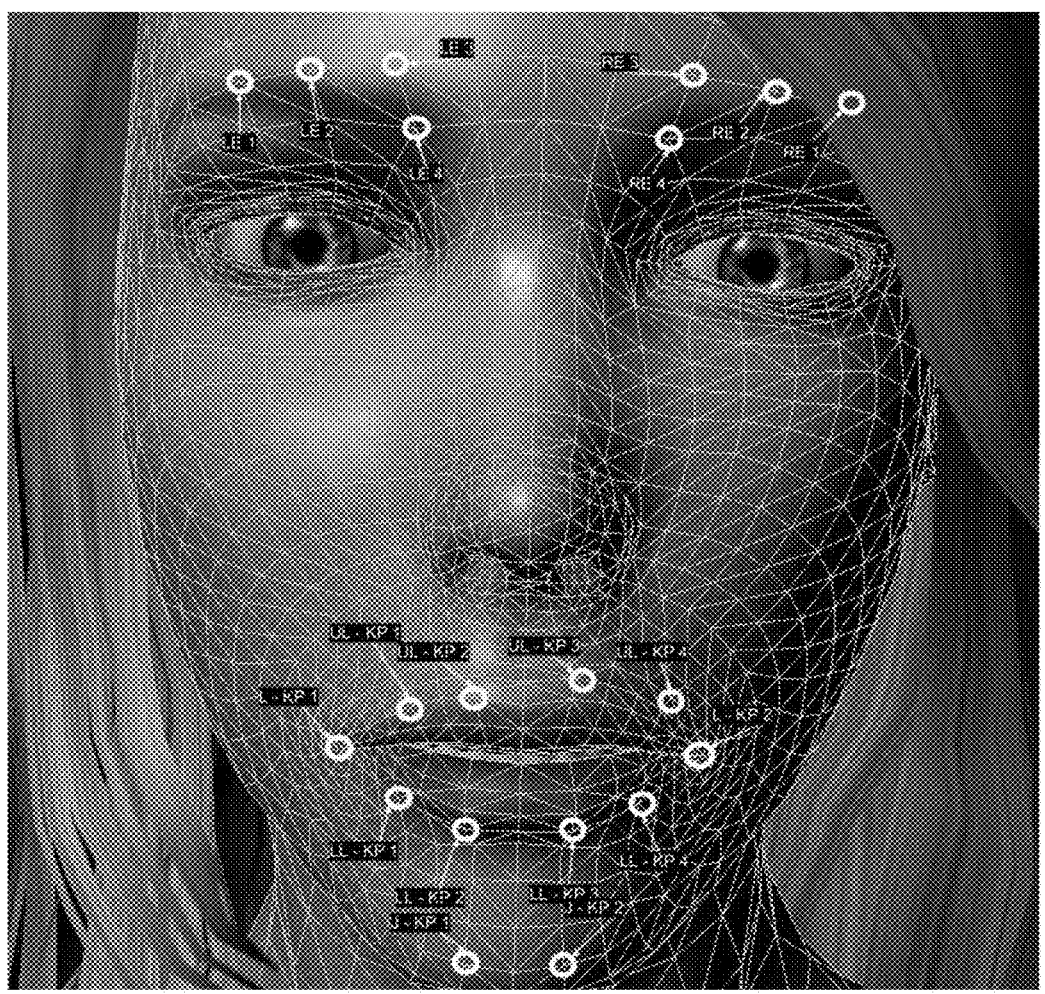
FIG. 42 is a wireframe close-up view of the face of the virtual interactive agent performing a Sad Facial Expression at intensity value 5 where the lips and eyebrows are lowered to their extremes.

Referring now to the Figures, FIG. 42 describes Final State.

Along with an NLP Output text: "I'm really very sorry that you couldn't find any flights from New York to Las Vegas." Expressing much more sadness.

A Facial Expression is rendered in the following steps:
Select Atomic Facial Expressions for this animation;
Calculate the individual Morph Targets of the atomic facial expressions based on the expressiveness factor (1-3) where 1 indicates low, 2 indicates medium and 3 indicates high;
Combine the individual Morph Targets to form the final Morph Target that will be applied to the mesh;
Calculate the frame rate (frames per second) to render this animation based on:
The Expressiveness Factor E: Higher the expressiveness factor, more the no. of frames that will need to be rendered;
The Maximum Displacement MD (in px) of a vertex point from the original position to the target position in the Morph Target, the greater the maximum displacement the more the no. of frames to be rendered $$fps = E \times MD/; \text{ and}$$

Render the Morph Target animation frames calculated.

Figure 43:
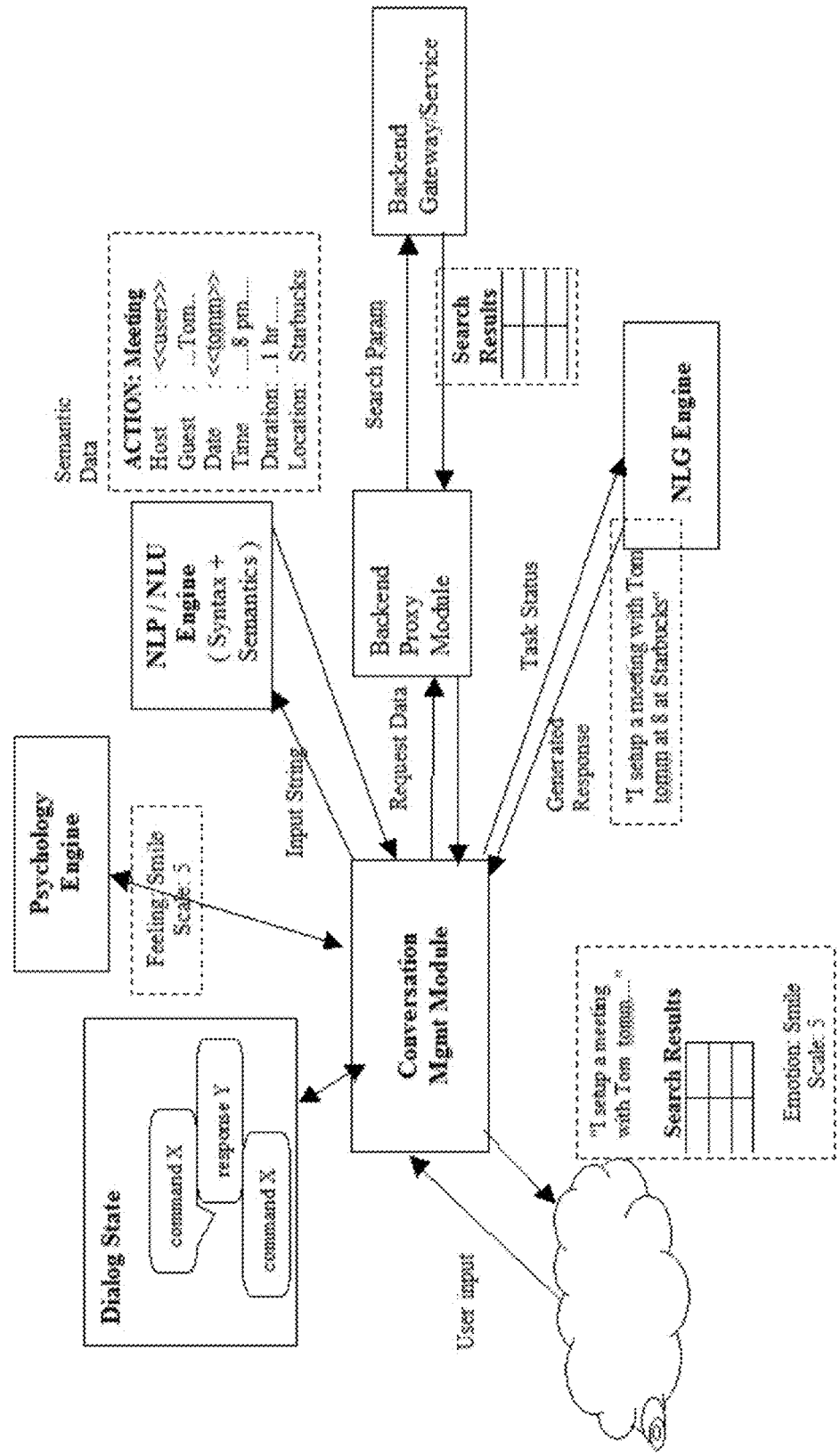
FIG. 43 is a functional block diagram of one preferred embodiment of a technical architecture of an AI engine.

Referring now to the figures, FIG. 43 is a functional block diagram of one preferred embodiment of a technical architecture of an AI engine. FIG. 43 shows a Server Side Architecture (Intelli-Agent Artificial Intelligence (AI) Engine). FIG. 43 shows the Technical Architecture explaining the underlying mechanism of the Artificial Intelligence Engine called Intelli-Agent which accepts a text input and generated a Meaning Representation Structure in the form of Concepts/Entities and Actions.

If the input text contains a Command from the user, It also performs the requested Operation by gathering all the required Search Criteria parameters using a multi step Conversation Management module and then obtains the results accordingly and displays it to the user in a multi modal user interface. The core module responsible for the Language Processing and Understanding tasks are carried out by the NLP Engine Component of the Intelli-Agent Framework. Furthermore the Agent Framework maintains its mental states and behavioral states in the Psychology Engine and updates them while interacting with the users to perform the requested operations.

Consider a user entering an input text (by means of a spoken command or by typing into an input device) and instructing the Intelligent Agent to schedule a meeting e.g. "set up a meeting with Tom at Starbucks tomm at 8 pm for 1 hour".

In FIG. 43, the sequence of steps shows the process and each step.

Initially, the user enters the input string by means of a spoken command or by typing via a keyboard into an input device. The user can simply speak the input sentence in the form of a voice command on a client device which then converts the voice input to text by means of a Automatic Speech Recognition (ASR) module or the user can simply type in the input text through the a keyboard (onscreen/externally attached).

The server receives the user input and sends it to the Conversation Management module. Conversation Management Module The Conversation Management Module stores the User Session (e.g. the multi step on-going conversation between the user and the intelligent agent with regards to a operation requested by the user e.g. setting up meetings, searching flights, checking weather etc)

The Conversation Management can start a new session as soon as it senses a command input from the user e.g. if the user says "I want you to set up a meeting for me". This input by itself is not complete. (because there are certain basic parameters needed e.g. guest name, a meeting venue, a date/time etc and optionally a meeting duration etc).

This will trigger a user dialog session to be initiated by the Conversation Management Module which include a step by step procedure to ask questions for the unspecified parameters. (the user can input multiple unspecified parameters in 1 turn).

However if the user specifies a command with all the required parameters in 1 line: "set up a meeting with Tom at Starbucks tomm at 8 pm for 1 hour", then the Conversation management module doesn't maintain a session and considers it a spot request with all the sufficient parameters to perform the requested operation. These spot request parameters are directly passed to the NLP/NLU Engine Natural Language Processing/Understanding Engine (NLP/NLU Engine)

The NLP/NLU Engine (Natural Language Processing Engine) is component that does the Natural language processing by following a Multi pass process as described in the figure.

The NLP/NLU Engine analyzes the user input in its multiple passes (pass 1, pass 2, pass 5, pass 3, pass 3.5, pass 4, pass 4.5, pass 5, Semantic Analysis) to determine the Syntactic Tree Structure and the Semantic Analysis (i.e. the Semantic Action and its parameters) corresponding to the user input.

The Data identified by the NLP/NLU Engine is then transferred to the Conversation Management module which compares the status of the task to the user input and determines the new status of the task. For example, if the Conversation Management module is currently expecting a Location from the user and the user specifies an Coffee shop (e.g. Starbucks), then it could be determined that the user has specified the Location. Therefore, the step to retrieve the Location is rendered complete.

Backend Proxy Module, Backend Gateway/Service

Upon receiving the Semantic Action (e.g. MEETING, TRAVEL etc) and all the Parameters (either by means of a single sentence command or by means of a dialog involving multiple request/response cycles) the search criteria is sent to the Backend Proxy Module.

The Backend Proxy Module receives the Action and it's parameters and converts to a form understandable by the Backend Gateway (e.g. a Travel Gateway, Calendaring System, e-commerce Gateway etc).

The Backend gateway receives the data and gives out the results for the query.

e.g. If the user wanted to Search flights from A to B on Date D at Time T, then the travel gateway responds back with the Flight Results Data including various legs of the itinerary, total cost, date and time etc). If the user wanted to list the schedule for Person P at Date T, then the list of Meetings (along with Attendees, Venue, Date/Time etc is returned back).

This Backend Results data is then received back by the Backend Module which then converts it to the form understandable by the client and sends back to the Conversation Management module.

Natural Language Generation Engine (NLG Engine)

The Conversation Management module delegates the Natural language generation responsibility (i.e. generating a simple English sentence as a response) to Natural Language Generation (NLG) Engine. The NLG engine determines the kind of response that needs to be sent back to the user such as ("I am sorry, I could not setup a meeting with Tom on this particular date" or "I found 125 flights from X to Y on Z date").

The NLG engine identifies the sentence template based on the purpose of the message as well as the details of the response e.g. subject, verb, objects to be used for the sentence and generates a fully constructed sentence as a response. The generated response sentence is sent back to the Conversation Management module.

Psychology Engine (Changes in Behavioral State and expressing Feelings)

The behavioral states of the intelligent Agent get updated in the Psychology Engine. Also the Agent expresses its feelings by means of behavior states reflected as facial expressions using dynamically controlled 3D Animation.

a. Depending on the meaning of the user input e.g. intended operation, user preference, user behavioral states, user demands and requirements etc, (e.g. If the user responds with a time sensitive request in a angry tone indicating urgency, the intelligent Agent might get nervous or concerned and the mood i.e. behavioral state gets affected.)

b. Depending on the performance of the Intelligent Agent as compared to bare minimum results expected. (e.g. if the user wants the agent to search flights and the agent is not able to find any flights because the backend gateway is unavailable or slow, or if the flights meeting the selection criteria are not available, then its very embarrassing for the Agent. i.e. behavioral state gets affected.)

Results Consolidation

Conversation Management module packages the following and sends it to the server 1. Natural Language Generation response i.e. generated response in plain English form understandable by the user 2. Operation Status/Search results from the Backend Gateway/Service.

3. Feelings Response: The behavioral state and the intensity/extent of such a state (e.g. if the behavior is anger and the intensity is 5 on a scale of 1 to 5, then it means the agent is extremely angry).

Rendering the Results on the Client Device

The server then responds to the client device with Search results/Status and the response sentence along with behavioral state/intensity.

On the client device, the following things are displayed

1. The generated response as a English sentence is displayed in the chat window in a chronological manner.

2. The Operation/results are shown in a tabular display.

3. The behavioral state (confusion, anger, surprise, happiness, fear, embarrassment) along with its intensity (scale of 1 to 5) are rendered on the face of the Intelligent Agent as a Facial Expression on a 3D Mesh. The intensity of the behavioral state gets programmatically modified based on the intensity value by dynamically i.e. programmatically adjusting the vertices on face (3D mesh) of the intelligent agent using morphing techniques.

The users sees the output and speaks the next input sentence and the conversation continues.

Figure 44:
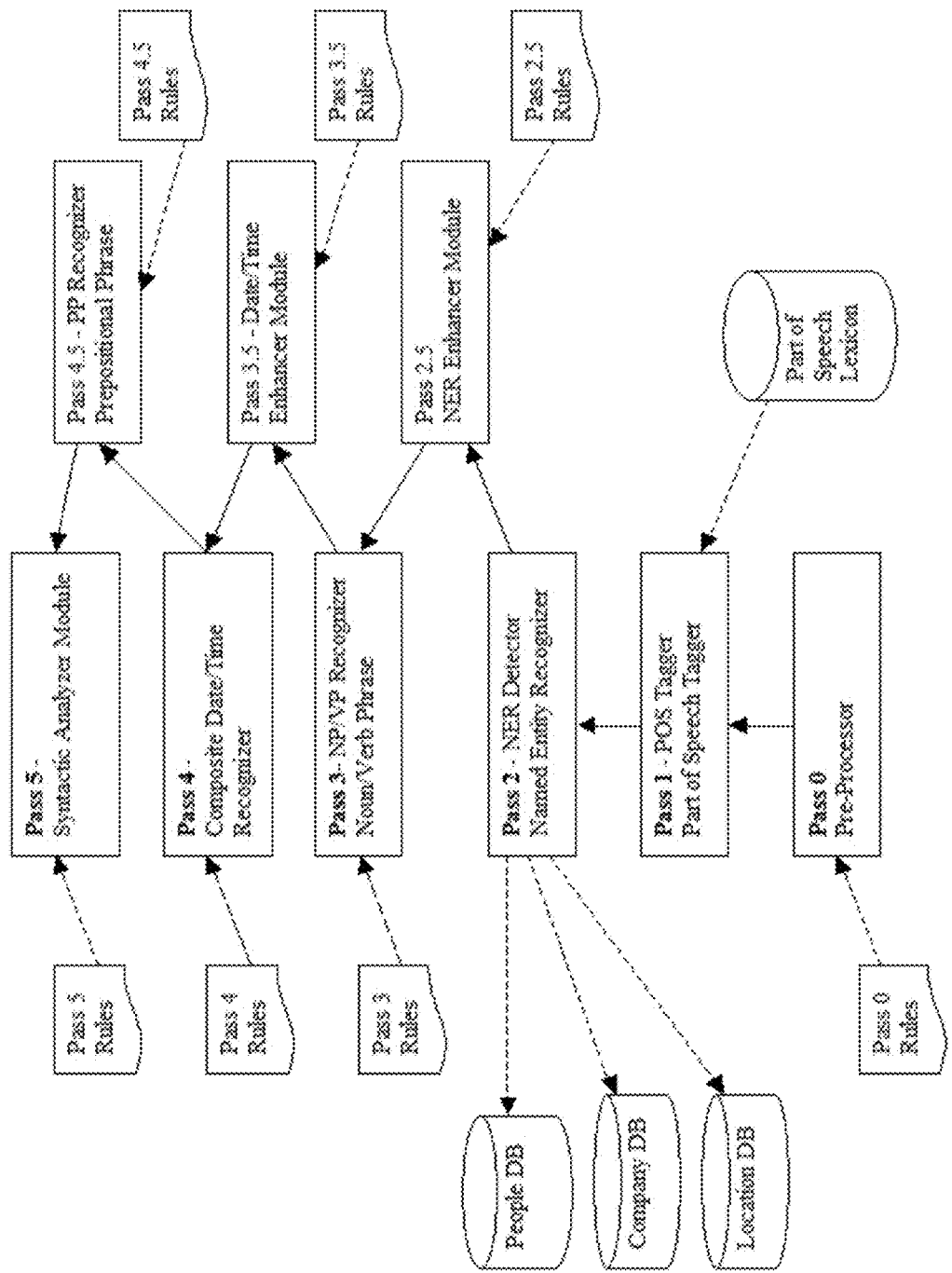
FIG. 44 is a functional block diagram of one preferred embodiment of a syntactic parser for natural language processing/natural language understanding.

Referring now to FIG. 44, this figure shows a functional block diagram of one preferred embodiment of a syntactic parser for natural language processing/natural language understanding. FIG. 44 shows Natural Language Processing (NLP)/Natural Language Understanding (NLU). The NLP/NLU Engine component contains a Syntactic Parser and a Semantic Analyzer. The figure the underlying mechanism of the Syntactic Parser.

Syntactic Parser (Multi Pass Dependency)

As shown herein, there is provided a Multi pass processing—Syntactic Parser. The input string is processed by the Syntactic parser by a series of passes Pass 0/Pre-processor: The input string passes through the preprocessor. This is the pass where number detection happens. This happens even before Parts of Speech is identified so that the future passes are ready to handle a relatively consolidated and standardized input data instead of dealing with raw data. e.g. is the input contains "three hundred and forty nine dollars blah blah", the preprocessor converts it to " . . . 349 dollars . . . blah blah".

The Pass1 is where the POSTagger (i.e. Part of Speech Tagger) starts converting each input word/token into its corresponding Part of Speech. The recognized words are assigned a part of speech type (POSType i.e. a Part of Speech Types such as NN for common noun, NNP for proper noun, VB for verbs, JJ for adjective as per the NLP standard naming conventions) where as the unrecognizable words such as proper noun tokens (e.g. name of people, cities etc) are considered to be unknowns (UNKs). The assignment of POSTypes to every token is therefore completed at the end of this pass.

Pass2 is Named Entity Recognition (NER), where Named Entities (i.e. proper nouns) that represent Companies, Locations (state, country, city, airport, hotels etc.), Person names (e.g. Jack, Joe, Mr. Smith) and Brand names related to things (e.g. Samsung, Sony etc) are identified.

Pass2.5 is where the NER is enhanced to produce better results. This pass uses common sense logic for Composite Named entities (e.g. Hilton Chicago is composed of two tokens i. "Hilton" which is a COMPANY (i.e. chain of hotels) and ii. "Chicago" which is interpreted at Pass 2 as a CITY (located in State of Illinois). But together "Hilton Chicago" represents a HOTEL located in Chicago, Ill. and that is owned/franchised by the "Hilton Group of Hotels" and has a specific address. In the same way Airport names consist of Person Names and City names. e.g. Baltimore Washington Thurgood Marshall represents BWI Airport but the tokens inside mean something different (e.g. Baltimore is a city, Thurgood Marshall is a person name, Washington is a Metropolitan Area.)

Pass 3 and Pass 3.5 are used to identify Noun Phrases (NP). To elaborate, this is where specific phrases for expressions such as units of measurement (this includes currency ("Canadian dollars"=>CAD), length, speed, distance etc.,) along with simple expressions of date (e.g. "30th of Dec this year"=>12/30/2015) and time ("10 in the morning"=>10 a.m.) are recognized.

Pass 4 has the ability to deal with extremely Complex expressions of Date and Time. A classic example for this would be "at 10 on the 2nd Sunday of Jan during the morning hours". This is a Composite Date/Time objects represents a specific date/time combination These kinds of complex expressions are dealt with in Pass 4.

Pass 4.5 works on the identification of Prepositional Phrase (PP). This means that phrases that contain information regarding the sentence are identified. For instance, a Prepositional Phrase would be such as "from New York City" which gives an indication that New York City is a Location mentioned and "from" is the preposition that would give an indication of what kind of role the location is playing e.g. Source or Destination. Sometimes the prepositional phrase is included as a part of post modifier (e.g. "departing from LAX on 5th Dec" vs "arriving at JFK on 5th Dec" can mean completely different things as far as the dates are concerned although the preposition used before the date is the same i.e. on). Hence the context of the region of the syntactic tree in which the prepositional phrase is located is critical to identifying the meaning.

Pass5 is where the Syntactic Analysis happens. The sentence as a whole is broken down and a tree is constructed with Verb Phrases (VP) at the top followed by Verbs(NP) and Noun Phrases (NP) and Prepositional Phrases (PP) as the next level nodes that provide further information about the subject, verb and object of the input sentence. This is done by a set of syntactic rules established depending on the Syntactic Frame of the Sentence.

The final phase is the semantic conversion where the Syntactic tree is then examined further to identify the Semantic Actions (e.g. TRAVEL, NAVIGATE, MEET) pertaining to the core meaning/purpose of the input sentence and further identifying the parameters or attributes that are required to perform the Semantic Action e.g. MEET is a Semantic Action representing a Meeting. Typically Meetings are organized by a HOST along with one or more GUEST(s) at a LOCATION on a certain DATE at a certain TIME. So these parameters becomes the fields in the Semantic Action.

INCORPORATION AND STATEMENT OF EQUIVALENTS

The references recited herein are incorporated herein in their entirety, particularly as they relate to teaching the level of ordinary skill in this art and for any disclosure necessary for the commoner understanding of the subject matter of the claimed invention. It will be clear to a person of ordinary skill in the art that the above embodiments may be altered or that insubstantial changes may be made without departing from the scope of the invention. Accordingly, the scope of the invention is determined by the scope of the following claims and their equitable Equivalents.

The invention claimed is:

1. A portable electronic apparatus in communication with remote computing equipment over a communications path, comprising:

one or more input devices comprising at least a camera and a microphone; one or more output devices comprising at least a touch screen and an audio speaker; one or more processors; and memory storing one or more programs executable by the one or more processors:

a Natural Language Processing/Natural Language Understanding (NLP/NLU) engine comprising programming instructions to dynamically receive and process user data comprising user verbal commands, user text, and user image data, and comprising programming instructions to dynamically output audio, text, and graphic animation responsive to the user data;

an audio percept module operatively associated with the microphone, the audio percept module comprising programming instructions to receive verbal commands from the user through the microphone and convert the verbal commands to audio percept data using the Natural Language Processing/Natural Language Understanding (NLP/NLU) engine;

a linguistic percept module operatively associated with the touch screen, the linguistic percept module comprising programming instructions to receive text from the user through the touch screen and convert the text to text percept data using the Natural Language Processing/Natural Language Understanding (NLP/NLU) engine;

a visual percept module operatively associated with the camera, the visual percept module comprising programming instructions to receive image data from the user through the camera and convert the image data into a visual percept data using the Natural Language Processing/Natural Language Understanding (NLP/NLU) engine;

a display output module operatively associated with the touch screen, the display output module comprising programming instructions to render an Intelligent Interactive Agent displayed on the touch screen as a graphic animation to a user;

wherein the display output module is programmed to display the Intelligent Interactive Agent having human-like characteristics, said characteristics comprising a human-like facial proportion, a human-like appearance, and human-like gestures;

an audio output module operatively associated with the audio speaker and linked to the display output module, the audio output module comprising programming instructions to to transmit a human-like voice through the audio speaker;

a text output module operatively associated with the touch screen and linked to the display output module, the text output module comprising programming instructions to transmit a text communications using the touch screen;

a semantic data module operatively associated with the NLP/NLU engine comprising programming instructions to output semantic data consisting essentially of semantic action data, semantic fact data, semantic modality data, semantic entity data, semantic urgency data and semantic concept data;

a Behavioral State module operatively associated with the NLP/NLU engine comprising programming instructions to computationally derive a Behavioral State of the Intelligent Interactive Agent and an index value from the semantic data, the Behavioral State comprising one or more states selected from a nervous state, an afraid state, a smiling state, a laughing state, a shocked state, a confused state, an embarrassed state, an overjoyed state, a relieved state, an angry state, a sorry state, a confident state, a crying state, an indifference state, or a frowning state, the index value comprising an intensity value for the Behavioral State;

a Mental State module module operatively associated with the NLP/NLU engine comprising programming instructions to computationally assign a Mental State from a series of derived Behavioral States over a period of time, the Mental State selected from physical energy, enthusiasm, health, happiness, sadness, fear, anger;

a Fact Repository comprising programming instructions to store the visual percept data, the audio percept data and the text percept data in memory;

an Ethics Checker Module linked to the NLP/NLU engine, the Ethics Checker Module comprising programming instructions to o computationally derive an Ethics Value from semantic data using a comparison of semantic action data against semantic entity data, the Ethics Checker Module comprising programming instructions to compare the ethics value against an Ethics Database and assign an Ethics Value ranging from −10 to +10, the Ethics Value used in part to computationally derive the Behavioral State of the Intelligent Interactive Agent, the Ethics Checker Module comprising programming instructions to dynamically change the Behavioral State of the Intelligent Interactive Agent based on changes in user data wherein a sequence of Behavioral States are programmed to increase or decrease in intensity, the Ethics Checker Module linked to the Display Output Module and comprising programming instructions to dynamically change the graphic animation of the Intelligent Interactive Agent to synchronize a specific Behavioral State to a specific facial expression, voice modality, text modality, and gesture, rendered in the graphic animation;

a Validity Module comprising programming instructions to compare semantic action data to semantic entity data, and comprising programming instructions to compare semantic action data to semantic concept data using the Natural Language Processing/Natural Language Understanding (NLP/NLU) engine, the NLP/NLU having a Speech Extractor, the Speech Extractor comprising programming instructions to extract a grammar part of audio percept data or text percept data, the grammar part comprising a verb and a noun, a Verb Lexicon Matching Filter linked to the Validity Module and comprising programming instructions to disambiguate the verb to a semantic action data, a Noun Lexicon Filter comprising programming instructions to disambiguate the noun to a semantic entity, a Common Sense Knowledge Database linked to the Validity Module, the Validity Module comprising programming instructions to compare the semantic action data and the semantic entity data and output a Validity Value that the combination is valid, is invalid, or is possibly invalid, the Validity Module comprising programming instructions to create a user notification comprising the Validity Value, and comprising programming instructions to create a user confirmation question based on said validity value, said user confirmation question comprising an audio or text request presented by the Intelligent Interactive Agent to confirm yes or no, or comprising an audio or text request presented by the Intelligent Interactive Agent to offer an alternative use of one or more related verbs from the Verb Lexicon Matching Filter and one or more related nouns from the Noun Lexicon Filter, the Validity Value used in part to computationally derive the Behavioral State of the Intelligent Interactive Agent, the Validity Module comprising programming instructions to dynamically change the Behavioral State of the Intelligent Interactive Agent based on changes in user data wherein a sequence of Behavioral States are programmed to increase or decrease in intensity, the Validity Module linked to the Display Output Module and comprising programming instructions to dynamically change the graphic animation of the Intelligent Interactive Agent to synchronize a specific Behavioral State to a specific facial expression, voice modality, text modality, and gesture, rendered in the graphic animation;

a Missing Input Module comprising programming instructions to analyze semantic data for missing parameters and missing attributes using the Natural Language Processing/Natural Language Understanding (NLP/NLU) engine, the NLP/NLU engine comprising programming instructions to use the Speech Extractor to extract a grammar part of audio percept data or text percept data, the grammar part comprising a verb and a noun, a Verb Lexicon Matching Filter comprising programming instructions to disambiguate the verb to a semantic action data, a Noun Lexicon Filter comprising programming instructions to disambiguate the noun to a semantic entity data, a Missing Parameters and Missing Attributes Database linked to the Missing Input Module, the Missing Input Module comprising programming instructions to compare the semantic action data and the semantic entity data to the Missing Parameters and Missing Attributes Database and calculate a Missing Input Value based on whether one or more missing parameters and missing attributes are not provided, the Missing Input Module comprising programming instructions to create an audio or text user notification presented by the Intelligent Interactive Agent that a parameter or attribute of the one or more missing parameters and missing attributes are not provided, and comprising programming instructions to create an audio or text user confirmation question presented by the Intelligent Interactive Agent comprising an audio or text request to confirm yes or no, or comprising a request to provide the parameter or attribute of the one or more missing parameters and missing attributes, the Missing Input Value used in part to computationally derive the Behavioral State of the Intelligent Interactive Agent, the Missing Input Module comprising programming instructions to dynamically change the Behavioral State of the Intelligent Interactive Agent based on changes in user data wherein a sequence of Behavioral States are programmed to increase or decrease in intensity, the Missing Input Module linked to the Display Output Module and comprising programming instructions to dynamically change the graphic animation of the Intelligent Interactive Agent to synchronize a specific Behavioral State to a specific facial expression, voice modality, text modality, and gesture, rendered in the graphic animation;

an Abstract Input Module comprising programming instructions to analyze semantic data for abstraction parameters and attributes using the Natural Language Processing/Natural Language Understanding (NLP/NLU) engine, the NLP/NLU engine comprising programming instructions to use the Speech Extractor to extract an abstraction part of audio percept data or text percept data, the abstraction part comprising a start location, destination location, start date, end date, start time, end time, a generic verb, a generic noun, and a generic adjective, an Abstraction Level Evaluator linked to the Abstract Input Module and comprising programming instructions to disambiguate the abstraction part to semantic data, the Abstract Input Module comprising programming instructions to calculate a Percentage Variance of the Area of the Expected Input and Area of the actual User Input, and output an Abstraction Value, the Abstract Input Module comprising programming instructions to create an audio or text user notification presented by the Intelligent Interactive Agent that an abstraction mismatch has occurred, and comprising programming instructions to request by audio or text presented by the Intelligent Interactive Agent to provide additional information, the Abstraction Value used in part to computationally derive the Behavioral State of the Intelligent Interactive Agent, the Abstract Input Module comprising programming instructions to dynamically change the Behavioral State of the Intelligent Interactive Agent based on changes in user data wherein a sequence of Behavioral States are programmed to increase or decrease in intensity, the Abstract Input Module linked to the Display Output Module and comprising programming instructions to dynamically change the graphic animation of the Intelligent Interactive Agent to synchronize a specific Behavioral State to a specific facial expression, voice modality, text modality, and gesture, rendered in the graphic animation;

an Expectation Module comprising programming instructions to analyze semantic data for expectation parameters and attributes using the Natural Language Processing/Natural Language Understanding (NLP/NLU) engine, the NLP/NLU engine comprising programming instructions to use the Speech Extractor to extract an expectation part of audio percept data or text percept data, the expectation part comprising a tone of voice, a decency of language, a modality of language, a specificity of location, date, time, verb, noun, or adjective, completeness of request, validity of action, and ethics of action, the Expectation Module comprising programming instructions to disambiguate the expectation to a semantic data, the Expectation Module comprising programming instructions to compare the semantic data to the Expectation Evaluator and output a tone of voice value, a decency of language value, a modality of language value, a validity value, an ethics value, a Specificity Factor, Average Completeness value, the Expectation Module comprising programming instructions to create an audio or text user notification presented by the Intelligent Interactive Agent that an expectation mismatch has occurred, and comprising programming instructions to request by audio or text presented by the Intelligent Interactive Agent to provide addition information, the Expectation Value used in part to computationally derive the Behavioral State of the Intelligent Interactive Agent, the Expectation Module comprising programming instructions to dynamically change the Behavioral State of the Intelligent Interactive Agent based on changes in user data wherein a sequence of Behavioral States are programmed to increase or decrease in intensity, the Expectation Module linked to the Display Output Module and comprising programming instructions to dynamically change the graphic animation of the Intelligent Interactive Agent to synchronize a specific Behavioral State to a specific facial expression, voice modality, text modality, and gesture, rendered in the graphic animation;

an Impact Analysis Module comprising programming instructions to compare a user's audio or text command to historical user data using the Natural Language Processing/Natural Language Understanding (NLP/NLU) engine, the NLP/NLU engine comprising programming instructions to use the Speech Extractor to extract a command part of audio percept data or text percept data, a Historical Success/Failure Database linked to the Impact Analysis Module, the Impact Analysis Module comprising programming instructions to compare the command part to the Historical Success/Failure Database, and output a Success Value based on whether the command part matches success parameters and attributes stored in the Historical Success/Failure Database, the Impact Analysis Module comprising programming instructions to create an audio or text user notification presented by the Intelligent Interactive Agent before a user command is executed when an success mismatch has occurred, and to create a second audio or text user notification presented by the Intelligent Interactive Agent after a user command is executed, and comprising programming instructions to request by audio or text presented by the Intelligent Interactive Agent a confirmation of success or failure, and comprising programming instructions to store the Success Value and the confirmation of success of failure to the Historical Success/Failure Database, the Success Value used in part to computationally derive the Behavioral State of the Intelligent Interactive Agent, the Impact Analysis Module comprising programming instructions to dynamically change the Behavioral State of the Intelligent Interactive Agent based on changes in user data wherein a sequence of Behavioral States are programmed to increase or decrease in intensity, the Impact Analysis Module linked to the Display Output Module and comprising programming instructions to dynamically change the graphic animation of the Intelligent Interactive Agent to synchronize a specific Behavioral State to a specific facial expression, voice modality, text modality, and gesture, rendered in the graphic animation; and, a Facial Expressions Animation Module comprising programming instructions to dynamically render facial graphic animation responsive to the Intelligent Interactive Agent Behavioral State and Mental State, the Facial Expressions Animation Module comprising programming instructions to match a Behavioral State to a Facial Expression wherein a Nervous Behavioral State is paired to a Nervous Facial Expression, an Afraid Behavioral State is paired to an Afraid Facial Expression, a Smiling Behavioral State is paired to a Smiling Facial Expression, a Laughing Behavioral State is paired to a Laughing Facial Expression, a Shocked Behavioral State is paired to a Shocked Facial Expression, a Confused Behavioral State is paired to a Confused Facial Expression, an Embarrassed Behavioral State is paired to an Embarrassed Facial Expression, an Overjoyed Behavioral State is paired to an Overjoyed Facial Expression, a Relieved Behavioral State is paired to a Relieved Facial Expression, an Angry Behavioral State is paired to an Angry Facial Expression, a Sorry Behavioral State is paired to a Sorry Facial Expression, a Confident Behavioral State is paired to a Confident Facial Expression, a Crying Behavioral State is paired to a Crying Facial Expression, an Indifference Behavioral State is paired to an Indifference Facial Expression, and a Frowning Behavioral State is paired to a Frowning Facial Expression, the Facial Expressions Animation Module comprising programming instructions to assign an Expressiveness Factor ranging from 0 to 5 to each Facial Expression where EF-0 is low expressivity and EF-5 is highest expressivity, the facial graphic animation comprising programming instructions to comprise Atomic Expressions that involve movement of the facial muscle groups of the forehead, eyebrows, eyelids, eyes, nose, cheeks, lips and the jaw bone, each movement programmed by calculating a set of Morph Targets on an animation mesh for each Facial Expression, each set of Morph Targets comprising a set of key points on the animation mesh that move from an initial position to a final position;

a Hand Gestures Animation Module comprising programming instructions to dynamically render hand gesture graphic animation responsive to the Intelligent Interactive Agent Behavioral State and Mental State, each Behavioral State paired to a specific hand gesture, the hand gesture graphic animation programmed to comprise movement of shoulders, elbows, neck, spine, wrist, and fingers, each movement programmed by calculating a set of Morph Targets on an animation mesh for each Hand Gesture, each set of Morph Targets comprising a set of key points on the animation mesh that move from an initial position to a final position; and, a Body Gestures Animation Module comprising programming instructions to dynamically render body gesture graphic animation responsive to the Intelligent Interactive Agent Behavioral State and Mental State, each Behavioral State paired to a specific Body Gesture, the body gesture graphic animation programmed to comprise movement of shoulders, elbows, neck, spine, each movement programmed by calculating a set of Morph Targets on an animation mesh for each Body Gesture, each set of Morph Targets comprising a set of key points on the animation mesh that move from an initial position to a final position.

2. The portable electronic apparatus of claim 1, further comprising wherein the one or more programs include instructions for accepting ambiguous user input and validating user input using a syntactical tree structure module.

3. The portable electronic apparatus of claim 1, further comprising an attribute clarification module, said attribute clarification module comprising programming instructions to identify ambiguous content in the user input, where the ambiguous content comprises plural items that are not associated with numerical attributes, calendar items that are missing date and time attributes, relationship items that are missing hierarchy attributes, navigation items that are missing location attributes, and where the attribute clarification module automatically formulates a question or option for a user to add the missing attributes.

4. A method of providing a graphical representation of a behavioral state of an animated interactive intelligent agent, comprising the steps:
   providing the portable electronic apparatus of claim 1;
   inputting a spoken verbal command to the Intelligent Interactive Agent to perform an action selected from the group consisting of: searching airline flights, buying food, making travel arrangements, finding weather conditions, obtaining directions, buying a house, selling a house, renting a house, scheduling a meeting, setting a reminder, replying to a contact, making a restaurant reservation; and
   receiving requests from the Intelligent Interactive Agent to provide details and receiving options and alternatives from the Intelligent Interactive Agent, where processing of the spoken verbal command to the Intelligent Interactive Agent generated a graphical representation of a Behavioral State of the Intelligent Interactive Agent comprising one or more states selected from a nervous state, an afraid state, a smiling state, a laughing state, a shocked state, a confused state, an embarrassed state, an overjoyed state, a relieved state, an angry state, a sorry state, a confident state, a crying state, an indifference state, or a frowning state.

5. The method of claim 4, further comprising the step wherein the one or more programs include instructions for accepting ambiguous user input and validating user input using one or more of the following modules: a syntactical tree structure module, an abstraction module, a disambiguation module, or a common sense knowledge module.

6. The method of claim 4, further comprising the step wherein the one or more programs include instructions for providing feedback to the user wherein the feedback comprises an ethical graphical or spoken output from the Intelligent Interactive Agent.

7. The method of claim 4, further comprising the step wherein the one or more programs include instructions for providing feedback to the user wherein the feedback comprises a graphical or spoken output from the Intelligent Interactive Agent, said output comprising an attribute clarification module, said attribute clarification module configured to identify ambiguous content in the user input, where the ambiguous content comprises plural items that are not associated with numerical attributes, calendar items that are missing date and time attributes, relationship items that are missing hierarchy attributes, navigation items that are missing location attributes, and where the attribute clarification module automatically formulates a question or option for a user to add the missing attributes.

8. The method of claim 4, further comprising the step wherein the one or more programs include instructions for providing feedback to the user wherein the feedback comprises a graphical or spoken output from the Intelligent Interactive Agent, said output comprising an intensity module, said intensity module configured to display facial characteristics in the Intelligent Interactive Agent reactive to a users input, wherein said user input is analyzed for tone of user voice input, and decency of language used.

9. A non-transitory computer-readable storage medium comprising instructions that, when executed by a processor, cause the processor to:
   run one or more programs including programming instructions comprising the following modules:
   a Natural Language Processing/Natural Language Understanding (NLP/NLU) engine comprising programming instructions to dynamically receive and process user data comprising user verbal commands, user text, and user image data, and comprising programming instructions to dynamically output audio, text, and graphic animation responsive to the user data;
   an audio percept module operatively associated with the microphone, the audio percept module comprising programming instructions to receive verbal commands from the user through the microphone and convert the verbal commands to audio percept data using the Natural Language Processing/Natural Language Understanding (NLP/NLU) engine;
   a linguistic percept module operatively associated with the touch screen, the linguistic percept module comprising programming instructions to receive text from the user through the touch screen and convert the text to text percept data using the Natural Language Processing/Natural Language Understanding (NLP/NLU) engine;
   a visual percept module operatively associated with the camera, the visual percept module comprising programming instructions to receive image data from the user through the camera and convert the image data into a visual percept data using the Natural Language Processing/Natural Language Understanding (NLP/NLU) engine;
   a display output module operatively associated with the touch screen, the display output module comprising programming instructions to render an Intelligent Interactive Agent displayed on the touch screen as a graphic animation to a user;
   wherein the display output module is programmed to display the Intelligent Interactive Agent having human-like characteristics, said characteristics comprising a human-like facial proportion, a human-like appearance, and human-like gestures;
   an audio output module operatively associated with the audio speaker and linked to the display output module, the audio output module comprising programming instructions to to transmit a human-like voice through the audio speaker;
   a text output module operatively associated with the touch screen and linked to the display output module, the text output module comprising programming instructions to transmit a text communications using the touch screen;
   a semantic data module operatively associated with the NLP/NLU engine comprising programming instructions to output semantic data consisting essentially of semantic action data, semantic fact data, semantic modality data, semantic entity data, semantic urgency data and semantic concept data;
   a Behavioral State module operatively associated with the NLP/NLU engine comprising programming instructions to computationally derive a Behavioral State of the Intelligent Interactive Agent and an index value from the semantic data, the Behavioral State comprising one or more states selected from a nervous state, an afraid state, a smiling state, a laughing state, a shocked state, a confused state, an embarrassed state, an overjoyed state, a relieved state, an angry state, a sorry state, a confident state, a crying state, an indifference state, or a frowning state, the index value comprising an intensity value for the Behavioral State;
   a Mental State module module operatively associated with the NLP/NLU engine comprising programming instructions to computationally assign a Mental State from a series of derived Behavioral States over a period of time, the Mental State selected from physical energy, enthusiasm, health, happiness, sadness, fear, anger;

a Fact Repository comprising programming instructions to store the visual percept data, the audio percept data and the text percept data in memory;

an Ethics Checker Module linked to the NLP/NLU engine, the Ethics Checker Module comprising programming instructions to o computationally derive an Ethics Value from semantic data using a comparison of semantic action data against semantic entity data, the Ethics Checker Module comprising programming instructions to compare the ethics value against an Ethics Database and assign an Ethics Value ranging from −10 to +10, the Ethics Value used in part to computationally derive the Behavioral State of the Intelligent Interactive Agent, the Ethics Checker Module comprising programming instructions to dynamically change the Behavioral State of the Intelligent Interactive Agent based on changes in user data wherein a sequence of Behavioral States are programmed to increase or decrease in intensity, the Ethics Checker Module linked to the Display Output Module and comprising programming instructions to dynamically change the graphic animation of the Intelligent Interactive Agent to synchronize a specific Behavioral State to a specific facial expression, voice modality, text modality, and gesture, rendered in the graphic animation;

a Validity Module comprising programming instructions to compare semantic action data to semantic entity data, and comprising programming instructions to compare semantic action data to semantic concept data using the Natural Language Processing/Natural Language Understanding (NLP/NLU) engine, the NLP/NLU having a Speech Extractor, the Speech Extractor comprising programming instructions to extract a grammar part of audio percept data or text percept data, the grammar part comprising a verb and a noun, a Verb Lexicon Matching Filter linked to the Validity Module and comprising programming instructions to disambiguate the verb to a semantic action data, a Noun Lexicon Filter comprising programming instructions to disambiguate the noun to a semantic entity, a Common Sense Knowledge Database linked to the Validity Module, the Validity Module comprising programming instructions to compare the semantic action data and the semantic entity data and output a Validity Value that the combination is valid, is invalid, or is possibly invalid, the Validity Module comprising programming instructions to create a user notification comprising the Validity Value, and comprising programming instructions to create a user confirmation question based on said validity value, said user confirmation question comprising an audio or text request presented by the Intelligent Interactive Agent to confirm yes or no, or comprising an audio or text request presented by the Intelligent Interactive Agent to offer an alternative use of one or more related verbs from the Verb Lexicon Matching Filter and one or more related nouns from the Noun Lexicon Filter, the Validity Value used in part to computationally derive the Behavioral State of the Intelligent Interactive Agent, the Validity Module comprising programming instructions to dynamically change the Behavioral State of the Intelligent Interactive Agent based on changes in user data wherein a sequence of Behavioral States are programmed to increase or decrease in intensity, the Validity Module linked to the Display Output Module and comprising programming instructions to dynamically change the graphic animation of the Intelligent Interactive Agent to synchronize a specific Behavioral State to a specific facial expression, voice modality, text modality, and gesture, rendered in the graphic animation;

a Missing Input Module comprising programming instructions to analyze semantic data for missing parameters and missing attributes using the Natural Language Processing/Natural Language Understanding (NLP/NLU) engine, the NLP/NLU engine comprising programming instructions to use the Speech Extractor to extract a grammar part of audio percept data or text percept data, the grammar part comprising a verb and a noun, a Verb Lexicon Matching Filter comprising programming instructions to disambiguate the verb to a semantic action data, a Noun Lexicon Filter comprising programming instructions to disambiguate the noun to a semantic entity data, a Missing Parameters and Missing Attributes Database linked to the Missing Input Module, the Missing Input Module comprising programming instructions to compare the semantic action data and the semantic entity data to the Missing Parameters and Missing Attributes Database and calculate a Missing Input Value based on whether one or more missing parameters and missing attributes are not provided, the Missing Input Module comprising programming instructions to create an audio or text user notification presented by the Intelligent Interactive Agent that a parameter or attribute of the one or more missing parameters and missing attributes are not provided, and comprising programming instructions to create an audio or text user confirmation question presented by the Intelligent Interactive Agent comprising an audio or text request to confirm yes or no, or comprising a request to provide the parameter or attribute of the one or more missing parameters and missing attributes, the Missing Input Value used in part to computationally derive the Behavioral State of the Intelligent Interactive Agent, the Missing Input Module comprising programming instructions to dynamically change the Behavioral State of the Intelligent Interactive Agent based on changes in user data wherein a sequence of Behavioral States are programmed to increase or decrease in intensity, the Missing Input Module linked to the Display Output Module and comprising programming instructions to dynamically change the graphic animation of the Intelligent Interactive Agent to synchronize a specific Behavioral State to a specific facial expression, voice modality, text modality, and gesture, rendered in the graphic animation;

an Abstract Input Module comprising programming instructions to analyze semantic data for abstraction parameters and attributes using the Natural Language Processing/Natural Language Understanding (NLP/NLU) engine, the NLP/NLU engine comprising programming instructions to use the Speech Extractor to extract an abstraction part of audio percept data or text percept data, the abstraction part comprising a start location, destination location, start date, end date, start time, end time, a generic verb, a generic noun, and a generic adjective, an Abstraction Level Evaluator linked to the Abstract Input Module and comprising programming instructions to disambiguate the abstraction part to semantic data, the Abstract Input Module comprising programming instructions to calculate a Percentage Variance of the Area of the Expected Input and Area of the actual User Input, and output an Abstraction Value, the Abstract Input Module comprising programming instructions to create an audio or text user notification presented by the Intelligent Interactive Agent that an abstraction mismatch has occurred, and comprising programming instructions to request by audio or text presented by the Intelligent Interactive Agent to provide additional information, the Abstraction Value used in part to computationally derive the Behavioral State of the Intelligent Interactive Agent, the Abstract Input Module comprising programming instructions to dynamically change the Behavioral State of the Intelligent Interactive Agent based on changes in user data wherein a sequence of Behavioral States are programmed to increase or decrease in intensity, the Abstract Input Module linked to the Display Output Module and comprising programming instructions to dynamically change the graphic animation of the Intelligent Interactive Agent to synchronize a specific Behavioral State to a specific facial expression, voice modality, text modality, and gesture, rendered in the graphic animation;

an Expectation Module comprising programming instructions to analyze semantic data for expectation parameters and attributes using the Natural Language Processing/Natural Language Understanding (NLP/NLU) engine, the NLP/NLU engine comprising programming instructions to use the Speech Extractor to extract an expectation part of audio percept data or text percept data, the expectation part comprising a tone of voice, a decency of language, a modality of language, a specificity of location, date, time, verb, noun, or adjective, completeness of request, validity of action, and ethics of action, the Expectation Module comprising programming instructions to disambiguate the expectation to a semantic data, the Expectation Module comprising programming instructions to compare the semantic data to the Expectation Evaluator and output a tone of voice value, a decency of language value, a modality of language value, a validity value, an ethics value, a Specificity Factor, Average Completeness value, the Expectation Module comprising programming instructions to create an audio or text user notification presented by the Intelligent Interactive Agent that an expectation mismatch has occurred, and comprising programming instructions to request by audio or text presented by the Intelligent Interactive Agent to provide addition information, the Expectation Value used in part to computationally derive the Behavioral State of the Intelligent Interactive Agent, the Expectation Module comprising programming instructions to dynamically change the Behavioral State of the Intelligent Interactive Agent based on changes in user data wherein a sequence of Behavioral States are programmed to increase or decrease in intensity, the Expectation Module linked to the Display Output Module and comprising programming instructions to dynamically change the graphic animation of the Intelligent Interactive Agent to synchronize a specific Behavioral State to a specific facial expression, voice modality, text modality, and gesture, rendered in the graphic animation;

an Impact Analysis Module comprising programming instructions to compare a user's audio or text command to historical user data using the Natural Language Processing/Natural Language Understanding (NLP/NLU) engine, the NLP/NLU engine comprising programming instructions to use the Speech Extractor to extract a command part of audio percept data or text percept data, a Historical Success/Failure Database linked to the Impact Analysis Module, the Impact Analysis Module comprising programming instructions to compare the command part to the Historical Success/Failure Database, and output a Success Value based on whether the command part matches success parameters and attributes stored in the Historical Success/Failure Database, the Impact Analysis Module comprising programming instructions to create an audio or text user notification presented by the Intelligent Interactive Agent before a user command is executed when an success mismatch has occurred, and to create a second audio or text user notification presented by the Intelligent Interactive Agent after a user command is executed, and comprising programming instructions to request by audio or text presented by the Intelligent Interactive Agent a confirmation of success or failure, and comprising programming instructions to store the Success Value and the confirmation of success of failure to the Historical Success/Failure Database, the Success Value used in part to computationally derive the Behavioral State of the Intelligent Interactive Agent, the Impact Analysis Module comprising programming instructions to dynamically change the Behavioral State of the Intelligent Interactive Agent based on changes in user data wherein a sequence of Behavioral States are programmed to increase or decrease in intensity, the Impact Analysis Module linked to the Display Output Module and comprising programming instructions to dynamically change the graphic animation of the Intelligent Interactive Agent to synchronize a specific Behavioral State to a specific facial expression, voice modality, text modality, and gesture, rendered in the graphic animation; and, a Facial Expressions Animation Module comprising programming instructions to dynamically render facial graphic animation responsive to the Intelligent Interactive Agent Behavioral State and Mental State, the Facial Expressions Animation Module comprising programming instructions to match a Behavioral State to a Facial Expression wherein a Nervous Behavioral State is paired to a Nervous Facial Expression, an Afraid Behavioral State is paired to an Afraid Facial Expression, a Smiling Behavioral State is paired to a Smiling Facial Expression, a Laughing Behavioral State is paired to a Laughing Facial Expression, a Shocked Behavioral State is paired to a Shocked Facial Expression, a Confused Behavioral State is paired to a Confused Facial Expression, an Embarrassed Behavioral State is paired to an Embarrassed Facial Expression, an Overjoyed Behavioral State is paired to an Overjoyed Facial Expression, a Relieved Behavioral State is paired to a Relieved Facial Expression, an Angry Behavioral State is paired to an Angry Facial Expression, a Sorry Behavioral State is paired to a Sorry Facial Expression, a Confident Behavioral State is paired to a Confident Facial Expression, a Crying Behavioral State is paired to a Crying Facial Expression, an Indifference Behavioral State is paired to an Indifference Facial Expression, and a Frowning Behavioral State is paired to a Frowning Facial Expression, the Facial Expressions Animation Module comprising programming instructions to assign an Expressiveness Factor ranging from 0 to 5 to each Facial Expression where EF-0 is low expressivity and EF-5 is highest expressivity, the facial graphic animation comprising programming instructions to comprise Atomic Expressions that involve movement of the facial muscle groups of the forehead, eyebrows, eyelids, eyes, nose, cheeks, lips and the jaw bone, each movement programmed by calculating a set of Morph Targets on an animation mesh for each Facial Expression, each set of Morph Targets comprising a set of key points on the animation mesh that move from an initial position to a final position;

a Hand Gestures Animation Module comprising programming instructions to dynamically render hand gesture graphic animation responsive to the Intelligent Interactive Agent Behavioral State and Mental State, each Behavioral State paired to a specific hand gesture, the hand gesture graphic animation programmed to comprise movement of shoulders, elbows, neck, spine, wrist, and fingers, each movement programmed by calculating a set of Morph Targets on an animation mesh for each Hand Gesture, each set of Morph Targets comprising a set of key points on the animation mesh that move from an initial position to a final position; and, a Body Gestures Animation Module comprising programming instructions to dynamically render body gesture graphic animation responsive to the Intelligent Interactive Agent Behavioral State and Mental State, each Behavioral State paired to a specific Body Gesture, the body gesture graphic animation programmed to comprise movement of shoulders, elbows, neck, spine, each movement programmed by calculating a set of Morph Targets on an animation mesh for each Body Gesture, each set of Morph Targets comprising a set of key points on the animation mesh that move from an initial position to a final position.

\* \* \* \* \*